United States Patent
Sheldon-Coulson et al.

(10) Patent No.: US 11,846,264 B2
(45) Date of Patent: Dec. 19, 2023

(54) SELF POWERED COMPUTING BUOY

(71) Applicant: LONE GULL HOLDINGS, LTD., Portland, OR (US)

(72) Inventors: Garth Alexander Sheldon-Coulson, Portland, OR (US); Brian Lee Moffat, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 763 days.

(21) Appl. No.: 16/805,493

(22) Filed: Feb. 28, 2020

(65) Prior Publication Data

US 2020/0198739 A1 Jun. 25, 2020

Related U.S. Application Data

(63) Continuation of application No. 16/033,522, filed on Jul. 12, 2018, now Pat. No. 10,668,990.

(Continued)

(51) Int. Cl.
*B63B 22/18* (2006.01)
*F03B 13/22* (2006.01)

(Continued)

(52) U.S. Cl.
CPC .............. *F03B 13/22* (2013.01); *B63B 22/18* (2013.01); *B63B 39/06* (2013.01); *B63H 21/00* (2013.01); *F03B 13/142* (2013.01); *F03B 13/183* (2013.01); *F03B 13/1885* (2013.01); *F03B 13/20* (2013.01); *F03B 13/24* (2013.01); *G09C 1/00* (2013.01); *H04L 9/0637* (2013.01); *H04L 9/3239* (2013.01); *B63B 2022/006* (2013.01); *F03B 13/145* (2013.01); *F03B 13/16* (2013.01);

(Continued)

(58) Field of Classification Search
CPC .................... B63B 22/18; B63B 39/06; B63B 2022/006; B63B 2001/044; B63B 1/048; B63B 2035/006; B63B 2035/4466; B63H 21/00; F03B 13/142; F03B 13/183; F03B 13/1885; F03B 13/20; F03B 13/24; F03B 13/145; F03B 13/16; F03B 13/189; G09C 1/00; H04L 9/0637; H04L 9/3239; H04L 9/50; F05B 2240/40; F05B 2240/931; F05B 2260/20; F05B 2260/2241; F05B 2260/42; B63J 2003/046; Y02T 50/60; Y02T 70/00; Y04S 40/20
See application file for complete search history.

(56) References Cited

U.S. PATENT DOCUMENTS

| | | | | |
|---|---|---|---|---|
| 5,557,291 A | * | 9/1996 | Chu | ...................... H01Q 13/085 |
| | | | | 343/768 |
| 5,872,535 A | * | 2/1999 | Jordan | ..................... G01S 13/58 |
| | | | | 342/26 C |
| 6,761,508 B1 | * | 7/2004 | Haun | ..................... B63B 43/06 |
| | | | | 114/264 |

(Continued)

*Primary Examiner* — Donald J Wallace
(74) *Attorney, Agent, or Firm* — FULWIDER PATTON LLP

(57) ABSTRACT

A computing apparatus that is integrated within a flotation module, the system obtaining the energy required to power its computing operations from waves that travel across the surface of a body of water on which the flotation module sets. Additionally, the self-powered computing apparatus employs novel designs to utilize its close proximity to the body of water and/or to strong ocean winds to significantly lower the cost and complexity of cooling their computing circuits.

34 Claims, 31 Drawing Sheets

Related U.S. Application Data

(60) Provisional application No. 62/696,740, filed on Jul. 11, 2018, provisional application No. 62/688,685, filed on Jun. 22, 2018, provisional application No. 62/622,879, filed on Jan. 27, 2018, provisional application No. 62/533,058, filed on Jul. 16, 2017.

(51) Int. Cl.

| | | |
|---|---|---|
| B63H 21/00 | (2006.01) | |
| B63B 39/06 | (2006.01) | |
| F03B 13/24 | (2006.01) | |
| H04L 9/06 | (2006.01) | |
| G09C 1/00 | (2006.01) | |
| H04L 9/32 | (2006.01) | |
| F03B 13/20 | (2006.01) | |
| F03B 13/18 | (2006.01) | |
| F03B 13/14 | (2006.01) | |
| F03B 13/16 | (2006.01) | |
| B63B 22/00 | (2006.01) | |
| H04L 9/00 | (2022.01) | |

(52) U.S. Cl.
CPC ......... *F03B 13/189* (2013.01); *F05B 2240/40* (2013.01); *F05B 2240/931* (2013.01); *F05B 2260/20* (2013.01); *F05B 2260/2241* (2013.01); *F05B 2260/42* (2013.01); *H04L 9/50* (2022.05)

(56) References Cited

U.S. PATENT DOCUMENTS

| | | | | |
|---|---|---|---|---|
| 7,525,207 B2* | 4/2009 | Clidaras | ................. | F03B 13/20 290/43 |
| 9,623,945 B2* | 4/2017 | Hine | ........................ | B63H 1/36 |
| 10,668,990 B2* | 6/2020 | Sheldon-Coulson | ... | B63B 1/048 |
| 2004/0056779 A1* | 3/2004 | Rast | ....................... | B63B 22/163 340/985 |
| 2008/0265582 A1* | 10/2008 | Hench | ..................... | F03B 13/20 290/53 |
| 2009/0177832 A1* | 7/2009 | Gunzinger | .......... | G06F 13/4022 710/316 |
| 2009/0295167 A1* | 12/2009 | Clidaras | ............... | H05K 7/1497 290/55 |
| 2009/0311925 A1* | 12/2009 | Hine | ...................... | B63H 25/04 440/13 |
| 2012/0248865 A1* | 10/2012 | Eder | ....................... | F03B 13/16 307/9.1 |
| 2013/0006445 A1* | 1/2013 | Hine | ...................... | B63H 21/17 440/9 |
| 2013/0008164 A1* | 1/2013 | Cunningham | .......... | F03B 13/20 60/505 |
| 2013/0222115 A1* | 8/2013 | Davoodi | .................. | H04Q 9/00 340/10.1 |
| 2014/0230427 A1* | 8/2014 | Moffat | ................. | H02K 7/1823 60/502 |
| 2015/0194813 A1* | 7/2015 | Finn | ..................... | H05K 7/1497 307/19 |
| 2015/0344109 A1* | 12/2015 | Davoodi | ................. | G05D 1/0206 367/5 |
| 2015/0346726 A1* | 12/2015 | Davoodi | ................. | B63B 22/20 440/38 |
| 2016/0027308 A1* | 1/2016 | Hine | ........................ | G08G 3/00 701/21 |
| 2016/0364989 A1* | 12/2016 | Speasl | ..................... | B64F 1/222 |
| 2017/0075941 A1* | 3/2017 | Finlow-Bates | ....... | H04L 9/3239 |
| 2022/0341387 A1* | 10/2022 | Sheldon-Coulson | ......................... | F03B 13/142 |

\* cited by examiner

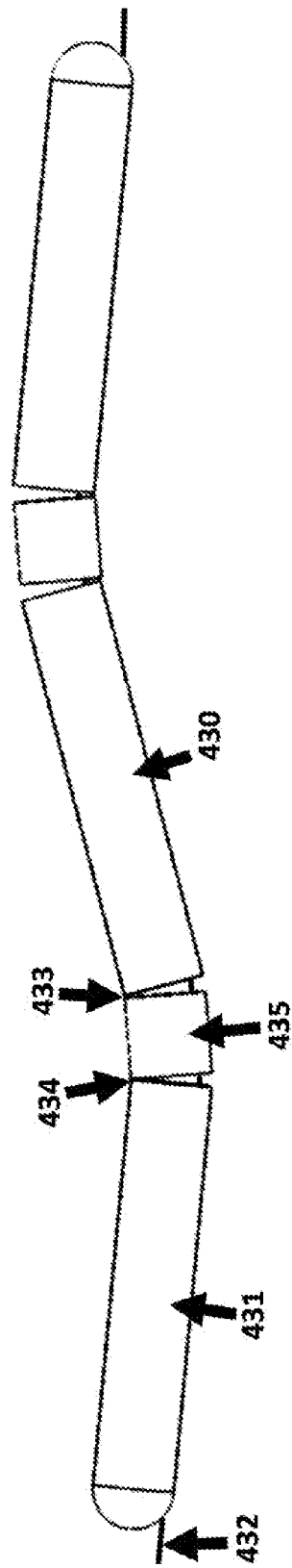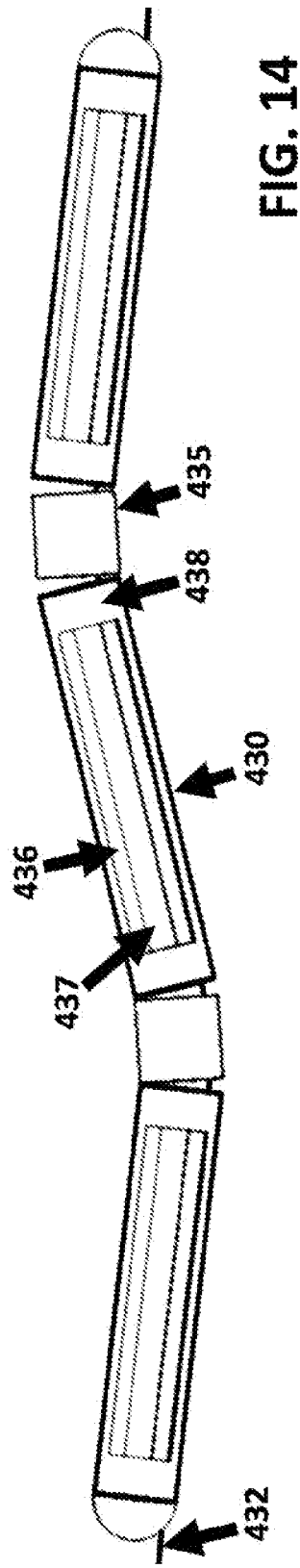

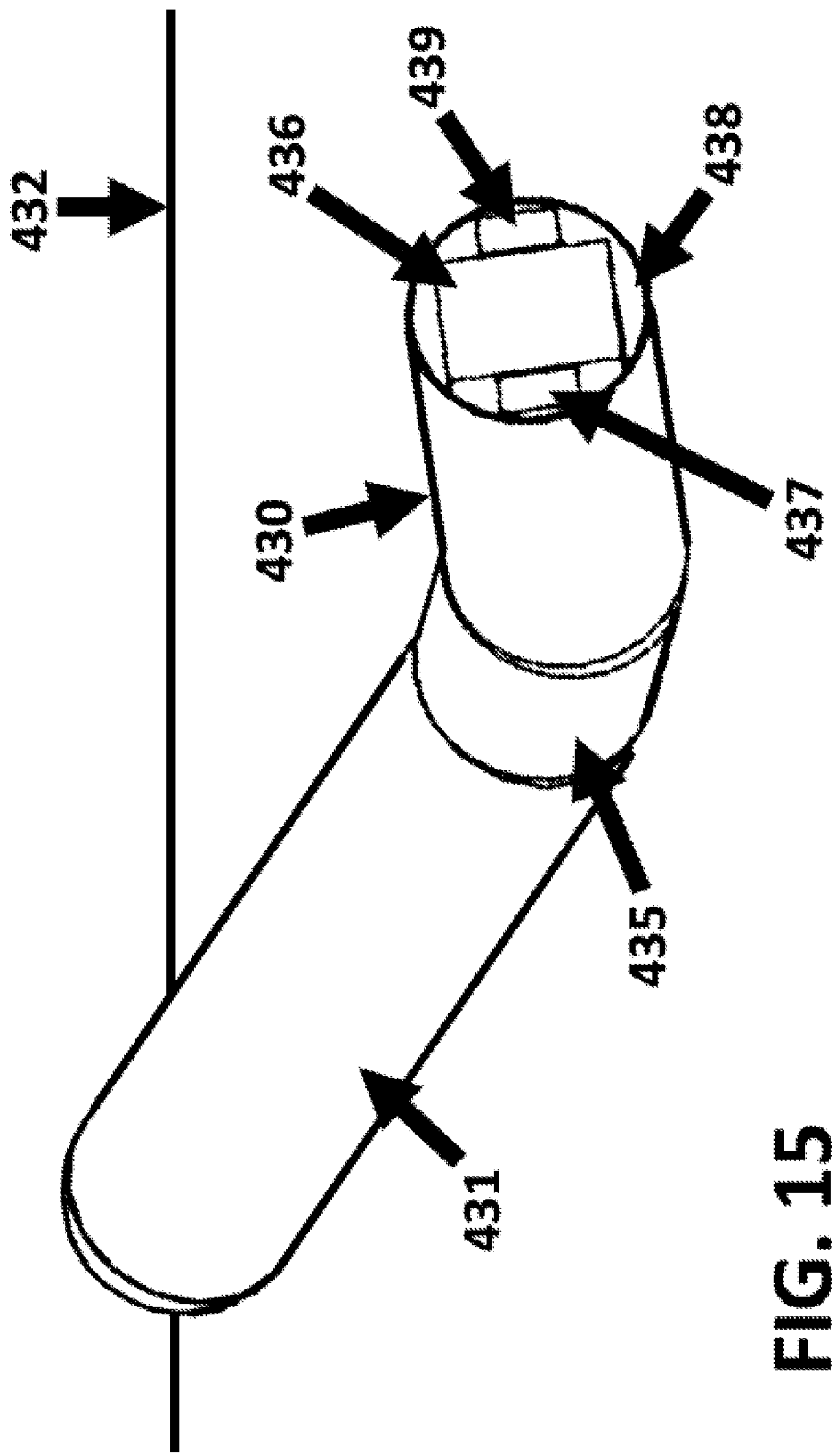

SELF POWERED COMPUTING BUOY

CROSS-REFERENCES TO RELATED APPLICATIONS

This continuation is based on U.S. Ser. No. 16/033,522, filed Jul. 12, 2018 which claims priority to U.S. Provisional Application Nos. 62/533,058 filed Jul. 16, 2017; 62/622,879 filed Jan. 27, 2018; 62/688,685 filed Jun. 22, 2018; and 62/696,740, filed Jul. 11, 2018, the contents of which are incorporated herein by reference in their entirety.

BACKGROUND

Large-scale computing currently has at least two significant limitations and/or drawbacks. The first obstacle is that computers require electrical power in order to operate and perform their calculations. Some of the power energizes the CPUs while remaining power energizes the random-access memory, shared and/or more persistent memory (e.g. hard disks), switches, routers, and other equipment supporting network connections between computers. As society's reliance on computers and computing increases, the portion of the world's energy budget that is consumed by computers and computing also increases. By some estimates, computers and computing currently account for approximately 4% of the world's total electricity budget and is growing at a rapid exponential pace, especially with respect to computationally intensive tasks such as simulations, artificial intelligence, and mining of cryptocurrencies such as Bitcoin.

The second obstacle to large scale computing is that computers generate heat. Most of the electrical power used to energize computers is converted to, and/or lost as, heat from the circuits and components that execute the respective computational tasks. The heat generated by computers can raise the temperatures of computers to levels that can cause those computers to fail, especially when the computers are located in close proximity to one another. Because of this, computers and the environments in which they operate must be cooled. This cooling, e.g. through air conditioners and fans, consumes significant electrical power over and above the electrical power used to energize the computers. Favorable historical trends in the miniaturization of computer components (e.g. "Moore's Law") are currently slowing, suggesting that future increases in computational power may require greater investments in cooling than was common in the past.

SUMMARY OF THE INVENTION

Disclosed is a novel type of computing apparatus which is integrated within a buoy that obtains the energy required to power its computing operations from waves that travel across the surface of the body of water on which the buoy floats. Additionally, these self-powered computing buoys employ novel designs to utilize their close proximity to a body of water and/or to strong ocean winds to significantly lower the cost and complexity of cooling their computing circuits. Computing tasks of an arbitrary nature are supported, as is the incorporation and/or utilization of computing circuits specialized for the execution of specific types of computing tasks, such as the "mining" of cryptocurrencies such as Bitcoin. And, each buoy's receipt of a computational task, and its return of a computational result, may be accomplished through the transmission of data across satellite links, fiber optic cables, LAN cables, radio, modulated light, microwaves, and/or any other channel, link, connection, and/or network. Systems and methods are disclosed for parallelizing computationally intensive tasks across multiple buoys. Multi-purpose buoys, and methods for employing the same, are disclosed, wherein the electrical energy produced by a buoy is normally directed to the buoy's computing circuits to carry out computationally intensive tasks, but can intermittently be redirected to serve sporadic purposes such as the electrical charging of nearby ocean-going and airborne drones. Also disclosed is a "farm" or array configuration wherein multiple mutually inter-tethered buoys share power for computationally intensive tasks across a common power bus, reducing the need for the buffering or storage of said power.

The apparatuses and systems disclosed herein locate and/or compartmentalize computers within a flotation module such as a buoy floating adjacent to the surface of a body of water. This flotation module extracts power from waves moving across and/or through that body of water, thereby converting wave energy into electrical energy. A portion of the extracted electrical power is then used to energize the flotation module's cluster of computers, at least some of the time. The resulting heat generated by the computers may be actively or passively transmitted to the water on which the flotation module floats, or to the surrounding air normally associated with strong ocean winds.

The current disclosure offers many advantages, including, but not limited to:

1) Efficient Utilization of Wave Energy

If the electrical power generated by a wave-energy converting buoy is to be transmitted to land, e.g. where it might be added to an electrical grid, then that power must have a channel, method, and means with which to do so. Many developers of wave energy devices anticipate using subsea electrical power cables to transmit power generated by anchored farms of their devices to shore. However, these cables are expensive. Their deployment (e.g. their burial in the seafloor) is also expensive. And, the anchoring and/or mooring of a farm of buoys (i.e. wave energy devices) close to shore can be difficult. The current disclosure allows wave energy devices to make good use of the electrical power that they generate without transmitting it to land.

While the current disclosure does not preclude the anchoring of the disclosed devices, it nevertheless allows wave energy devices to make good use of the electrical power that they generate without being anchored and/or moored to the seafloor, and without an electrical cable to shore.

2) Efficient Scaling of Computing

By sequestering clusters of computers within independent buoys, the number of computers (i.e. the numbers of clusters) can be scaled with relative ease, e.g. there are no obvious barriers, costs, or consequences associated with an increase in the number of such sequestered clusters of computers made available for the processing of computing tasks. The energy efficiency of interconnected sets of collocated computers can be discussed in terms of "power usage effectiveness" or "PUE."

PUE=(Total Computing Facility Power)/(Total Computing Equipment Power)

Because large terrestrial clusters of computers require the expenditure of energy not just for the computers themselves, but also for requirements such as: cooling, lighting, environmental considerations for staff, etc., their PUEs are typically estimated to be about 1.2. An ideal PUE would be 1.0, which would mean that all electrical power consumed, was consumed by the computers executing their respective computing tasks, and, by extension, no electrical power was expended on peripheral tasks.

The present invention utilizes passive conductive cooling of the computers in some embodiments, which, because it is passive, consumes no electrical power. And, because the disclosed embodiments are typically autonomous, many embodiments utilize close to 100% of the electrical power that they generate energizing their respective computers, and providing them with the energy that they need to complete their respective computing tasks. Thus, many embodiments of the disclosed device will have a PUE approaching 1.0, notwithstanding any losses due to temporary buffering or storage of power.

Also, because the computers stored and operated within the devices of the present disclosure are located on buoys that are floating on a body of water (e.g., on the sea far from shore), they provide significant computing power without requiring a concomitant dedication of a significant area of land. This potentially frees land that might otherwise have been used to house such computing clusters, so that it might instead be used for farming, homes, parks, etc.

3) Decoupling Large-Scale Computing from Large-Scale Support Costs

Some might regard the history of computing as having taught that progress, especially with respect to the scaling of computing, is often a consequence of an underlying progress in the discovery of new ways to decouple the components, and the constituent tasks, on which large-scale computing relies, from the overhead or support requirements needed to support large "monolithic" collections of computers.

4) Synergies in Multi-Use Buoys

There are many uses for electrical power far out at sea. Ocean charging stations for autonomous and/or remotely-operated, ocean-going or airborne, "drones," especially military drones, can consume large amounts of power. Surveying of the ocean floor and the detection of submarines can consume large amounts of power. Communications relays (e.g. for submarines) and radar stations can consume large amounts of power. Ocean-floor mining operations can consume large amounts of power.

Many of the aforementioned applications, however, consume power only sporadically, and are therefore unlikely to be economical. It is unlikely to be economical, for instance, to deploy a dedicated wave energy converter for the charging of drones. However, such a deployment can become economical if there is a use to which electrical power can be put during normal operation, between such sporadic uses. The performance of computationally intensive tasks using computational circuits is one of the simplest, most low-capital-cost and low-maintenance ways of using electrical power.

These and other advantages of the present invention may best be understood with reference to the detailed description of the preferred embodiments along with the drawings listed below.

BRIEF DESCRIPTION OF THE DRAWINGS

FIG. 13 is a side view of an attenuator type wave energy extraction system;
FIG. 14 is a semi-transparent side view of the embodiment of FIG. 13;
FIG. 15 is a sectional view of the embodiment of FIG. 13.

DETAILED DESCRIPTION OF THE PREFERRED EMBODIMENTS

Figure 1:
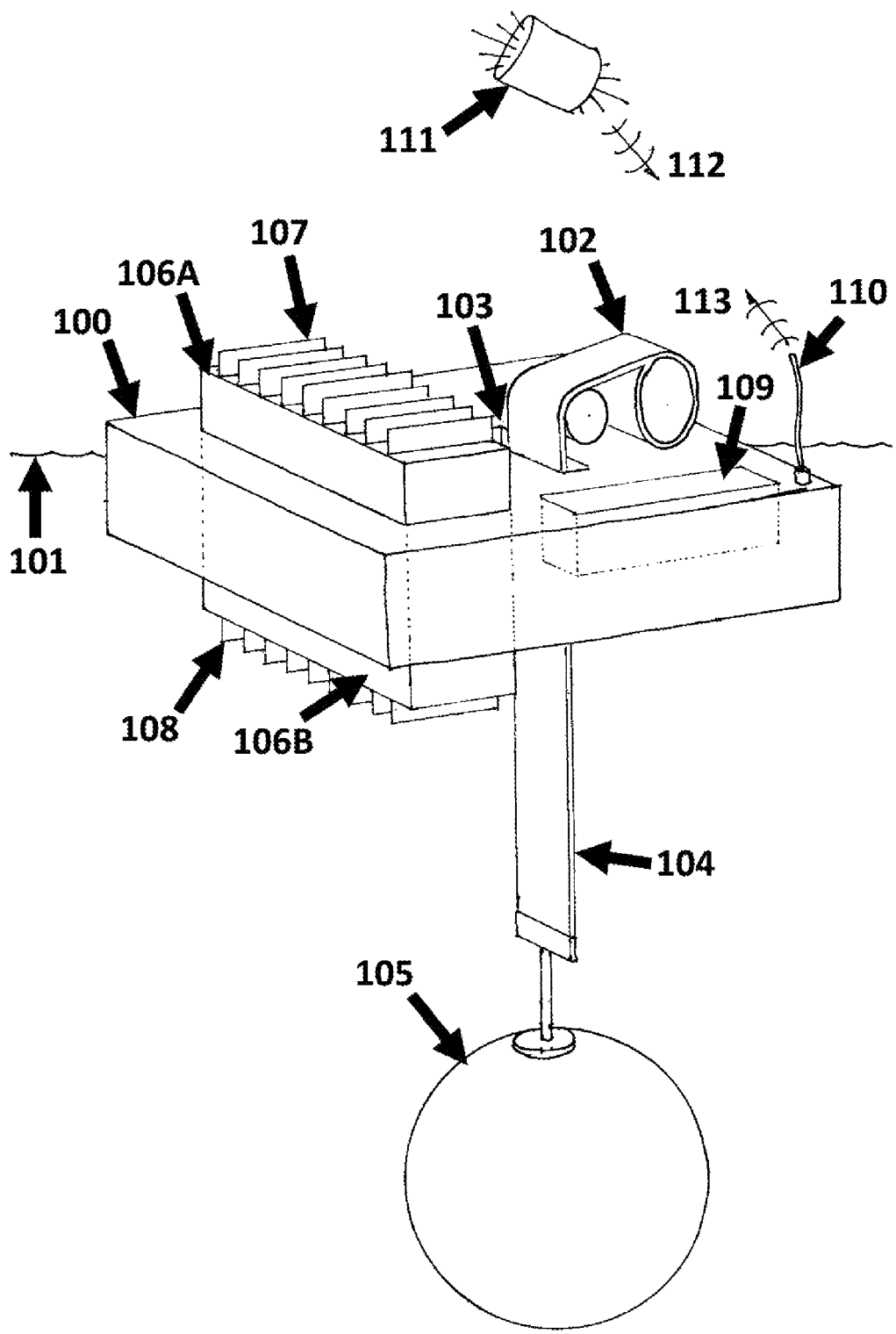
FIG. 1 is an elevated, perspective view of a first embodiment of the present invention.

For a fuller understanding of the nature and objects of the disclosure, reference should be made to the preceding detailed description, taken in connection with the accompanying drawings. The following figures offer explanatory illustrations, which, like most, if not all, explanations and illustrations are potentially useful, but inherently incomplete. The following figures, and the illustrations offered therein, in no way constitute limitations, neither explicit nor implicit, on the scope of the present invention.

The device disclosed herein is a wave energy converter that floats adjacent to an upper surface of a body of water, e.g. the sea, and which incorporates a large number of computing circuits or "chips" that are powered, at least in part, by the electrical power generated by the device in response to the passage of waves beneath it.

Types of Wave Energy Devices

Some embodiments of the present disclosure conform to the characteristics considered typical of "point absorbers," i.e., wave energy devices that extract energy from waves, and convert it into electrical power, without any significant difference in efficiency arising due to the particular transversal direction of the waves.

Some embodiments of the present disclosure conform to the characteristics considered typical of "attenuators," i.e., wave energy devices that flex or move when oriented parallel to a wave's direction of motion, wherein the resulting flexing or movement extracts energy from the waves, and wherein that energy is converted into electrical.

Some embodiments of the present disclosure conform to the characteristics considered typical of "oscillating water columns (OWCs)," i.e., wave energy devices in which the changes in the height of the sea surface alternately compress and expand one or more air-filled cavities causing such air to move in and out of the cavities through one or more turbines, thereby generating electrical power. Some OWCs have a relatively shallow draft and float adjacent to the surface of the water. Other OWCs have a relatively deeper draft.

Some embodiments of the present disclosure conform to the characteristics considered typical of "overtopping devices," i.e., wave energy devices in which waves impinge upon ramped submerged surfaces such that they are slowed and tend to grow in height in a fashion similar to that exhibited by waves approaching and/or breaking on a beach. The raised waves are directed toward a receptacle into which a portion of their water falls and thereafter passes through hydrokinetic turbine, thereby generating electrical power, as it flows back to the sea.

In some embodiments, the self-powered computing buoy is an "inertial" wave energy converter. An inertial wave energy converter works as follows: In the field of wave energy, a class of "inertial" wave energy converters uses a two-body design comprising (1) a flotation platform that floats at the surface of the water and (2) a submerged "inertial mass" that is suspended beneath the flotation platform by at least one flexible connector. The flotation platform rises and falls on passing waves, causing the separation distance between it and the inertial mass to periodically increase and decrease. The increase in this separation distance is opposed by at least one power take off unit mounted at or upon the flotation platform.

In some embodiments of such inertial wave energy converters, the at least one power take off unit includes a pulley wheel, said pulley wheel experiencing a torque applied by the flexible connector when the separation distance between the inertial mass and flotation module increases, and the ensuing rotation driving an electrical generator. In other embodiments, a pulley wheel is not used; instead, the at least one power take off unit includes a lever arm or other hinged mechanical apparatus actuated by the flexible connector, again operating an electrical generator.

In yet other embodiments of such inertial wave energy converters, the at least one power take off unit includes a hydraulic cylinder or other fluid power apparatus actuated by the flexible connector. Still other types of power take off unit are contained within the class of inertial wave energy converter. As a corollary to the generation of power, the at least one power take off unit applies a force or torque to resist the periodic "pulling away" (relative downward motion) of the at least one flexible connector. This entails that an upward lifting force is periodically imparted to the inertial mass through the flexible connector, causing the inertial mass to periodically rise upward in the water column, before descending under gravity when the lifting force abates.

The described forces cause the inertial mass to rise and fall in an oscillating fashion, somewhat out of phase with the wave-induced vertical oscillations of the flotation platform. The inertial mass preferably comprises a large submerged vessel, container, or enclosure, such as a hollow, mostly sealed sphere. The inertial mass preferably encloses, entrains, or constrains a large volume of seawater. The inertial mass preferably has relatively low drag when moved in the vertical direction and preferably has very large mass and inertia. A spherical or elliptical inertial mass is suitable because it encloses a very large volume of water relative to its surface area and has a relatively low-drag hydrodynamic profile. The inertial mass is preferably enclosed by a net or other similar means of coupling it to the flexible connector.

It is to be understood that the disclosure applies to any type of wave energy converter, not only point absorbers and attenuators.

Types of Deployments

Some embodiments of the present disclosure float freely, or "drift," adjacent to a surface of water in a passive manner which results in their movement in response to wind, waves, currents, tides, etc. Some embodiments are anchored or moored so as to retain an approximately constant position relative to a position on the underlying seafloor. And, some embodiments are self-propelled, and/or capable of exploiting natural movements of air and/or water to move in a chosen direction, at least approximately.

Some embodiments of the present disclosure are self-propelled or capable of exploiting natural movements of air or water so as to change their positions in at least a somewhat controlled manner. Self-propelled embodiments may achieve their directed motions by means including, but not limited to, rigid sails, ducted electrically-powered fans, air or water propellers, sea anchors, Flettner rotors, and drogue anchors.

Some embodiments of the present disclosure are deployed so as to be free-floating and so as to drift with the ambient winds, currents, and/or other environmental influences that will affect and/or alter its geolocation. Some embodiments of the present disclosure are deployed such that individual devices are anchored and/or moored (e.g. to the seafloor) so as to remain approximately stationary.

Some embodiments of the present disclosure which are anchored or moored are so anchored or moored proximate to other such devices, and may even be moored to one another. These embodiments may be deployed in "farms" and their computers may be directly or indirectly interconnected such that they may interact, e.g., when cooperating to complete various computing tasks. The devices deployed in farms may communicate with computers and/or networks on land by means of one or more subsea data transmission cables, including, but not limited to: fiber optic cables, LAN cables, Ethernet cables, and/or other electrical cables. The devices deployed in farms may communicate with computers and/or networks on land by means of one or more indirect devices, methods, and/or means, including, but not limited to: Wi-Fi, radio, microwave, pulsed and/or modulated laser light, pulsed and/or modulated LED-generated light, and/or satellite-enabled communication.

Some embodiments of the present disclosure which drift and/or are self-propelled, may directly and/or indirectly interconnect their computers so they may interact, e.g. when cooperating to complete various computing tasks. For example, drifting devices may act as clusters within a larger virtual cluster so as to cooperatively complete computing tasks that are larger than individual devices could complete individually. And, for example, self-propelled devices may travel the seas together in relatively close proximity to one another, though not directly connected.

Drifting, and/or self-propelled, devices may communicate with computers and/or networks on land, and/or with each other, by means of one or more indirect devices, methods, and/or means, including, but not limited to: Wi-Fi, radio, microwave, pulsed and/or modulated laser light, pulsed and/or modulated LED-generated light, and/or satellite-enabled communication.

Some embodiments of the present disclosure are deployed so as to be "virtually" interconnected to one or more other devices (e.g., by Wi-Fi, radio, microwave, modulated light, satellite links, etc.), and together to drift with the ambient winds, currents, and/or other environmental influences that will affect and/or alter its geolocation. Some embodiments of the present disclosure are deployed so as to be "virtually" interconnected to one or more other devices (e.g. by Wi-Fi, radio, microwave, modulated light, satellite links, etc.), and, because they are "self-propelled" and/or able to actively influence their geolocation, and/or changes in same, through their manipulation of ambient winds, currents, and/or other environmental influences.

Some embodiments of the present disclosure are deployed so as to be tethered, and to be directly inter-connected, to one or more other devices, wherein one or more of the tethered devices are anchored and/or moored (e.g. to the seafloor) so as to remain approximately stationary, thereby limiting the range of motion and/or position of the entire tethered assembly.

Some embodiments, when directly and/or indirectly inter-connected with one or more other devices, whether drifting or anchored, will link their computers and/or computing networks, e.g. by means of satellite-mediated inter-device communications of data, so as to act, behave, cooperate, and/or compute, as subsets of a larger, integrated, and/or inter-connected set of computers. Such inter-connected and/or cooperating devices may utilize, and/or assign to, a single device (or subset of the inter-connected group of devices) to be responsible for a specific portion, part, and/or subset, of the system-level calculations, estimates, scheduling, data transmissions, etc., on which the group of devices depends.

Types of Propulsion

Some embodiments of the present disclosure propel themselves, at least in part, through their incorporation, use, and/or operation, of devices, technologies, modules, and/or propulsion systems, that include, but are not limited to: rigid sails, ducted fans, electrical-motor-driven propellers, sea anchors, drogues, water jets, the drag forces imparted to an embodiment's one or more wind turbines, submerged, tethered airplane-like kite and/or drone, and/or inflatable water-filled (or emptied) sack.

Types of CPUs/Computing Devices

Some embodiments of the present disclosure incorporate, utilize, energize, and/or operate, computers incorporating CPUs, CPU-cores, inter-connected logic gates, ASICs, ASICs dedicated to the mining of cryptocurrencies, RAM, flash drives, SSDs, hard disks, GPUs, quantum chips, optoelectronic circuits, analog computing circuits, encryption circuits, and/or decryption circuits.

Some embodiments of the present disclosure incorporate, utilize, energize, and/or operate, computers specialized and/or optimized with respect to the computation, and/or types of computation, characteristic of, but not limited to: machine learning, neural networks, cryptocurrency mining, graphics processing, graphics rendering, image object recognition and/or classification, image rendering, quantum computing, quantum computing simulation, physics simulation, financial analysis and/or prediction, and/or artificial intelligence.

Some embodiments of the present disclosure incorporate, utilize, energize, and/or operate, computers that may at least approximately conform to the characteristics typically ascribed to, but not limited to: "blade servers," "rack-mounted computers and/or servers," and/or supercomputers.

Types of Computational Circuits

Some embodiments of the present disclosure incorporate, utilize, energize, and/or operate, at least 100 computing circuits and/or CPUs. Some incorporate, utilize, energize, and/or operate, at least 1,000 computing circuits and/or CPUs. Some incorporate, utilize, energize, and/or operate, at least 2,000 computing circuits and/or CPUs. Some incorporate, utilize, energize, and/or operate, at least 5,000 computing circuits and/or CPUs. Some incorporate, utilize, energize, and/or operate, at least 10,000 computing circuits and/or CPUs.

Some embodiments of the present disclosure utilize computing chips and/or circuits that contain two or more CPUs and/or computing "cores" per chip and/or per circuit. Some embodiments of the present disclosure utilize computing chips and/or circuits that contain a graphics processing unit (GPU) within the chips and/or within a computing circuit. Some embodiments of the present disclosure utilize computing chips and/or circuits that contain a graphics processing unit (GPU) within the chips and/or within a computing circuit.

Types of Computing Tasks

Some embodiments of the present disclosure incorporate, utilize, energize, and/or operate, computers organized, inter-connected, controlled, and/or configured, so as to optimize the loading, execution, and reporting of results, related to arbitrary computational tasks.

These types of arbitrary computational tasks might be typical of services that execute programs for others, and/or provide computational resources with which others may execute their own programs, often in exchange for a fee based on attributes of the tasks and/or resources used, that might include, but would not be limited to: size (e.g. in bytes) of program and/or data executed, size (e.g. in bytes) of data created during program execution and/or returned to the owner of the program, number of computing cycles (number of computational operations) consumed during program execution, amounts of RAM, and/or hard disk space, utilized during program execution, other computing resources, such as GPUs, required for program execution, and the amount of electrical power consumed during and/or by a program's execution.

Embodiments optimized to perform arbitrary computational tasks might utilize "disk-free computing devices" in conjunction with "storage area networks" so as to utilize memory and/or data storage components and/or devices more efficiently.

Some embodiments of the present disclosure incorporate, utilize, energize, and/or operate, computers organized, inter-connected, controlled, and/or configured, so as to optimize the loading, execution, and reporting of results, related to "cryptocurrency (e.g. Bitcoin) mining," i.e. to the calculation of cryptocurrency ledgers, and the identification of suitable ledger-specific "nonce" values (e.g. the search for a "golden nonce"), and/or related to the loading, execution, and reporting of results, related to other "proof of work" programs. The computers, and/or computing resources, of some embodiments are optimized to perform hash functions or other computationally intensive processes so as to calculate "proofs of work" for blockchain-related algorithms.

Some embodiments of the present disclosure incorporate, utilize, energize, and/or operate, computers organized, interconnected, controlled, and/or configured, so as to optimize the loading, execution, and reporting of results, related to neural networks and/or artificially intelligent programs. Some embodiments will facilitate the cooperate execution of programs related to neural networks and/or artificially intelligent programs through the direct, physical, and/or virtual, interconnection of their internal networks and/or computing devices.

Some embodiments of the present disclosure incorporate, utilize, energize, and/or operate, computers organized, interconnected, controlled, and/or configured, so as to optimize the loading, execution, and reporting of results, related to the serving of web pages and/or search results.

Some embodiments of the present disclosure incorporate, utilize, energize, and/or operate, computers organized, interconnected, controlled, and/or configured, so as to optimize the loading, execution, and reporting of results, related to the solving of "n-body problems," the simulation of brains, gene matching, and solving "radar cross-section problems."

Some embodiments of the present disclosure incorporate, utilize, energize, and/or operate, computers organized, interconnected, controlled, and/or configured, so as to optimize the loading, execution, and reporting of results, consistent with the functionality provided by "terminal servers."

Types of Computing Task Management

An embodiment of the present disclosure receives a task from a remote source and/or server. An embodiment receives a task from a radio and/or electromagnetic transmission broadcast by a satellite (e.g. which a plurality of other devices also receive and/or are able to receive). An embodiment receives a task across and/or via a transmission across a fiber-optic cable. An embodiment receives a task across and/or via a transmission across a LAN and/or Ethernet cable.

An embodiment adds the task to a task queue of pending tasks if: it possesses, incorporates, and/or operates, all of the hardware required to complete and/or execute the task efficiently; there is sufficient room in its task queue; there is a sufficient likelihood that it will be able to complete the task no later than any deadline associated with the task; and, the estimated duration of the task's execution is no more than the likely operational time available to the device (e.g. given current energy reserves, current power generation levels, etc.). When an embodiment begins execution of a task, it marks the task as "in-progress" and sets a "timeout" value, after which the task will be restarted if not yet complete.

In an embodiment, when the embodiment determines that the level of its power generation has decreased, and the continued and/or continuous operation of its currently "active" computing devices and/or circuits can no longer be sustained, then it stops execution of a sufficient number of its most-recently started computational tasks, and powers down the corresponding computing devices and/or circuits, so that, for instance, there will remain sufficient power to complete the computation of the remaining tasks using the still-active computing devices and/or circuits.

An embodiment transmits the results of a completed task to a remote source and/or server (e.g. the remote source and/or server from which the task originated). After receipt and/or validation of the completed-task results, the remote source and/or server broadcasts to all of the devices which (would have been expected to have) received the now-completed task, a message and/or signal to indicate that the task has been completed. Each of the devices receiving the "task-completed" message and/or signal then removes that task from its task queue, and terminates execution of the task if the execution of the task is in progress.

An embodiment facilitates the receipt of the same task by a plurality of devices, each of which may elect to place the task in its respective task queue, and/or to execute the task when sufficient computing resources and/or energy are available.

In addition to the results of a task, an embodiment also returns to a remote source and/or server, information that is sufficient to allow the benefactor of the task's execution to be charged and/or billed an amount of money consistent with a payment contract. Such "billing-relevant information" might include, but is not limited to, the following: size (e.g. in bytes) of the program executed; size (e.g. in bytes) of the results generated; amount (e.g. in bytes) of RAM required to complete the program's execution; number of instruction cycles required to complete the program's execution; number of CPUs required to complete the program's execution; number and/or cycles required of GPUs to complete the program's execution; amount of energy (e.g. kWh) expended to complete the execution of the program; degree of requested task priority that influenced priority of task execution; degree and/or percentage of available computing resources busy with other tasks at time of task execution (e.g. level of demand at time of task execution); amount of task-results data (e.g. in bytes) returned to the remote source and/or server; cost for satellite bandwidth consumed (e.g. bytes) and/or required in order to transmit task and associated data to device; and/or cost for satellite bandwidth consumed (e.g. bytes) and/or required in order to transmit task results to remote source and/or server.

An embodiment of the present disclosure sends task-execution-specific data, messages, and/or signals, to a remote source and/or server which indicate, among other things: which tasks are waiting in a task queue; which tasks are being executed; estimated time remaining to complete execution of tasks being executed; an estimate of the amount of energy required to complete tasks being executed; an estimate of the rate of electrical power generation; an estimate of the amount of shared memory required to complete tasks being executed; and an estimate of the amount of shared memory currently available.

A global task controlling and/or coordinating computer and/or server may use such task-execution-specific data in order to forecast which tasks are likely to be successfully completed by a future time. And, if the likelihood of a particular task's completion by a future time is sufficiently great then other devices notified at an earlier time of the task, and potentially storing the task in their respective task queues, may be notified of that task's likely completion by a device. Those other devices may then elect to reduce the priority of the task, or to remove it from their task queues.

Types of Computing-Task Processing

Some embodiments of the present disclosure execute encrypted programs and/or data for which a decryption key, algorithm, and/or parameter, is not available, nor accessible, to other tasks, programs, and/or computing circuits and/or devices, on the respective embodiments. Some embodiments of the present disclosure execute encrypted programs and/or data for which a decryption key, algorithm, and/or parameter, is not available, nor accessible, to an embodiment device, nor to the remote source(s) and/or server(s) which transmitted the encrypted program and/or data to the device.

Some embodiments of the present disclosure simultaneously execute two or more encrypted programs that are encrypted with different encryption keys, algorithms, and/or parameters, and must be decrypted with different decryption keys, algorithms, and/or parameters. Some embodiments of the present disclosure utilize a plurality of CPUs and/or computing circuits to independently, and/or in parallel, execute (copies of) the same program, operating on (copies of) the same data set, wherein each execution will nominally and/or typically produce identical task results.

Some embodiments of the present disclosure comprise multiple buoys each containing a plurality of CPUs and/or computing circuits, wherein a plurality of CPUs and/or computing circuits on a first buoy, and a plurality of CPUs and/or computing circuits on a second buoy, all simultaneously: execute in parallel (copies of) the same program; operate on (copies of) the same data set; search for a "golden nonce" value for the same cryptocurrency block and/or blockchain block; perform in parallel the same computational task; or perform in parallel a divide-and-conquer algorithm pertaining to the same computational task.

Some embodiments of the present disclosure utilize a plurality of CPUs and/or computing circuits to execute the same program, operating on the same data set, in a parallelized fashion wherein each individual CPU and/or computing circuit will execute the program with respect to a portion of the full data set, thereby contributing piecemeal to the complete execution of the task.

Types of Data Transmission

Some embodiments of the present disclosure communicate data to and from a remote and/or terrestrial digital data network and/or internet, and/or exchange data with other computers and/or networks remote from the embodiment, and/or not physically attached to, nor incorporated within, the embodiment, by means of "indirect network communication links" which include, but are not limited to: satellite, Wi-Fi, radio, microwave, modulated light (e.g. laser, LED), "quantum-data-sharing network" (e.g., in which quantum entangled atoms, photons, atomic particles, quantum particles, etc., are systematically altered so as to transmit data from one point [e.g., the location of one particle] to another point [e.g., the location of another particle]), as well as: fiber-optic cable(s), LAN cable(s), Ethernet cable(s), and/or other electrical and/or optical cables.

Some free-floating embodiments of the present disclosure, as well as some anchored and/or moored embodiments that are not directly connected to land by means of a cable, utilize one or more indirect network communication links, including, but not limited to: satellite, Wi-Fi, radio, microwave, modulated light (e.g. laser, LED).

Some embodiments of the present disclosure which communicate with other and/or terrestrial data transmission and/or exchange networks transmit data to a remote receiver by means of modulated light (e.g. laser or LED) which is limited to one or more specific wavelengths and/or ranges of wavelengths. The sensitivity of the remote receiver is then improved through the receiver's use of complementary filter(s) to exclude wavelengths of light outside the one or more specific wavelengths and/or ranges of wavelengths used by the transmitting embodiment. A remote receiver might utilize multiple such wavelength-specific filters, e.g. utilize one at a time, so as to limit and/or discriminate its receipt of data to that transmitted from one or more specific devices at a time and/or from among many such devices, each of which, and/or each subset of which, utilizes a specific wavelength(s) and/or range(s) of wavelengths.

Some embodiments of the present disclosure which communicate with other and/or terrestrial data transmission and/or exchange networks transmit data to a remote receiver by means of modulated light (e.g. laser or LED) receive data from a remote transmitter by means of modulated light (e.g. laser or LED) which is limited to one or more specific wavelengths and/or ranges of wavelengths. The sensitivity of the embodiment's receiver is then improved through the receiver's use of complementary filter(s) to exclude wavelengths of light outside the one or more specific wavelengths and/or ranges of wavelengths used by the transmitting remote transmitter.

Some embodiments of the present disclosure exchange data with neighboring and/or proximate other and/or complementary devices through the use of one wavelength, one range of wavelengths, and/or one set of wavelengths. And some of these embodiments exchange data with terrestrial and/or remote network nodes linked to remote network(s) and/or remote computer(s) through the use of another and/or different wavelength, another and/or different range of wavelengths, and/or another and/or different set of wavelengths.

Some embodiments of the present disclosure exchange data with neighboring and/or proximate other and/or complementary devices through the use of one or more types and/or channels of data communication and/or transmission, e.g. Wi-Fi, modulated light, radio, and/or microwave, while exchanging data with remote computer(s) and/or network(s) (e.g. the internet) through the use of one or more other and/or different types and/or channels of data communication and/or transmission, e.g. satellite.

Some embodiments of the present disclosure exchange data with neighboring and/or proximate other and/or complementary devices, and/or remote and/or terrestrial computers and/or networks, through data passed to, from, through, and/or between, aerial drones, surface water drones, underwater drones, balloon-suspended transmitter/receiver modules, devices, or systems, manned airplanes, boats, and/or submarines.

Some embodiments of the present disclosure exchange data with neighboring and/or proximate other and/or complementary devices, and/or remote and/or terrestrial computers and/or networks, through data passed to, from, through, and/or between, underwater transmitter/receiver modules, devices, or systems drifting on, and/or in, the body of water, and/or modules, devices, or systems resting on, and/or attached to, the seafloor, by means including, but not limited to, the generation, detection, encoding, and/or decoding, of acoustic signals, sounds, and/or data.

Some embodiments of the present disclosure receive "global" transmissions of data from a remote and/or terrestrial computer and/or network via a single channel, frequency, wavelength, and/or amplitude modulation, broadcast by a satellite, radio, microwave, modulated light, and/or other means of electro-magnetic data transmission, e.g. said transmission is received and processed by multiple discrete devices simultaneously. Some of these embodiments transmit device-specific, and/or device-group-specific (e.g. two or more "cooperating" devices, two or more devices whose device-specific computer(s) and/or computer network(s) are linked, e.g. by Wi-Fi), on other and/or different channels, frequencies, wavelengths, and/or amplitude modulations, to a compatible and/or complementary receiver on a satellite, and/or other receiver of radio, microwave, modulated light, and/or other means of electro-magnetic data transmissions.

In some deployments of some embodiments of the present disclosure, a satellite will broadcast to a plurality of the deployed devices, on a channel and/or frequency shared by many, if not all, of the devices in a deployment, information including, but not limited to: data, tasks, requests for information (e.g. status of tasks, geolocation of a device or group of devices, amount(s) of energy available for computational tasks and/or for locomotion, amount of electrical power being generated in response to the current wave conditions of a device and/or group of devices, status of computational hardware and/or networks, e.g. how many devices are fully functional and/or how many are non-functional, status of power-generating hardware and/or associated electrical and/or power circuits, e.g. how many power take-off assemblies and/or generators are fully functional and/or how many are non-functional, how many energy storage components (e.g. batteries) are fully functional and/or how many are non-functional, etc.).

In some deployments of some embodiments of the present disclosure, a satellite will broadcast to a specific deployed device, and/or subset or group of deployed devices, on a channel and/or frequency specific to the device, and/or subset or group of deployed devices, information including, but not limited to: device- or group-specific data (e.g. which range of Bitcoin nonce values to evaluate), device- or group-specific tasks (such as which types of observation to prioritize, e.g. submarines), requests for information (e.g. wave conditions at location of device), etc.

In some deployments of some embodiments of the present disclosure, each device, or subset of devices, will broadcast to a satellite on a channel and/or frequency specific to the device, or subset of devices, (i.e. and not shared by other devices in a deployment) information including, but not limited to: data, task results (e.g. Bitcoin ledgers and corresponding nonce values), requests for information (e.g. new tasks, weather and/or wave forecasts for a given geolocation, results of self-diagnostics on hardware, software, memory integrity, etc., status of computational hardware and/or networks, e.g. how many devices are fully functional and/or how many are non-functional, status of power-generating hardware and/or associated electrical and/or power circuits, e.g. how many power take-off assemblies and/or generators are fully functional and/or how many are non-functional, how many energy storage components (e.g. batteries) are fully functional and/or how many are non-functional, observations (e.g. visual, audio, radar) of aircraft, observations of other floating vessels, observations of submarines, observations of marine life, observations of weather and/or wave conditions, environmental sensor readings, etc.).

Types of Antennas

Some embodiments of the present disclosure use one or more antennas, and/or one or more arrays of antennas, to facilitate communication, coordination, and/or the transfer of data, with a land-based receiver, one or more other embodiments and/or instances of the same embodiment, airborne drones, surface water drones, submerged drones, satellites, and/or other receivers and/or transmitters utilizing one or more antennas.

There are embodiments of the present disclosure that utilize types of antennas including, but not limited to, the following: parasitic antennas including, but not limited to: Yagi-Uda antennas, Quad antennas, wire antennas, loop antennas, dipole antennas, half-wave dipole antennas, odd multiple half-wave dipole antennas, short dipole antennas, monopole antennas, electrically small loop antennas, electrically large loop antennas, log periodic antennas, bow-tie antennas, travelling wave antennas including, but not limited to: helical antennas, Yagi-Uda antennas, microwave antennas including, but not limited to: rectangular micro-strip antennas, planar inverted-F antennas, reflector antennas including, but not limited to: corner reflector antennas, parabolic reflector antennas, multi-band antennas, and separate transmission and receiving antennas. There are embodiments of the present disclosure that utilize types of antenna arrays including, but not limited to, the following: driven arrays including, but not limited to: arrays of helical antennas, broadside arrays including, but not limited to: collinear arrays, planar arrays including, but not limited to: those composed of unidirectional antennas, reflective arrays including, but not limited to: half-wave dipole antennas in front of a reflecting screen, curtain arrays, microstrip antennas (e.g., comprised of arrays of patch antennas), phased arrays including, but not limited to: those with analog and/or digital beamforming, those with crossed dipoles, passive electronically scanned arrays, active electronically scanned arrays, low-profile and/or conformal arrays, smart antennas, reconfigurable antennas, and/or adaptive arrays, in which: a receiving array that estimates the direction of arrival of the radio waves and electronically optimizes the radiation pattern adaptively to receive it, synthesizing a main lobe in that direction, endfire arrays including, but not limited to: log periodic dipole arrays, parasitic arrays including, but not limited to: endfire arrays consisting of multiple antenna elements in a line of which only one is a driven element (i.e., connected to a transmitter or receiver), log periodic dipole arrays, Yagi-Uda antennas, and Quad antennas.

Embodiments of the present disclosure incorporate on an upper deck or upper surface (especially, across over 50% of an upper deck or upper surface) a phased array of antennas utilizing digital beamforming, and also optionally utilizing gyroscopes and/or accelerometers to track changes in the orientation of the embodiment's buoy in order to reduce the latency between such changes and corresponding corrections to the gain and/or directionality of the phased array's beam, e.g., to preserve an optimal beam orientation with respect to a satellite.

Another embodiment of the present disclosure incorporates on an upper deck of its buoy a phased array transmitting and receiving electromagnetic radiation of at least two frequencies, wherein the beamwidth of a first frequency is significantly greater, than the beamwidth of a second frequency. Such an embodiment uses the beam of the first frequency to localize and track a target receiver and/or transmitter, e.g., a satellite, adjusts the angular orientation and/or beamwidth of the beam of the second frequency so as to optimize the that second beam's gain with respect to the target receiver and/or transmitter.

Another embodiment of the present disclosure incorporates dipoles attached to the periphery of the buoy and oriented radially about the periphery of the embodiment's deck (with respect to a vertical longitudinal axis of the embodiment and/or its buoy). The dipoles benefit from the proximate ground plane created by the sea and its surface, wherein the sea and/or its surface reflect upward any beam lobe that might have otherwise been directed downward, thus increasing the gain of the upward beam.

Types of Inter-Device Data Sharing

Some embodiments of the present disclosure facilitate communication, coordination, and/or the transfer of data, between two or more of their respective computing devices and/or circuits by means of a common distributed network, e.g. Ethernet, TCP/IP.

Some embodiments of the present disclosure facilitate communication, coordination, and/or the transfer of data, between the computers, circuits, and/or internal and/or physical networks on, and/or incorporated within, two or more devices by means of virtual and/or electromagnetic network connections and/or links, e.g. WAN, Wi-Fi, satellite-mediated, radio, microwave, and/or modulated light.

The devices of such embodiments share data, programs, and/or otherwise cooperate, without the benefit of a physical network connection.

Some embodiments of the present disclosure transmit, receive, transfer, share, and/or exchange, data by means of acoustic and/or electrical signals transmitted through the seawater on which they float. By inducing localized sounds, acoustic signals, electrical currents, and/or electrical charges, within the seawater that surrounds it, an embodiment can create acoustic and/or electrical signals in the seawater that travel through the seawater, and/or radiate away from the device within the seawater, and can be detected and/or received by one or more other similar devices. In this way, a two-way exchange of data, as well as broadcasts of data from one device to many others, can be completed, executed, and/or realized.

Some embodiments of the present disclosure may facilitate the sharing, and/or exchange, of data between widely separated devices, e.g. devices which are so distant from one another that line-of-sight communication options, e.g. modulated light, are not available, by daisy-chaining inter-device communications, signals, transmissions, and/or data transfers. Data may be exchanged between two widely separated devices through the receipt and re-transmission of that data by devices located at intermediate positions.

Some embodiments of the present disclosure transmit, receive, transfer, share, and/or exchange, data by means of light and/or "flashes" shined on, and/or reflected or refracted by, atmospheric features, elements, particulates, droplets, etc. An embodiment will encode data (and preferably first encrypt the data to be transmitted) into a series of modulated light pulses and/or flashes that are projected into the atmosphere in at least an approximate direction toward another such device. The receiving device, e.g. through the use of wavelength-specific filters, and/or temporally-specific frequency filters, will then detect at least a portion of the transmitted light pulses and decode the encoded data. The return of data by the receiving device is accomplished in a similar manner.

Such a "reflected and/or refracted and light-modulated" data stream can be made specific to at least a particular wavelength, range of wavelengths, pulse frequency, and/or range of pulse frequencies. By such a data communication scheme and/or process, an individual device can be configured to transmit data to one or more individual other devices (e.g. on separate wavelength-specific channels), and/or to a plurality of other devices. It can be configured to receive data from one or more individual other devices (e.g. on separate wavelength-specific channels), and/or to a plurality of other devices.

Types of Data Transmission Networks

Some embodiments of the present disclosure interconnect at least some of their computing devices with, and/or within, a network in which each of a plurality of the computing devices are assigned, and/or associated with, a unique internet, and/or "IP" address. Some embodiments of the present disclosure interconnect at least some of their computing devices with, and/or within, a network in which a plurality of the computing devices are assigned, and/or associated with, a unique local subnet IP address.

Some embodiments of the present disclosure interconnect at least some of their computing devices with, and/or within, a network that incorporates, includes, and/or utilizes, a router. Some embodiments of the present disclosure interconnect at least some of their computing devices with, and/or within, a network that incorporates, includes, and/or utilizes, a modem. Some embodiments of the present disclosure interconnect at least some of their computing devices with, and/or within, a network that incorporates, includes, and/or utilizes, a "storage area network."

Types of Cooling

Some embodiments of the present disclosure passively cool their computing devices by facilitating the convective transmission of heat from the computing devices and/or their environment to the water on which the device floats, e.g. through a thermally conductive wall, and/or fins or heat baffles, separating the devices from the water. Some embodiments of the present disclosure passively cool their computing devices by facilitating the convective transmission of heat from the computing devices and/or their environment to the air above the water on which the device floats, e.g. through a thermally conductive wall, and/or fins or heat baffles, separating the devices from the air. Some embodiments of the present disclosure actively cool their computing devices by means of a heat exchanger that absorbs heat from the computing devices and/or their environment, and carries it to a heat exchanger in thermal contact with the water on which the device floats and/or the air above that water. Such thermal contact may be the result of direct exposure of the exchanger with the air and/or water, or it may be the result of indirect exposure of the exchanger with the air and/or water by means of the exchanger's direct contact with a wall or other surface in direct or indirect contact with the air and/or water.

Much, if not all, of the energy imparted to computational devices within an embodiment of the present disclosure will become heat. And, excessive levels of heat might damage or impair those computational devices. Therefore, it is prudent for an embodiment to remove heat from its "active" computational devices as quickly and/or efficiently as possible, and/or quickly enough to avoid excessive heating of the computational devices.

Some embodiments of the present disclosure facilitate the passive convective cooling of at least some of their computational devices, and/or of the ambient environments of those computation devices. Some embodiments of the present disclosure actively remove heat from their computational devices, and/or from the ambient environments of those computational devices. Some embodiments of the present disclosure passively cool their computing devices, and/or of the ambient environments of their computing devices, by providing a thermally conductive connection between the computing devices and the water on which the embodiment floats. Some embodiments promote this conduction of heat from the computing devices to the ambient water by using "fins" and/or other means of increasing and/or maximizing the surface area of the conductive surface in contact with the water. Some embodiments promote this conduction of heat from the computing devices to the ambient water by using "fins" and/or other means of increasing and/or maximizing the surface area of the conductive surface in contact with the computing devices and/or the ambient environments of their computing devices. Some embodiments promote this conduction of heat from the computing devices to the ambient water by using copper and/or copper/nickel heatsink poles and/or plates extending into the water and/or into the chamber(s) in which at least a portion of the embodiment's computing devices are located.

Some embodiments of the present disclosure passively cool their computing devices, and/or of the ambient environments of their computing devices, by providing a thermally conductive connection between the computing devices and the air that surrounds the embodiment. Some embodiments promote this conduction of heat from the computing devices to the ambient air by using "fins" and/or other means of increasing and/or maximizing the surface area of the conductive surface in contact with the water. Some embodiments promote this conduction of heat from the computing devices to the ambient air by using "fins" and/or other means of increasing and/or maximizing the surface area of the conductive surface in contact with the computing devices and/or the ambient environments of their computing devices.

Some embodiments of the present disclosure are positioned within sealed chambers containing air, nitrogen, and/or another gas or gases. Some embodiments of the present disclosure are positioned within chambers into which air, nitrogen, and/or another gas or gases, are pumped.

Some embodiments of the present disclosure promote the conduction of heat from their computing devices to the ambient air and/or water by immersing, surrounding, bathing, and/or spraying, the computing devices with and/or in a thermally conductive fluid and/or gas. The thermally conductive fluid and/or gas is ideally not electrically conductive, as this might tend to short-circuit, damage, and/or destroy, the computing devices. The thermally conductive fluid and/or gas ideally has a high heat capacity that allows it to absorb substantial heat without experiencing a substantial increase in its own temperature. The thermally conductive fluid and/or gas carries at least a portion of the heat generated and/or produced by at least some of the computing devices to one or more other thermally conductive interfaces and/or conduits through which at least a portion of the heat may pass from the fluid and/or gas to the ambient air or water proximate to the embodiment. In some embodiments, the thermally conductive fluid and/or gas has a boiling point such that the fluid bathes computing circuits in its liquid phase, and it boils into a gas due to the heat transferred from said circuits, carrying said heat away from the circuits, and then condenses on a heat exchange surface that communicates said heat to the external water or air.

Because a computing device operating in an air environment (e.g. inside a compartment or module on and/or within an embodiment of the present disclosure) may not transmit heat with sufficient efficiency to prevent and/or preclude an overheating of the computing device, the use, by some embodiments, of a thermally conductive fluid and/or gas to facilitate the passage of heat from the various components (e.g. the CPUs) within the computing devices to the ambient air or water proximate to the embodiment may reduce the risk of overheating, damaging, and/or destroying some, if not all, of the computing devices therein.

Some embodiments of the present disclosure provide improved "buffering" of the heat that they absorb from their respective computing devices, while that heat is being transmitted to the surrounding air and/or water through their use of, and/or surrounding of at least some of their respective computing devices with, a fluid that boils from a fluid into a gas within the operational temperature range between that of the external water/air and that of the high-temperature surfaces of the computing circuits around which the fluid is disposed.

An embodiment of the present disclosure may cool its computing systems, and/or other heat-generating components and/or systems, by means, systems, modules, components, and/or devices, the include, but are not limited to, the following: closed-circuit heat exchangers that transfer heat from the source to a heat sink (e.g., the air or water around an embodiment), wherein at least one end of the closed-circuit heat exchanger is: in contact with an interior water-facing wall, in contact with an interior air-facing wall, incorporates ribs to increase the surface area, in contact with water and/or in contact with air, positioned inside a duct, tube, and/or channel, of an OWC, in contact with a duct, tube, and/or channel, of an OWC, mounting of computing modules: in air and/or in water, against interior walls facing air and/or water, wherein the mounting chamber or location incorporates ribs, within spires projecting up from deck, within spires projecting down into water.

A significant advantage of embodiments of the present disclosure is that a large number of computing devices can be deployed in such a way (i.e. within a large number of embodiments) that relatively the large number of computing devices is partitioned into relatively small groups, which, in addition to being powered, at least in part, by the energy available in the environment proximate to each embodiment, and the relatively small number of computing devices therein, are also immediately adjacent, and/or proximate, to a heat sink characterized by a relatively cool temperature and a relatively large heat capacity, i.e. the sea, and the wind that flows above it. By deploying relatively small numbers of computing devices in self-powered and passively cooled autonomous units, environmental energy is used with maximal efficiency (e.g. without suffering the losses and costs associated with transmitting the power to shore), and requisite cooling is accomplished with minimal, if any, expenditure of energy.

By contrast, the concentration of larger numbers of computing devices, e.g. the number of computing devices that might be associated with hundreds or thousands of embodiments of the present disclosure, requires that power be generated elsewhere and transmitted to the concentrated collection(s) of computing devices, thereby increasing costs and incidental losses of energy, and that heat be actively and energetically removed from the "mass(es)" of computing devices, concentrated in a relatively small space, and/or volume, by means requiring significant expenditure of capital and additional energy.

Energy Management

Some embodiments of the present disclosure activate and deactivate subsets of their computers, thereby changing and/or adjusting the number and/or percentage of their computers that are active at any given time, in response to changes in wave conditions, and/or changes in the amount of electrical power generated by the power takeoffs of their respective devices, so as to match the amount of power being consumed by the computers to the amount being generated.

Some embodiments of the present disclosure incorporate, and/or utilize components and/or mechanism, including, but not limited to: batteries, capacitors, springs, components, features, circuits, devices, processes, and/or chemical fuel (e.g. hydrogen) generators and storage mechanisms. These energy storage mechanisms permit the embodiments to store, at least for a short time (e.g. 10-60 seconds), at least a portion of the electrical and/or mechanical energy generated by the embodiment in response to wave motion. Such energy storage may have the beneficial effect of integrating and/or smoothing the generated electrical power.

Some embodiments, when tethered to other devices, may further stabilize their own energy supplies, as well as helping to stabilize the energy supplies of other tethered devices, by sharing electrical energy, batteries, capacitors, and/or other energy storage means, components, and/or systems, and/or by sharing and/or distributing generated power, across a shared, common, and/or networked power bus and/or grid. This capability and deployment scenario will facilitate the ability of some tethered collections and/or farms of devices to potentially utilize a smaller total number of batteries, capacitors, and/or other energy storage means, components, and/or systems, since the sharing of such components, systems, and/or reserves will tend to reduce the amount of energy that any one device will need to store in order to achieve a certain level of stability with respect to local variations in generated power and/or computing requirements.

Such energy storage, especially if a sufficiently great amount of energy may be thus stored, may allow device to continue powering a total number of computers than could be directly powered by any instantaneous level of generated electrical power. For example, an embodiment able to store enough power to energize all of its computers for a day in the absence of waves, may be able to avoid reducing its number of active computers during a "lull" in the waves, and continue energizing them until the waves resume.

Some embodiments of the present disclosure apply, consume, utilize, and/or apply, at least 50% of the electrical power that they generate to the energizing, and/or operation, of their respective computing devices and/or circuitry. Some embodiments of the present disclosure apply, consume, utilize, and/or apply, at least 90% of the electrical power that they generate to the energizing, and/or operation, of their respective computing devices and/or circuitry. Some embodiments of the present disclosure apply, consume, utilize, and/or apply, at least 99% of the electrical power that they generate to the energizing, and/or operation, of their respective computing devices and/or circuitry.

Some embodiments of the present disclosure incorporate, utilize, energize, and/or operate, with a "power usage effectiveness" (PUE) of no more than 1.1. Some embodiments of the present disclosure incorporate, utilize, energize, and/or operate, with a "power usage effectiveness" (PUE) of no more than 1.01. Some embodiments of the present disclosure incorporate, utilize, energize, and/or operate, with a "power usage effectiveness" (PUE) of no more than 1.001.

Some embodiments of the present disclosure turn at least a portion of their respective computing devices on and off so as to at least approximately match the amount of electrical power being consumed by their respective "active" (i.e. energized, working, operating, computing, and/or functioning) computing devices, to the amount of electrical power being generated by the embodiments, and/or the rate at which the embodiments are extracting energy from the waves that buffet them.

The power profile of a wave energy converter can be irregular, i.e. it can generate large amounts of power for a few seconds, followed by a pause of a few seconds when no power is generated. ASIC chips designed to computing hash values for the "mining" of cryptocurrencies can typically compute many millions of hash values per second. In some embodiments, energy control circuits turn on and energize ASICs and/or CPUs when the wave energy converter is generating power, and de-energize ASICs when the wave energy converter is not generating power. In some embodiments, energy control circuits energize a quantity of ASICs that corresponds and/or is roughly proportional to the amount of power the wave energy converter is presently generating. In this manner, the amount of required power storage and/or buffering equipment can be reduced. In some embodiments, computing circuitry is energized and de-energized on a second-by-second basis. In some embodiments, it is energized and de-energized on a millisecond by millisecond basis.

Some embodiments of the present disclosure turn at least a portion of their respective computing devices on and off so as to at least approximately match the amount of electrical power that their own computers forecast and/or estimate that they will generate at a future time. Some embodiments of the present disclosure turn at least a portion of their respective computing devices on and off so as to at least approximately match the amount of electrical power that has been forecast and/or estimated by a computer on another device, and/or on a computer at another remote location, that they will generate at a future time.

Some embodiments of the present disclosure select those tasks that they will attempt to compute and/or execute so as to at least approximately match the amount of future computing power, and/or the amount of time, required to complete those tasks will at least approximately match a forecast and/or estimated of computing power, and/or operational time, that will be available to the embodiment at a future time.

Some embodiments of the present disclosure, when deployed within a farm configuration in which the devices are collectively electrically connected to one or more terrestrial and/or other sources of electrical power, may, e.g. when their power generation exceeds their computing power requirements, send excess generated electrical power to shore. Conversely, devices deployed in such a farm configuration, in which the devices are collectively electrically connected to one or more terrestrial and/or other sources of electrical power, may, when their computing demands require more electrical energy than can be provided through the conversion of wave energy (e.g. when waves are small), draw energy from those one or more terrestrial sources of power so as to continue computing and/or recharge their energy reserves.

Military/Rescue/Research

Some embodiments of the present disclosure may present tethers, mooring lines, cables, arms, sockets, berths, chutes, hubs, indentations, and/or connectors, to which another vessel may attach, and/or moor, itself. Some embodiments of the present disclosure may present connectors, protocols, APIs, and/or other devices or components or interfaces, by and/or through which energy may be transferred and/or directed to be transferred from the embodiments to another vessel. The vessels that might receive such energy include, but are not limited to: autonomous underwater vehicles, autonomous surface vessels, autonomous aircraft; and/or manned underwater vehicles (e.g. submarines), manned surface vessels (e.g. cargo and/or container ships), and manned aircraft (e.g. helicopters).

Some of the vessels to which energy may be transferred and/or transmitted may possess weapons. Some embodiments of the present disclosure may detect, monitor, log, track, identify, and/or inspect (e.g. visually, audibly, and/or electromagnetically), other vessels passing within a sufficiently short to distance of a device such that at least some of the device's sensors are able to detect, analyze, monitor, identify, characterize, and/or inspect, such other vessels. Aircraft operating near some embodiments are detected and/or characterized by means and/or methods that include, but are not limited to: visually (e.g. with one or more cameras, detecting one or more wavelengths of light, including, but not limited to visible light and infrared light), the detection of specific, e.g. engine-related, noises, the detection of electromagnetic emissions and/or radiation (e.g. radio transmissions and heat), the detection of gravimetric distortions, the detection of magnetic distortions, the detection of changes in ambient radioactivity, the detection of gamma-ray emissions, and/or the detection of noise and/or other vibrations induced in the water on which the device floats.

Surface vessels operating near some embodiments are detected and/or characterized by means and/or methods that include, but are not limited to: visually (e.g. with one or more cameras, detecting one or more wavelengths of light, including, but not limited to visible light and infrared light), the detection of specific, e.g. engine-related, noises and/or vibrations, especially those that might be transmitted through and/or in the water on which the device floats, the detection of electromagnetic emissions and/or radiation (e.g. radio transmissions and heat), the detection of gravimetric distortions, the detection of magnetic distortions, the detection of changes in ambient radioactivity, the detection of gamma-ray emissions, and/or the detection of observed changes in the behavior of local marine organisms (e.g. the direction in which a plurality of fish swim).

Sub-surface vessels operating near some embodiments are detected and/or characterized by means and/or methods that include, but are not limited to: the detection of specific, e.g. engine-related, noises and/or vibrations, transmitted through and/or in the water on which the device floats, the detection of electromagnetic emissions and/or radiation (e.g. radio transmissions and heat), the detection of gravimetric distortions, the detection of magnetic distortions, the detection of changes in ambient radioactivity, the detection of gamma-ray emissions, the detection of changes in the behavior of local marine organisms (e.g. the direction in which a plurality of fish swim), and/or the detection of changes in the volume and/or clarity of ambient noises nominally and/or typically generated by marine organisms, geological phenomena (e.g. volcanic and/or seismic events), current-induced noises (e.g. water movements around geological formations), and/or reflected noises (e.g. the noise of overpassing planes reflecting in specific patterns off the seafloor).

A plurality of devices able to exchange data, message, and/or signals, and/or otherwise interconnected, may obtain high-resolution information about the nature, structure, behavior, direction, altitude and/or depth, speed, condition (e.g. damaged or fully functional), incorporation of weapons, etc., through the sharing and synthesis of the relevant data gathered from the unique perspectives of each device.

Some embodiments of the present disclosure may transmit, e.g. via satellite, to a remote computer and/or server, the detection, nature, character, direction of travel, speed, and/or other attributes, of detected, monitored, tracked, and/or observed, other vessels. Some embodiments may be able to receive, e.g. via satellite, and respond to commands and/or requests for additional types of observations, sensor readings, and/or responses, including, but not limited to: the firing of missiles, the firing of lasers, the emission of electromagnetic signals intended to jam certain radio communications, the firing of torpedoes, the vigilant tracking of specific vessels (e.g. a prioritization of the tracking and/or monitoring of specific vessels over other nearby vessels), the release of tracking devices, the emission of misleading electromagnetic transmissions (e.g. to mislead GPS readings, to mimic radio beacons and/or radars, etc.) . . . even the self-destruction of the device itself.

Some embodiments of the present disclosure may present connectors, interfaces, APIs, and/or other devices or components, by and/or through which data may be exchanged between the embodiment and another vessel. Such other vessels might utilize such a data connection in order to obtain cached data, messages, signals, commands, and/or instructions, preferably encrypted, transmitted to the device from a remote source and/or server, and stored within the device, and/or within a plurality of devices, any one of which may be accessed by another vessel for the purpose of obtaining command and control information.

Such embodiments may facilitate the transmission of data, messages, status reports, and/or signals, preferably encrypted, from the other vessels to the remote source and/or server, especially by masking the source of any such transmission within equivalent, but potentially meaningless, transmissions from a plurality, if not from all, other devices. If all of the devices of such an embodiment regularly transmit blocks of encrypted and/or fictitious data to a particular remote source and/or server, then the replacement of one device's block of data with actual data (the nature and/or relevance of which might only be discernable to a receiver with one or more appropriate decryption keys, algorithms, and/or parameters) will effectively hide the location of any and/or all such other vessels with respect to the detection of such data transmissions. This mechanism of hiding the location of a device to which another vessel is connected is particularly useful when the other vessel is a submersible and/or submarine, since it would presumably also be hidden from visual and (while at rest, connected to a device) audio detection.

Dual-Purpose Buoys

Some embodiments of the present disclosure, when deployed in anchored farms of devices, will send electricity back to an onshore electrical power grid via a subsea electrical power cable. However, when the electrical demands of that terrestrial grid are not high, and/or the price of electrical power sold into that grid is too low, then some or all of the devices in the farm may perform computations, such as Bitcoin mining and/or arbitrary or custom computational tasks for third parties, in order to generate revenue and/or profits.

Some embodiments of the present disclosure, when deployed in anchored farms of devices, or when free-floating, especially as individual devices, will primarily generate and store electrical energy that may then be transmitted conductively and/or inductively to autonomous vessels and/or aircraft (i.e. "drones") via charging connections and/or pads. However, when any connected drones are fully charged and/or a device's energy stores are full, then the device may consume any surplus generated electrical power performing computations, such as Bitcoin mining and/or arbitrary or custom computational tasks for third parties, in order to generate revenue and/or profits. Such a dual purpose may also facilitate the role of device in charging drones, and/or may facilitate the hiding of drones when the ratio of devices to drones is high.

Some embodiments of the present disclosure, when deployed in anchored farms of devices, or when free-floating, especially as individual devices, will primarily energize, operate, and monitor various sensors, such as, but not limited to: sonar, radar, cameras, microphones, hydrophones, antennae, gravimeters, magnetometers, and Geiger counters, in order to monitor their environments (air and water) in order to detect, monitor, characterize, identify, and/or track other vessels and/or aircraft, or to survey the ocean floor for minerals and other characteristics. However, when there are no proximate vessels and/or aircraft to track, then a device might utilize some of its underutilized electrical energy (and computational power) in order to perform computations, such as Bitcoin mining and/or arbitrary or custom computational tasks for third parties, in order to generate revenue and/or profits.

Utility

The current disclosure offers many potential benefits, including, but not limited to: a decoupling of computing power (e.g. available CPUs and/or instructions per second) from the typically correlated supporting and/or enabling requirements, e.g., such as those associated with the construction, operation, and/or maintenance, of data centers and/or server farms.

These requirements include the need that sufficient electrical power be provided to energize a large number of computers. In order to transmit large amounts of electrical power into concentrated collections of computers, it is typically necessary to bring the power to the collections of computers at a high voltage and/or a high current. However, since individual computers, computing devices, and/or computing circuits, require electrical power that is typically of a lower voltage and/or current, it is often necessary and/or preferred to partition the high-energy electrical power into multiple circuits of lower-energy power. These changes in voltage and/or current can result in some loss of energy and/or efficiency.

These requirements include the need to remove heat, and/or introduce cooling, fast enough to compensate for the significant amounts of heat that are generated by highly concentrated and extensive collections of electrically-powered computing devices. Such cooling is relatively energy intensive, e.g. significant electrically-powered refrigeration, fans, pumped liquid heat exchangers, etc.

Embodiments of the present disclosure obtain relatively small amounts of electrical power from water, and/or ocean, waves and utilize that electrical power to energize a relatively small number of computing devices. By contrast with large, highly-concentrated, collections of computers, the computers within embodiments of the current disclosure are able to be energized with electrical power that, at least approximately, matches electrical requirements of the computers, i.e. there is no need to transmit highly-energetic electrical power from distant sources before reducing that power down to voltages and/or currents that are compatible with the computers to be energized.

Some embodiments of the present disclosure achieve and/or satisfy all of their cooling requirements through purely passive and convective and/or conductive cooling. Thermally-conductive walls and/or pathways facilitate the natural transmission of heat from the computing devices to the air and/or water outside the device. A relatively smaller number of devices means relatively less heat is generated. And, the proximity of a heat sink of significant capacity (i.e. the water on which the device floats) means that the removal of these relatively small amounts of heat conductively and/or convectively is achieved with great efficiency and in the absence of any additional expenditures of energy.

The current disclosure increases the modularity of clusters of computing devices by not only isolating them physically, but also by powering them independently and autonomously, and by cooling them passively. Through the creation and deployment of additional self-powered computing buoys, a computing capability can be scaled in an approximately linear fashion, typically, if not always, without the non-linear and/or exponential support requirements and/or consequences, e.g. cooling, that might otherwise limit an ability to grow a less modular architecture and/or embodiment of computing resources.

The current disclosure provides a useful application for wind-energy conversion devices that requires significantly less capital expenditures and/or infrastructure. For instance, a free-floating and/or drifting device of the current disclosure can continuously complete computational tasks, such as calculating Bitcoin ledgers and associated nonce values, while floating freely in very deep water (e.g. 3 miles deep) in the middle of an ocean, hundreds or thousands of miles from shore. Such an application does not depend upon, nor require, a subsea power cable to send electrical power to shore. It does not require extensive mooring and/or the deployment of numerous anchors in order to fix the position of a device, e.g. so that it can be linked to a subsea power cable.

By providing alternate computational resources, that draw their power directly from the environment, and by completing computational tasks currently executed in terrestrial clusters of computers, the amount of electrical power required on land can be reduced. And, thereby, the amount of electrical power generated through the consumption of fossil fuels, and the concomitant generation of greenhouse gases, can be reduced.

All potential variations in sizes, shapes, thicknesses, materials, orientations, methods, mechanisms, procedures, processes, electrical characteristics and/or requirements, and/or other embodiment-specific variations of the general inventive designs, structures, systems, and/or methods disclosed herein are included within the scope of the present disclosure.

FIG. 1 shows a perspective view of an embodiment of the present invention. A flotation module 100 (also referred to herein as a buoy), floats adjacent to the surface 101 of a body of water. Attached to, mounted on, and/or incorporated within, the buoy 100 is a power take-off (PTO) 102, and/or electrical power-generation assembly. A ribbon cable 104 connects the PTO to a submerged inertial mass 105, the cable traveling vertically through an aperture 103 in the buoy. As the buoy is moved up and down by waves, the inertial mass 105 inertially resists that motion, thereby causing the ribbon cable 104 to move over, around, and/or relative to, the gears, pulleys, drums, and/or cable-engagement components, of the PTO 102, thereby facilitating the generation of electrical power by a generator.

At least a portion of the electrical power generated by the PTO 102 is stored within batteries 109, capacitors, chemical fuel (e.g. hydrogen) generators and storage mechanisms, and/or other energy storage mechanisms, systems, assemblies, and/or components. Also attached to, mounted on, and/or incorporated within, the buoy 100 is at least one chamber 106, module, and/or container, in which are affixed a plurality of computing devices. The computing devices therein are powered and/or energized at least in part by electrical energy provided and/or supplied by batteries 109 and/or directly by the PTO 102.

Heat generated by the computing devices within computing module 106 is dissipated, at least in part, across the surfaces of fins 107 attached to the top of the computing module 106A, thereby warming the air above the buoy 100, and, at least in part, across the surfaces of fins 108 attached to the bottom of the computing module 106B, thereby warming the water below the buoy 100.

The illustrated embodiment 100 receives tasks, programs, data, messages, signals, information, and/or digital values, emitted 112, issues, and/or transmitted, from at least one satellite 111, at least in part, through antenna 110, the data having, at least in part, originated from a remote computer and/or server.

The illustrated embodiment 100 transmits 113, communicates, emits, and/or issues, data, task results, messages, signals, information, status updates, and/or digital values, at least in part, from antenna 110, which are subsequently received, at least in part, by satellite 111, which may then transmit that received data to a remote computer and/or server.

Figure 2:
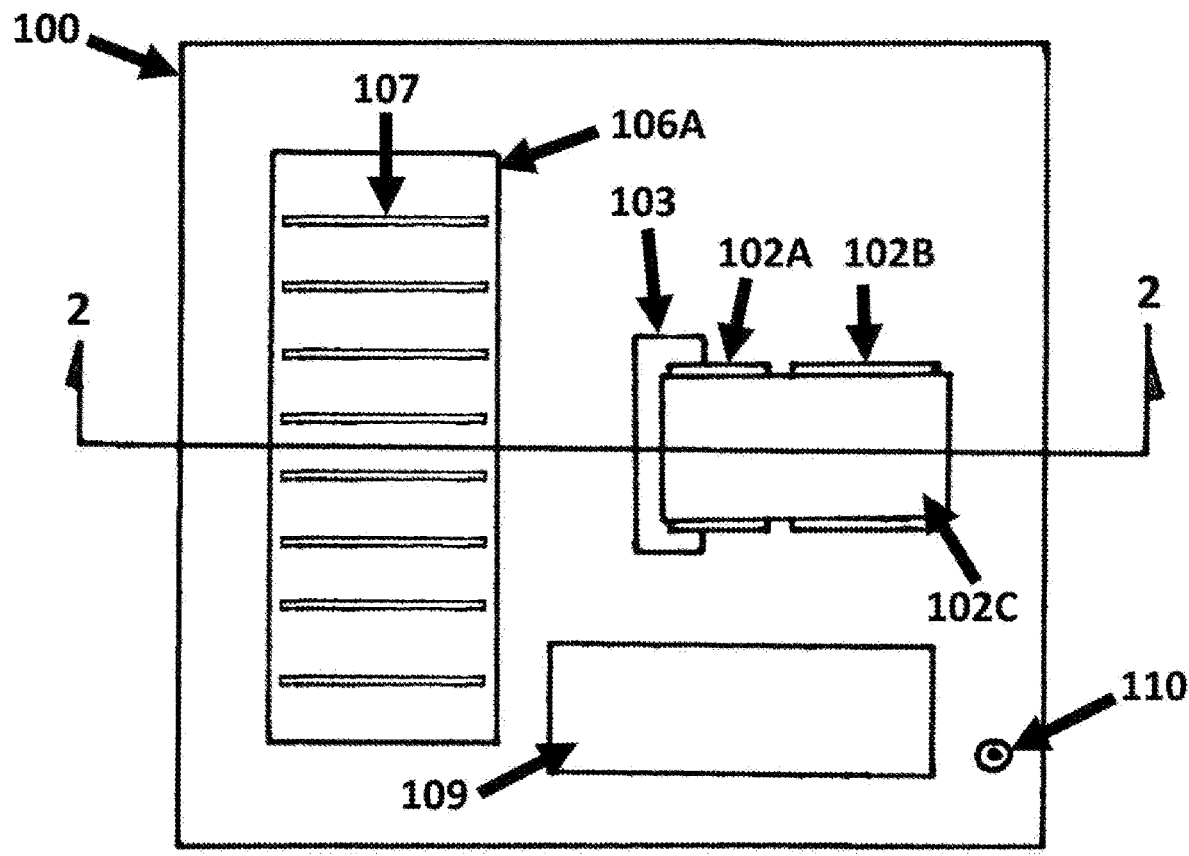
FIG. 2 is a plan view of the embodiment of FIG. 1.

FIG. 2 shows a top-down view of the embodiment of FIG. 1. A buoy 100 floats adjacent to the surface of a body of water. Attached to, mounted on, and/or incorporated within, the buoy 100 is a power take-off (PTO) 102, and/or electrical power-generation assembly. The PTO includes at least two pulleys and/or rollers 102A and 102B, about which a ribbon cable 102C passes and/or rolls. The ribbon cable 102C connects the PTO to a submerged inertial mass, traveling vertically through an aperture 103 in the buoy.

At least a portion of the electrical power generated by the PTO 102 is stored in an enclosed bank 109, assembly, and/or set of batteries, capacitors, chemical fuel (e.g. hydrogen) generators and storage mechanisms, and/or other energy storage mechanisms. A plurality of computers, computing devices, network connectors, and/or computing resources, are stored within chamber 106A, enclosure, module, and/or container, mounted on, embedded and/or incorporated within the buoy 100. Affixed to the top of the computing module 106A are heat-dissipating and/or cooling fins 107 that facilitate the transfer of heat generated by the computing resources within the computing module 106A to the air above the buoy. An antenna 110 receives data transmitted by a satellite, and transmits data to a satellite. In some embodiments, antenna 110 transmits data to, and receives data from, other similar devices.

Figure 3:
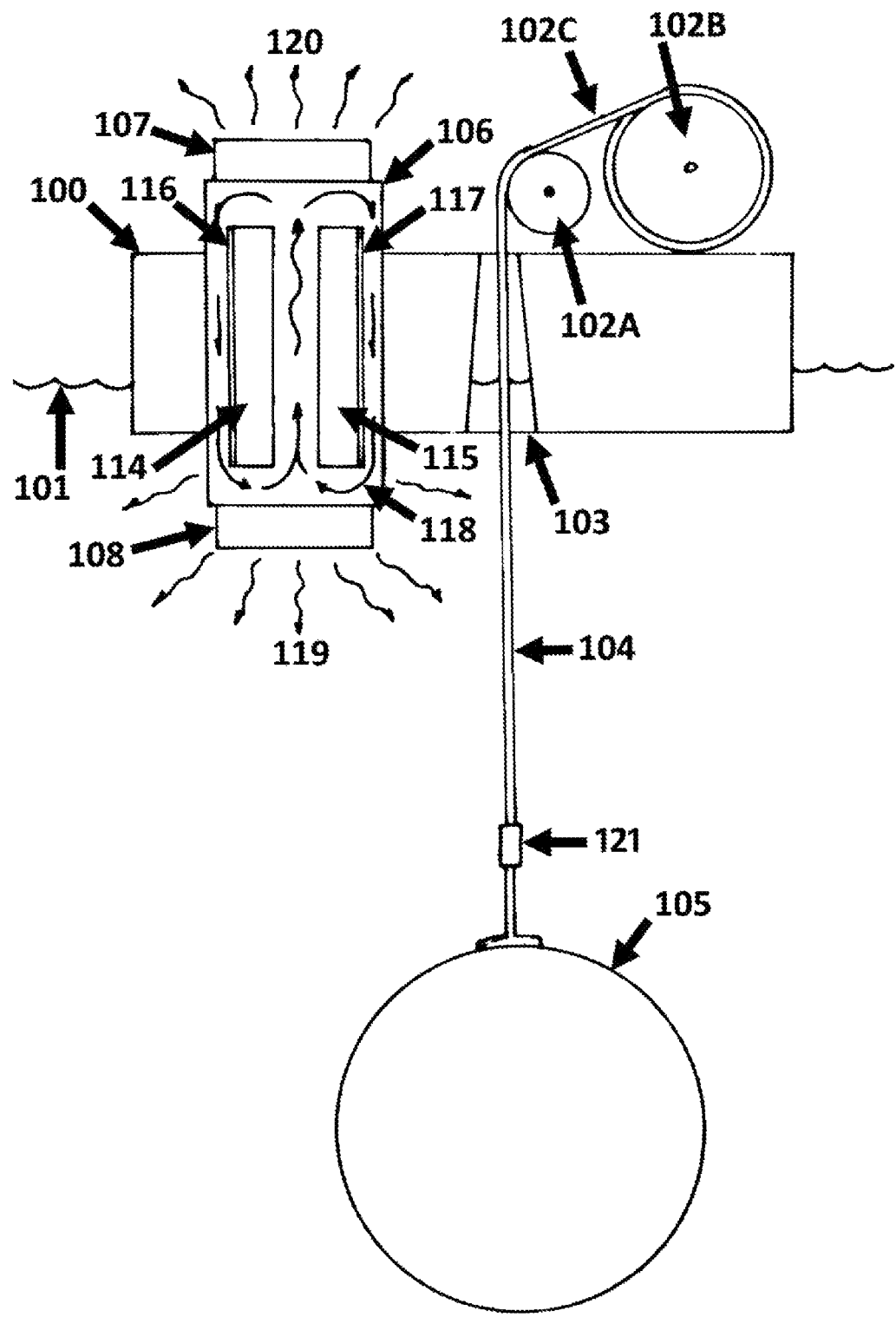
FIG. 3 is a side view of the embodiment of FIG. 1.

FIG. 3 shows a side view of the same embodiment of the current disclosure illustrated in FIGS. 1 and 2, and taken along a section plane "2" specified in FIG. 2. A buoy 100 floats adjacent to the surface 101 of a body of water. Attached to, mounted on, and/or incorporated within, the buoy 100 is a power take-off (PTO) 102, and/or electrical power-generation assembly. The PTO includes at least two pulleys and/or rollers 102A and 102B, about which a ribbon cable 102C passes and/or rolls. The ribbon cable 102C/104 connects the PTO to a submerged inertial mass 105, via a ribbon bar connector 121, traveling vertically through an aperture 103 in and through the buoy. A plurality of computers 114/115, computing devices, network connectors, and/or computing resources, are stored within chamber 106, enclosure, module, and/or container, mounted on, embedded and/or incorporated within the buoy 100.

In this illustrated embodiment 100, computing resources and/or computers are affixed within two vertical banks 116 and 117 and/or arrays. As they operate, and consume electrical power, they generate heat which gives rise to convective currents, e.g. 118, within the computing module 106 and/or chamber. The convective currents carry heat from the computing devices and/or circuits to upper 107 and lower 108 fins. Affixed to the top of the computing module 106 are heat-dissipating and/or cooling fins 107 that facilitate the transfer 120 of heat generated by the computing resources within the computing module 106 to the air above the buoy. Affixed to the bottom of the computing module 106 are heat-dissipating and/or cooling fins 108 that facilitate the transfer 119 of heat generated by the computing resources within the computing module 106 to the water below the buoy.

In some embodiments, the fluid within the computing chamber 106 is air. In some embodiments, the fluid within the computing chamber 106 is a liquid, especially one that does not conduct electricity to a significant degree. In some embodiments, the material within the computing chamber 106 that surrounds the computing circuits 116 and 117 is a phase-changing material that does not conduct electricity to a significant degree.

Figure 4:
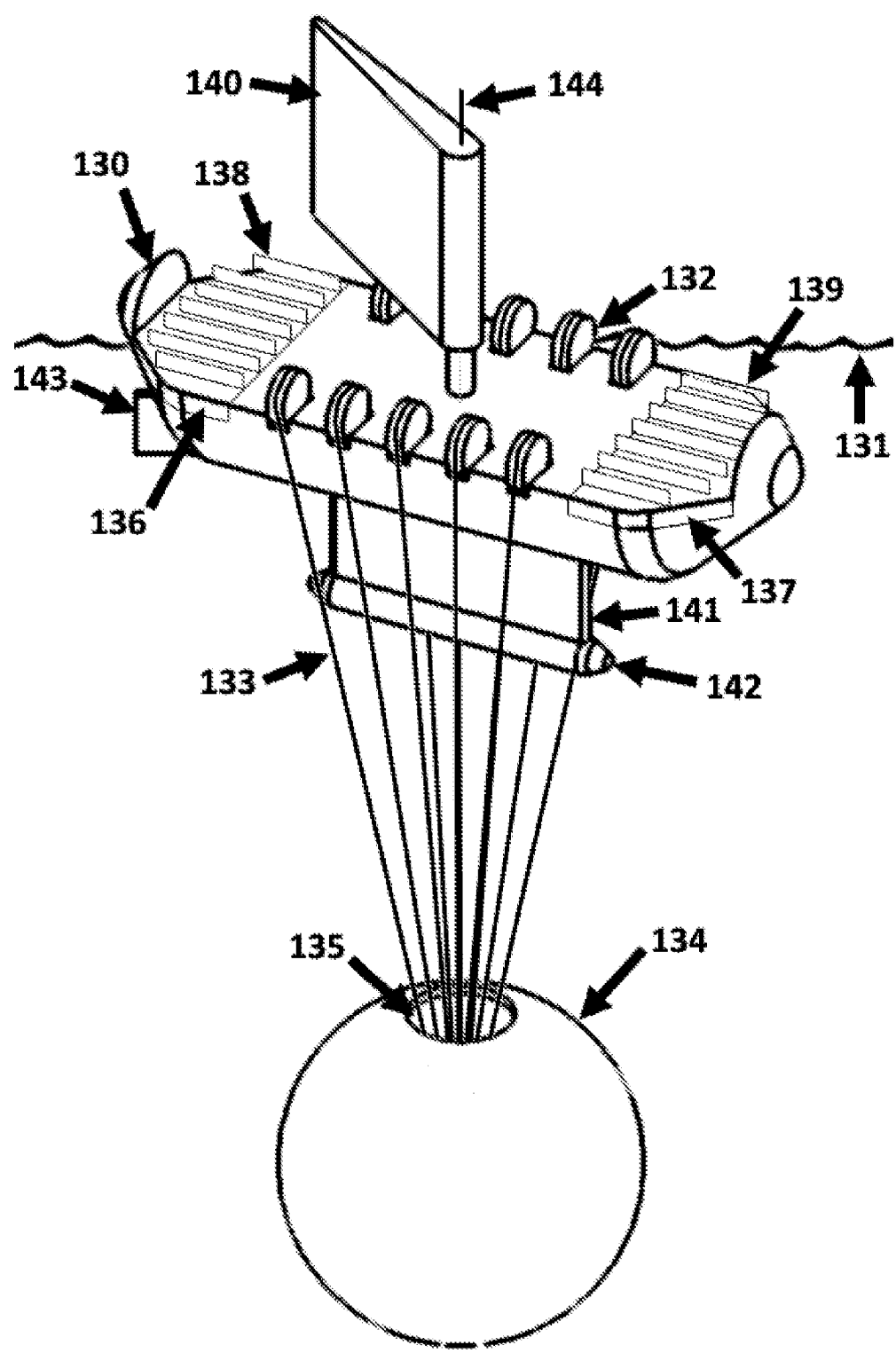
FIG. 4 is an elevated perspective view of an alternate embodiment of the present invention.

FIG. 4 shows a perspective view of an alternate embodiment of the present invention. A buoy 130, flotation module, floating platform, vessel, raft, and/or buoyant object, floats adjacent to the surface 131 of a body of water. Attached to, mounted on, and/or incorporated within, the buoy 130 is a plurality of power take-offs (PTOs), e.g. 132, and/or electrical power-generation assemblies. PTO-specific cables, e.g. 133, chains, ropes, linkages, and/or flexible connectors, connect each respective PTO to the approximate center of a submerged inertial mass 134. The cables pass through a hole 135 and/or aperture in a top surface of the inertial mass 134.

Mounted on and/or in, attached and/or affixed to, and/or incorporated within, the buoy 130 are two "computing chambers and/or modules" 136 and 137. These are sealed, waterproof chambers inside of which are mounted and/or affixed computing circuits, computing devices, and/or computing resources and/or networks. The computing circuits are energized directly and/or indirectly by electrical power generated by the embodiment's PTOs in response to wave action. Thermally-conductive fins, e.g. 138 and 139, are affixed to top surfaces of the computing chambers 136 and 137. These fins expedite the transfer of heat, generated by computers within the computing chambers, to the air above and/or around the embodiment.

The illustrated embodiment 130 contains and/or incorporates a keel 141, with a weighted end 142, that enhances and/or promotes the stability of the device. The embodiment 130 also incorporates a rigid sail 140 that is able to impart motion to the device when driven by wind. The amount of wind-driven thrust is adjustable and/or able to be optimized through the rotation of the sail to an optimal angle with respect to the wind direction. A rudder 143 allows the device's control system (e.g. one or more computers that control the behavior of the device) to steer the embodiment when it is moved in response to wind passing over its rigid sail 140.

An antenna 144 mounted on, and/or affixed to, the top of the rigid sail 140 allows the device to send and receive electronic, and/or electromagnetic, transmissions, preferably encrypted. In some embodiments, this antenna exchanges digital data with a satellite through which the device can exchange data, programs, instructions, status information, and/or other digital values, with a remote computer and/or server. In some embodiments, this antenna exchanges digital data with other similar devices, e.g. allowing them to be joined and/or connected within a virtual computing network that includes and/or extends to at least a portion of the computers on the so-linked devices.

Figure 5:
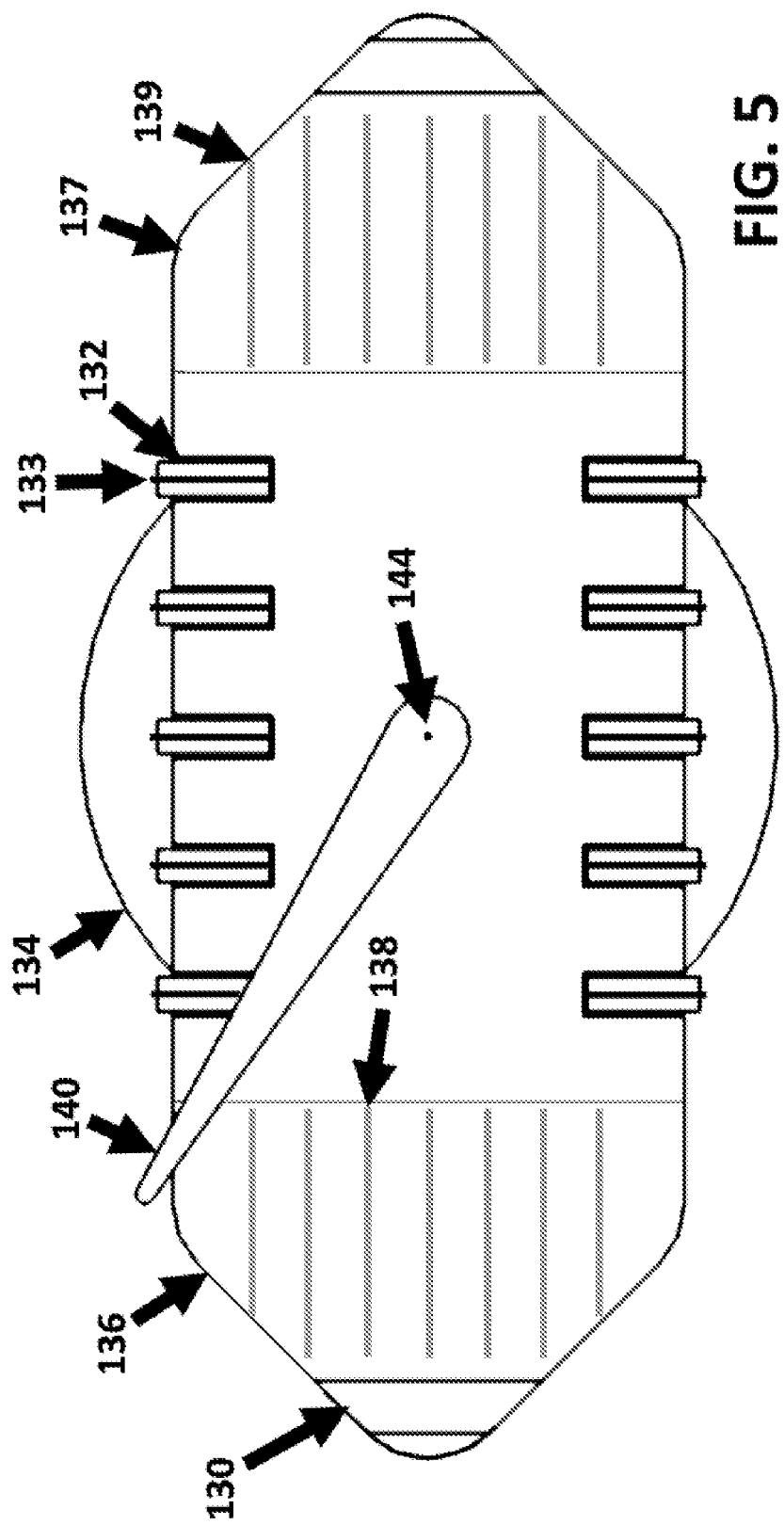
FIG. 5 is a plan view of the embodiment of FIG. 4.

FIG. 5 shows a top-down view of the embodiment of FIG. 4. A buoy 130 floats adjacent to the surface of a body of water. Attached to, mounted on, and/or incorporated within, the buoy 130 is a plurality of power take-offs (PTOs), e.g. 132, and/or electrical power-generation assemblies. PTO-specific cables, e.g. 133 connect each respective PTO to the approximate center of a submerged inertial mass 134.

Mounted on and/or in, attached and/or affixed to, and/or incorporated within, the buoy 130 are two "computing chambers and/or modules" 136 and 137. These are sealed, waterproof chambers inside of which are mounted and/or affixed computing circuits, computing devices, and/or computing resources and/or networks. The computing circuits are energized directly and/or indirectly by electrical power generated by the embodiment's PTOs in response to wave action. Thermally-conductive fins, e.g. 138 and 139, are affixed to top surfaces of the computing chambers 136 and 137. These fins expedite the transfer of heat, generated by computers within the computing chambers, to the air above and/or around the embodiment. The "computing chambers and/or modules" 136 and 137 cover a substantial portion of an upper surface of the buoy 130, so as to be easily cooled by wind.

The embodiment 130 incorporates a rigid sail 140 that is able to impart thrust to the device when driven by wind. The amount of thrust being adjustable and/or able to be optimized through the rotation of the sail to an optimal angle with respect to the wind direction. An antenna 144 mounted on, and/or affixed to, the top of the rigid sail 140 allows the device to send and receive electronic, and/or electromagnetic, transmissions (e.g. radio).

Figure 6:
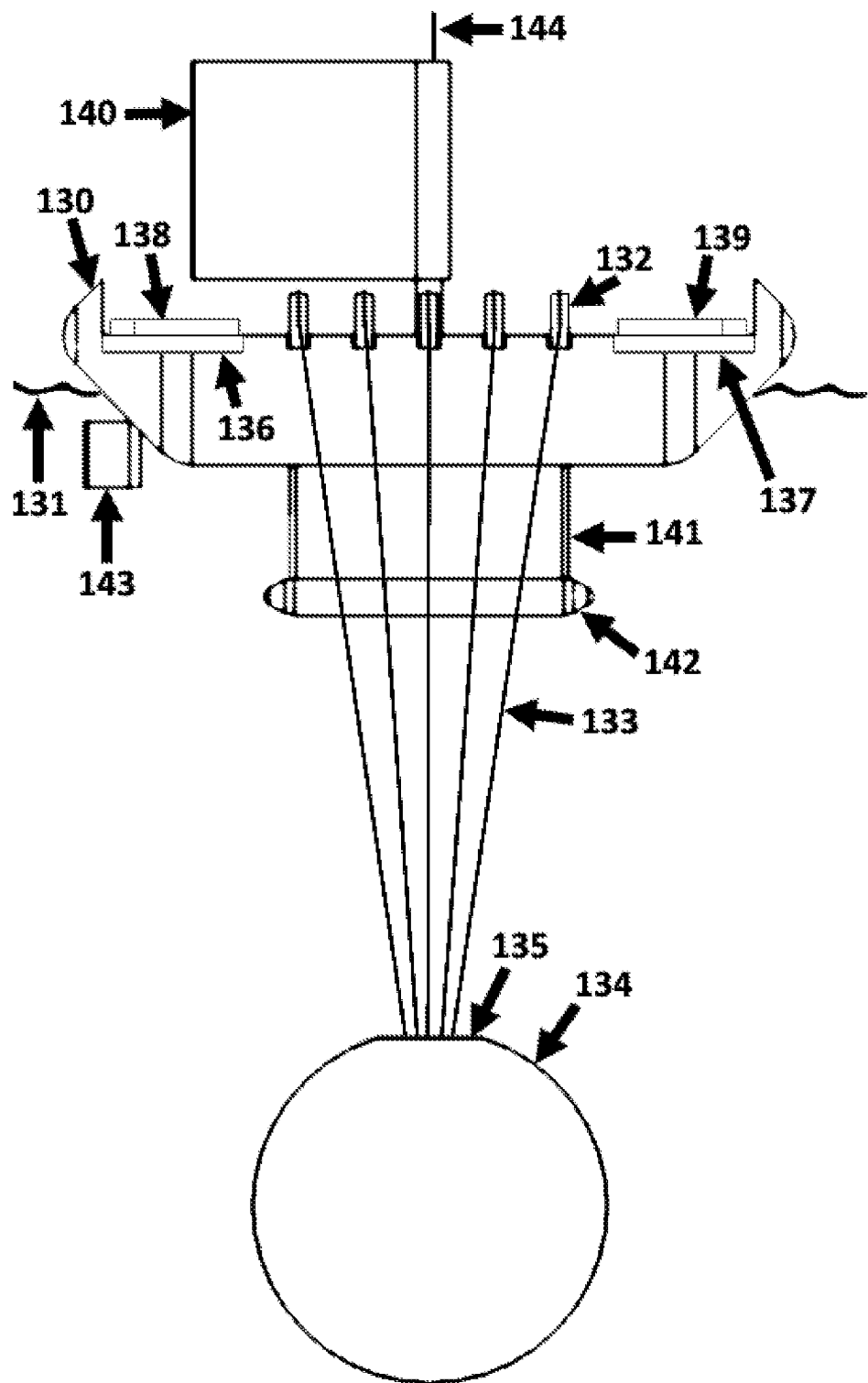
FIG. 6 is a side view of the embodiment of FIG. 4.

FIG. 6 shows a side view of an embodiment of the present invention. A buoy 130 floats adjacent to the surface 131 of a body of water. Attached to, mounted on, and/or incorporated within, the buoy 130 is a plurality of power take-offs (PTOs), e.g. 132, and/or electrical power-generation assemblies. PTO-specific cables, e.g. 133, chains, ropes, linkages, and/or flexible connectors, connect each respective PTO to the approximate center of a submerged inertial mass 134. The cables pass through a hole 135 and/or aperture in a top surface of the inertial mass 134, before connecting to it at an approximate central portion of it.

Mounted on and/or in, attached and/or affixed to, and/or incorporated within, the buoy 130 are two "computing chambers and/or modules" 136 and 137. These are sealed, waterproof chambers inside of which are mounted and/or affixed computing circuits, computing devices, and/or computing resources and/or networks. The computing circuits are energized directly and/or indirectly by electrical power generated by the embodiment's PTOs in response to wave action. Thermally-conductive fins, e.g. 138 and 139, are affixed to top surfaces of the computing chambers 136 and 137. These fins expedite the transfer of heat, generated by computers within the computing chambers, to the air above and/or around the embodiment.

The illustrated embodiment 130 contains and/or incorporates a keel 141, with a weighted end 142, that enhances and/or promotes the stability of the device. The embodiment 130 also incorporates a rigid sail 140 that is able to impart thrust to the device when driven by wind. The amount of thrust being adjustable and/or able to be optimized through the rotation of the sail to an optimal angle with respect to the wind direction. A rudder 143 allows the device's control system (e.g. one or more computers that control the behavior of the device) to steer the embodiment when it is moved in response to wind passing over its rigid sail 140.

An antenna 144 mounted on, and/or affixed to, the top of the rigid sail 140 allows the device to send and receive electronic, and/or electromagnetic, transmissions, preferably encrypted. In some embodiments, this antenna exchanges digital data with a satellite through which the device can exchange data, programs, instructions, status information, and/or other digital values, with a remote computer and/or server. In some embodiments, this antenna exchanges digital data with other similar devices, e.g. allowing them to be joined and/or connected within a virtual computing network that includes and/or extends to at least a portion of the computers on the so-linked devices.

Figure 7:
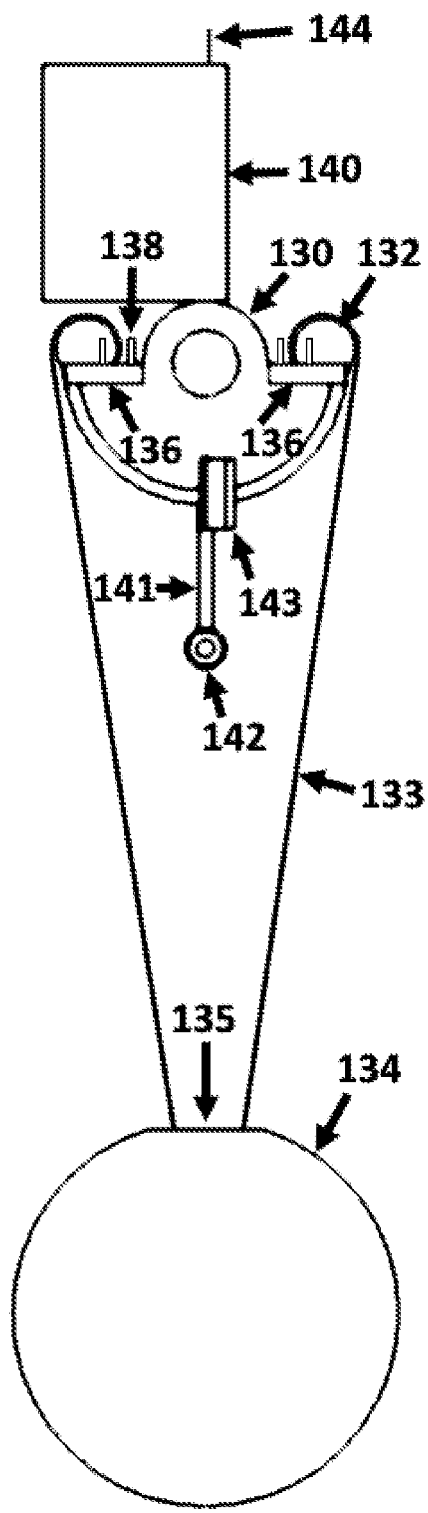
FIG. 7 is a front view of the embodiment of FIG. 4

FIG. 7 shows a back and/or rear view of the embodiment of FIG. 4. A buoy 130 floats adjacent to the surface of a body of water. Attached to, mounted on, and/or incorporated within, the buoy 130 is a plurality of power take-offs (PTOs), e.g. 132, and/or electrical power-generation assemblies. PTO-specific cables, e.g. 133, chains, ropes, linkages, and/or flexible connectors, connect each respective PTO to the approximate center of a submerged inertial mass 134. The cables pass through a hole 135 and/or aperture in a top surface of the inertial mass 134.

Mounted on and/or in, attached and/or affixed to, and/or incorporated within, the buoy 130 are two "computing chambers and/or modules," e.g. 136. These are sealed, waterproof chambers inside of which are mounted and/or affixed computing circuits, computing devices, and/or computing resources and/or networks. The computing circuits are energized directly and/or indirectly by electrical power generated by the embodiment's PTOs in response to wave action. Thermally-conductive fins, e.g. 138, are affixed to top surfaces of the computing chambers, e.g. 136. These fins expedite the transfer of heat, generated by computers within the computing chambers, to the air above and/or around the embodiment.

The illustrated embodiment 130 contains and/or incorporates a keel 141, with a weighted end 142, that enhances and/or promotes the stability of the device. The embodiment 130 also incorporates a rigid sail 140 that is able to impart thrust to the device when driven by wind. The amount of thrust is adjustable and/or able to be optimized through the rotation of the sail to an optimal angle with respect to the wind direction. A rudder 143 allows the device's control system (e.g. one or more computers that control the behavior of the device) to steer the embodiment when it is moved in response to wind passing over its rigid sail 140.

An antenna 144 mounted on, and/or affixed to, the top of the rigid sail 140 allows the device to send and receive electronic, and/or electromagnetic, transmissions, preferably encrypted. In some embodiments, this antenna exchanges digital data with a satellite through which the device can exchange data, programs, instructions, status information, and/or other digital values, with a remote computer and/or server. In some embodiments, this antenna exchanges digital data with other similar devices, e.g. allowing them to be joined and/or connected within a virtual computing network that includes and/or extends to at least a portion of the computers on the so-linked devices.

Figure 8:
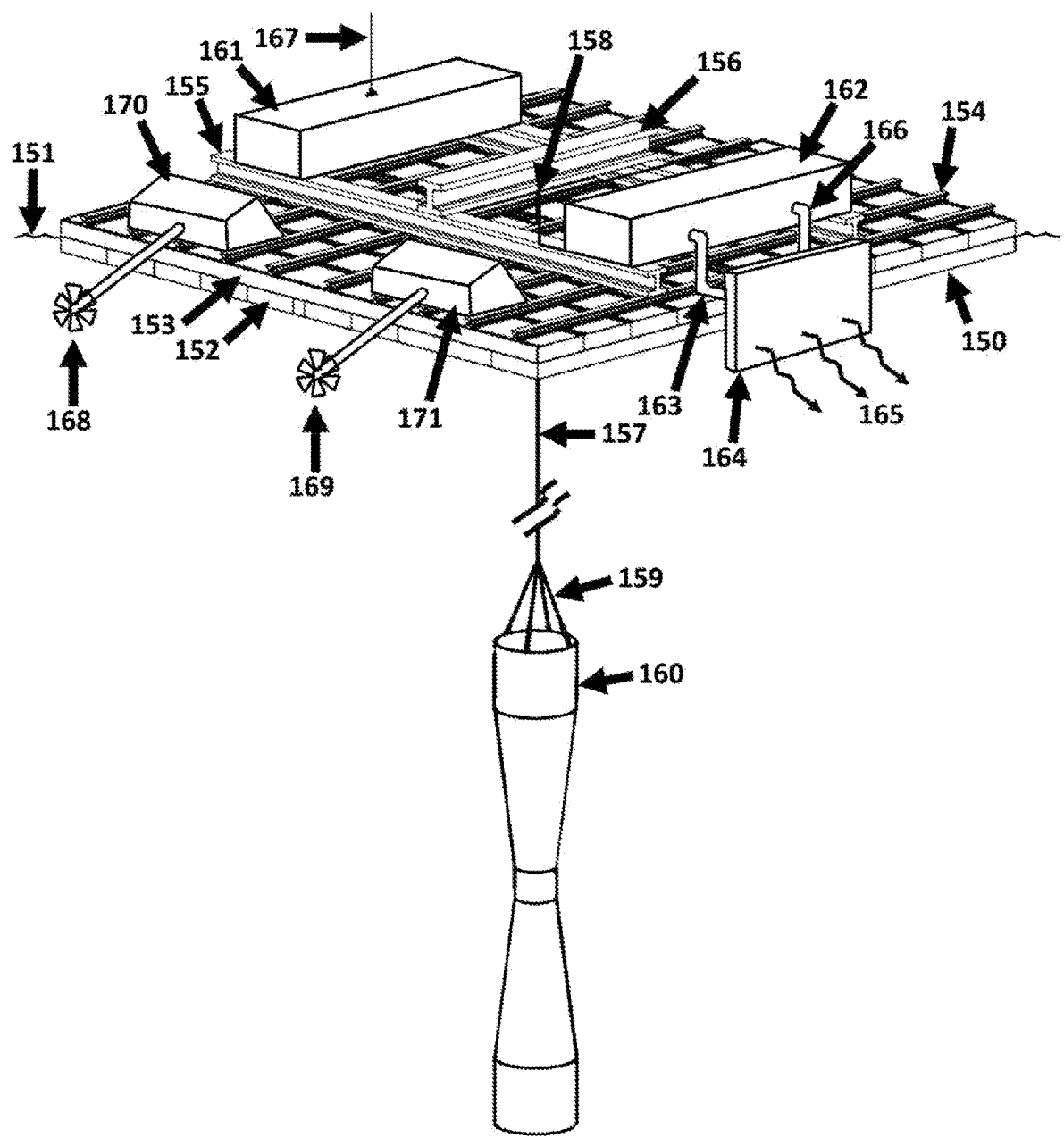
FIG. 8 is an elevated perspective view of an alternate embodiment of the present invention.

FIG. 8 shows a perspective view of an alternate embodiment of the present invention. A buoy 150, and/or buoyant platform, floats adjacent to the surface 151 of a body of water. The buoyant platform is composed, and/or comprised, of buoyant "slats," e.g. 152 and 153. The slats, e.g. 153, of the upper layer are affixed to an underlying lower layer of slats, e.g. 152. The slats of the upper and lower layers are approximately orthogonal to one another. Mounted on, and/or affixed to, an upper surface of the upper layer of slats, e.g. 153, are "load distribution struts," e.g. 154. These approximately rigid struts help to distribute downward forces imparted to strut 156, e.g. by the flexible connector and/or cable which connects that strut to submerged Venturi tube 160, across the upper surface of the buoyant platform 153. They also help to collect and concentrate upward, e.g. buoyant, forces imparted to lower surfaces of the buoyant platform, e.g. 152, to facilitate their non-destructive transmission to strut 156, and to the cable 157 to which it is attached.

Additional orthogonal layers of struts overly the bottom layer of struts, e.g. 154. Fewer, but larger and stronger struts, e.g. 155, are affixed to the bottom layer of struts, e.g. 154. A single upper-most strut 156 is affixed to the intermediate layer of struts, e.g. 155. Downward forces imparted to strut 156, by cable 157 attached to strut 156 at 158, are distributed down and across the underlying layers of struts, on to, and through, the orthogonal layers of buoyant struts, e.g. 152 and 153. In this way, the broad, diffuse buoyant forces applied to the buoyant platform by the body of water on which it floats, can be focused so as to counter the downward force applied to strut 156 at connector 158.

A generator located within the Venturi tube, generated electrical power in response to the up-and-down heave-driven vertical motions of the buoyant platform 150. The electrical power is communicated and/or transmitted to the buoyant platform through an electrical cable affixed to, and/or combined with, cable 157. Mounted atop the intermediate layer of struts, e.g. 155, are two "computing chambers" 161 and 162. Inside these computing chambers are mounted, and/or affixed, computing circuits, computers, and/or computing devices, and related accessories (e.g. routers, switches, etc.). Fluid based heat exchangers, e.g. 163, 164, 166, circulate water, and/or other heat absorbing fluids and/or gases, by means of pipes, e.g. 163 and 166, through each computing chamber carrying heat generated within each computing chamber, through the operation of at least some of the computing devices therein, to a radiator 164 where at least a portion of that heat is transferred 165, communicated, radiated, and/or imparted, to the water 151 on which the embodiment floats, warming that water in the process.

Mounted atop the bottom-most layer of struts, e.g. 154, are two propeller-driven propulsion assemblies 170 and 171, units, and/or mechanisms. Using a portion of the electrical power generated by the generator in the Venturi tube 160, motors within propulsion assemblies 170 and 171, turn propellers 168 and 169. Through the controlled variation of, and/or the creation of a differential, thrust generated by propellers 168 and 169, the buoyant platform and the embodiment, may be propelled in any direction, and "driven" to a specific location (e.g. to specific geospatial coordinates) on the surface of the body of water.

Figure 9:
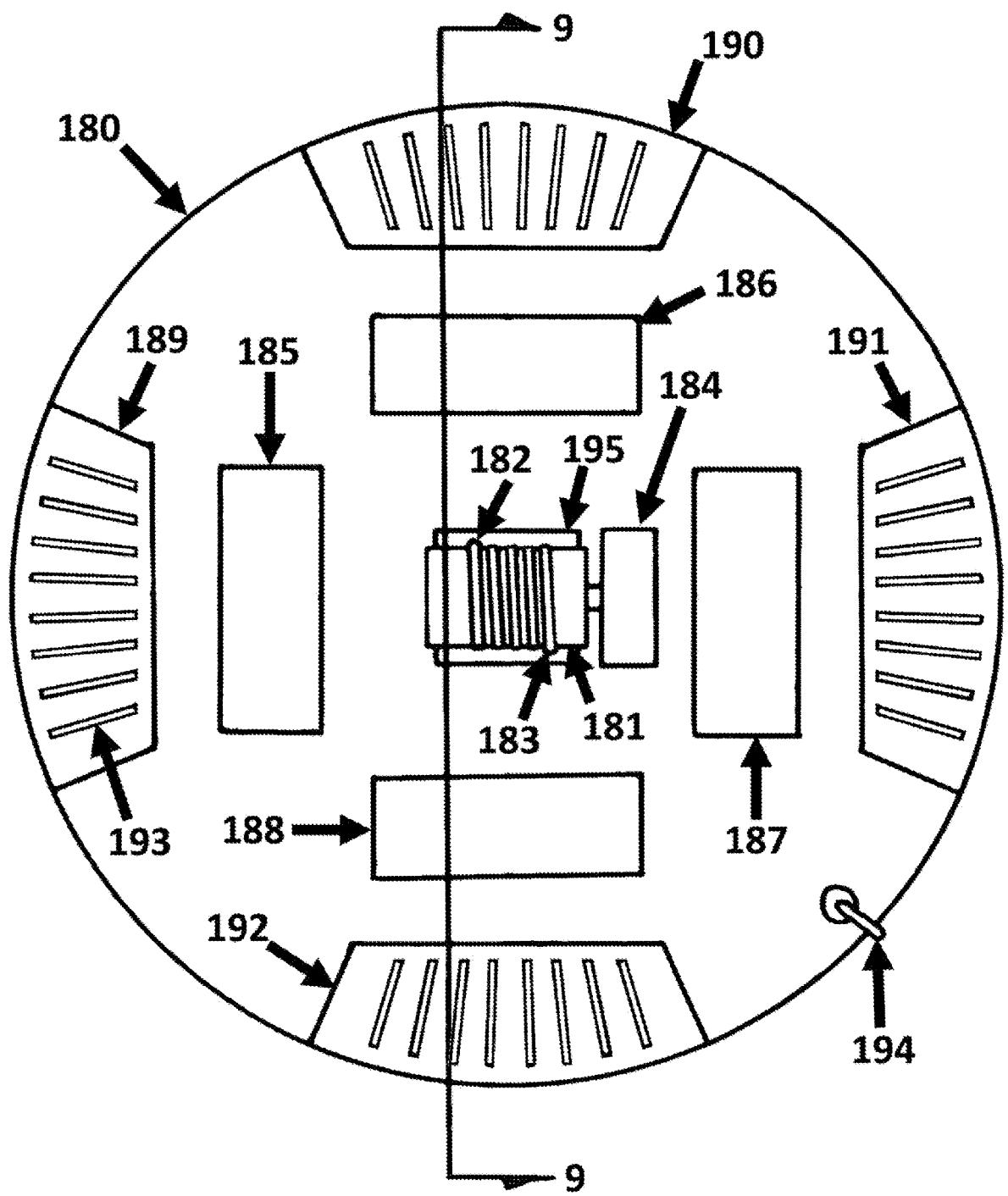
FIG. 9 is a plan view of an alternate embodiment of the present invention.

FIG. 9 shows a top-down view of another embodiment of the present invention. A buoy 180 floats adjacent to an upper surface of a body of water. One end of a cable 182, chain, rope, and/or flexible connector, passes downward through an aperture 195 in the buoy 180 where it is connected to an anchor (not shown) affixed to the seafloor. The cable is wound around a drum 181, pulley, and/or rotating capstan, which increases the frictional binding between the cable and the drum. The other end of the cable 183 passes downward through the aperture 195 in the buoy 180 where it is connected to a submerged weight (not shown). As waves, especially the heave, moves the buoy up and down, the cable 182-183 rotates the drum 181 which is rotatably connected to a generator 184, and/or power take-off (PTO).

At least a portion of the electrical power so generated can be stored within the batteries, capacitors, chemical fuel (e.g. hydrogen) generators and storage mechanisms, and/or other energy storage mechanisms and/or devices, located within four "energy-storage compartments and/or modules" 185-188. About the periphery of the buoy are positioned four "computational chambers and/or enclosures" 190-193. Affixed within each computational chamber is a plurality of computing devices, computing circuits, computers, and/or networked computers. At least some of those computing devices are energized, at least in part, with energy provided by and/or from the energy-storage modules 185-188. At least a portion of the heat generated by the computers or computing circuits within each computational chamber is convectively transmitted to the thermally conductive walls of each chamber. And, heat-dissipating fins, e.g. 193, attached and/or affixed to an upper surface of each computational chamber facilitate and/or expedite the transfer of the heat trapped within the chambers to the air above and/or around the buoy.

A cable 194 is connected to the embodiment. In some embodiments, this cable contains and/or incorporates a fiber-optic cable that facilitates the transmission and/or exchange of digital data between computers within the embodiment and computers not located in the embodiment (e.g. computers connected to the Internet). In some embodiments, this cable contains and/or incorporates an electrical power cable that makes it possible for the device to transmit power to a consumer and/or grid at another end of the cable. In some embodiments, this cable contains and/or incorporates an electrical power cable that makes it possible for the device to receive electrical power from a remote source and/or location, e.g. another similar device and/or a terrestrial power grid.

Figure 10:
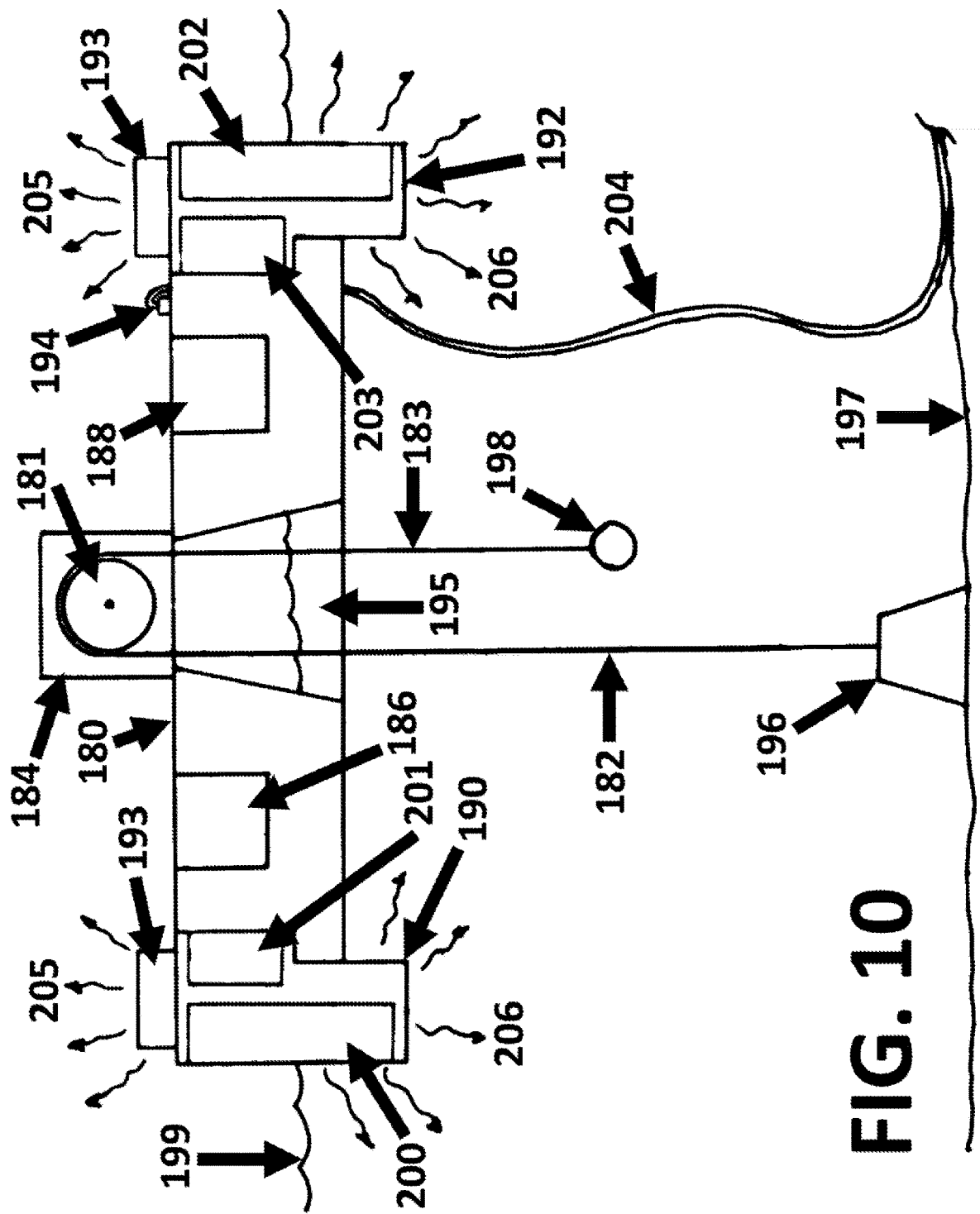
FIG. 10 is a side view of the embodiment of FIG. 9.

FIG. 10 shows a side view of the embodiment of FIG. 9, and taken along a section plane "9" specified in FIG. 9. A buoy 180 floats adjacent to an upper surface 199 of a body of water. One end of a cable 182, chain, rope, and/or flexible connector, passes downward through an aperture 195 in the buoy 180 where it is connected to an anchor 196 affixed to the seafloor 197. The cable is wound around a drum 181, pulley, and/or rotating capstan, which increases the frictional binding between the cable and the drum. The other end of the cable 183 passes downward through the aperture 195 in the buoy 180 where it is connected to a submerged weight 198. As waves, especially the heave, moves the buoy up and down, the cable 182-183 rotates the drum 181 which is rotatably connected to a generator 184, and/or power take-off (PTO).

At least a portion of the electrical power so generated is stored within the batteries, capacitors, chemical fuel (e.g. hydrogen) generators and storage mechanisms, and/or other energy storage mechanisms and/or devices, located within four "energy-storage compartments and/or modules," e.g. 186 and 188.

About the periphery of the buoy are positioned four "computational chambers and/or enclosures," e.g. 190 and 192. Affixed within each computational chamber is a plurality of computing devices, computing circuits, computers, and/or networked computers, arranged in racks, e.g. 200-203, arrays, and/or sub-assemblies. At least some of those computing devices are energized, at least in part, with energy provided by and/or from the energy-storage modules, e.g. 186-188.

At least a portion of the heat generated by the computers within each computational chamber is convectively transmitted to the thermally conductive walls, e.g. 190 and 192 of each chamber. And, heat-dissipating fins 193, attached and/or affixed to an upper surface of each computational chamber facilitate and/or expedite the transfer 205 of at least a portion of the heat trapped within the chambers to the air above and/or around the buoy. Likewise, the thermally-conductive walls of the computational chambers 190 and 192 that are submerged below the surface 199 of the body of water on which the device floats, transfer 206 at least a portion of the heat trapped within the chambers to the water around and/or adjacent to the buoy 180.

One end of a cable 194 is connected to the embodiment. A portion of the cable proximate to the buoy 180 descends to the seafloor where it travels adjacent to the seafloor to a remote location, e.g. to a site on land.

In some embodiments, this cable contains and/or incorporates a fiber-optic cable that facilitates the transmission and/or exchange of digital data between computers within the embodiment and computers not located in the embodiment (e.g. computers connected to the Internet). In some embodiments, this cable contains and/or incorporates an electrical power cable that makes it possible for the device to transmit power to a consumer and/or grid at another end of the cable. In some embodiments, this cable contains and/or incorporates an electrical power cable that makes it possible for the device to receive electrical power from a remote source and/or location, e.g. another similar device and/or a terrestrial power grid.

Figure 11:
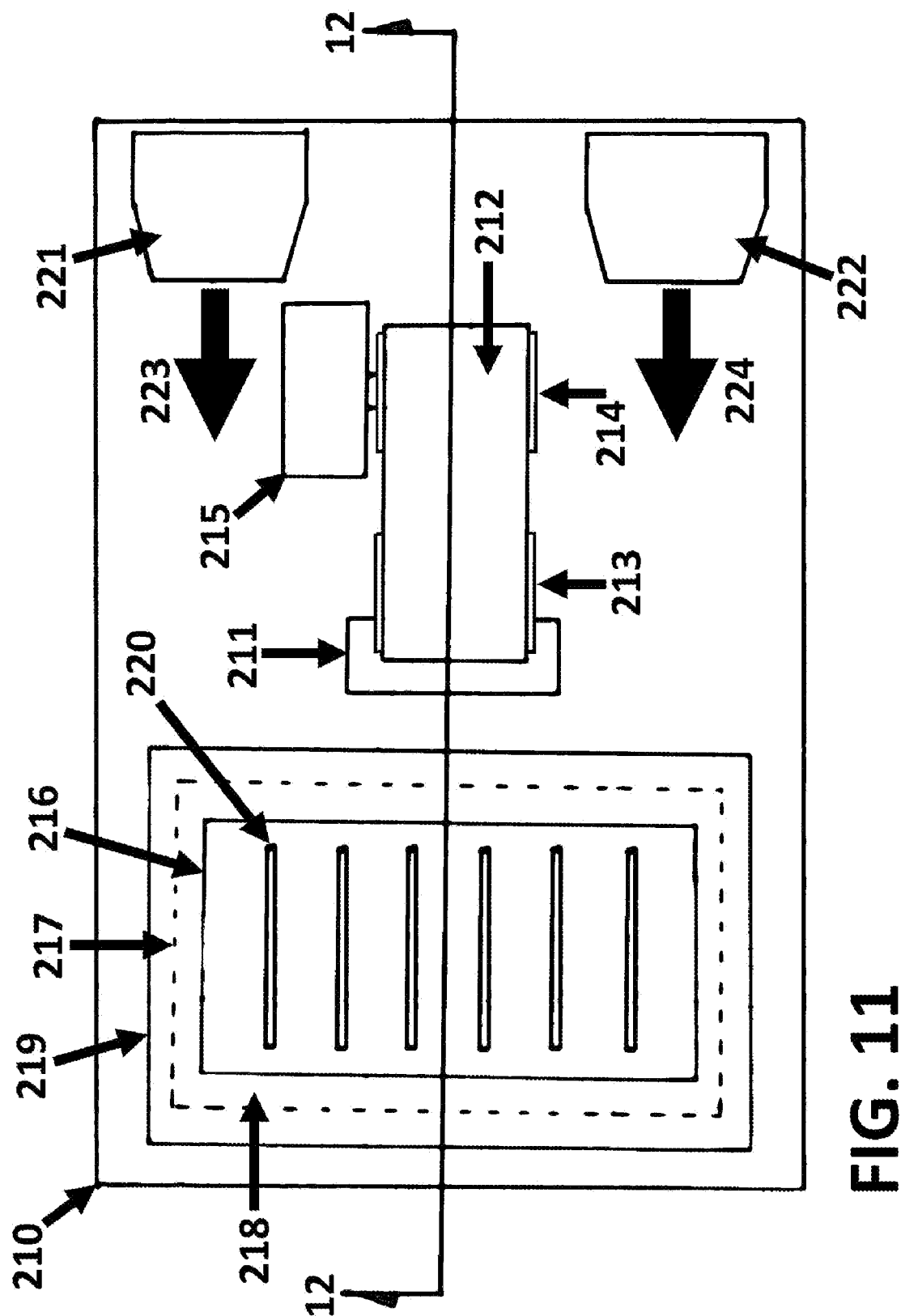
FIG. 11 is a plan view of an alternate embodiment of the present invention.

FIG. 11 shows a top-down view of an embodiment of the present invention. A buoy 210 floats adjacent to an upper surface of a body of water. One end of a multi-stranded, laterally-distributed, cable 212, chain, rope, and/or flexible connector, passes downward through an aperture 211 in the buoy 210 where it is connected to a submerged inertial mass (not shown). Each strand of the multi-stranded cable 212 is wound around a pair of drums 213-214, pulleys, and/or rotating capstans, which increases the frictional binding between the cable and the drum. The other end of each strand of the multi-stranded cable 212 is affixed to drum 214. As waves, especially the heave, moves the buoy up and down, the cable 212 rotates the drums 213-214 which causes a shaft of generator 215, and/or power take-off (PTO), to rotate as well, thereby generating electrical power.

Within one end of buoy 210 is embedded a sealed and/or waterproof and/or water-tight "computational chamber and/or enclosure" 216. Computational chamber 216 is attached to an upper surface of buoy 210 by a flange 219. The walls, e.g. 216, of the computational chamber below the flange, and the corresponding and/or adjacent walls of the buoy, e.g. 217, are separated by a gap 218. Within the space and/or gap, the computational chamber is surrounded by, and/or bathed in, a thermally-conductive fluid. Heat-dissipating fins, e.g. 220, are attached and/or affixed to an upper surface of the computational chamber and facilitate and/or expedite the transfer of the heat trapped within the chambers to the air above and/or around the buoy.

Affixed to and/or within the computational chamber 216 is a plurality of computing devices, computing circuits, computers, and/or networked computers. At least some of those computing devices are energized, at least in part, with electrical power generated by the PTO 215. At least a portion of the heat generated by the computing devices within the computational chamber 216 is convectively transmitted to the thermally conductive upper wall of the chamber, and to the fins, e.g. 220, thereon, from which it is convectively transmitted and/or transferred to the air above the buoy.

A pair of ducted fans 221-222 mounted to an upper surface of the buoy 210 provide forward thrust with which the embodiment may propel itself across the surface of the water on which it floats. When active, the ducted fans consume a portion of the electrical power generated by the generator 215. Through the controlled variation of, and/or the creation of a differential, thrust generated by the fans, the buoy, may propel itself in any direction, and/or to any specific location (e.g. to specific geospatial coordinates) on the surface of the body of water.

Figure 12:
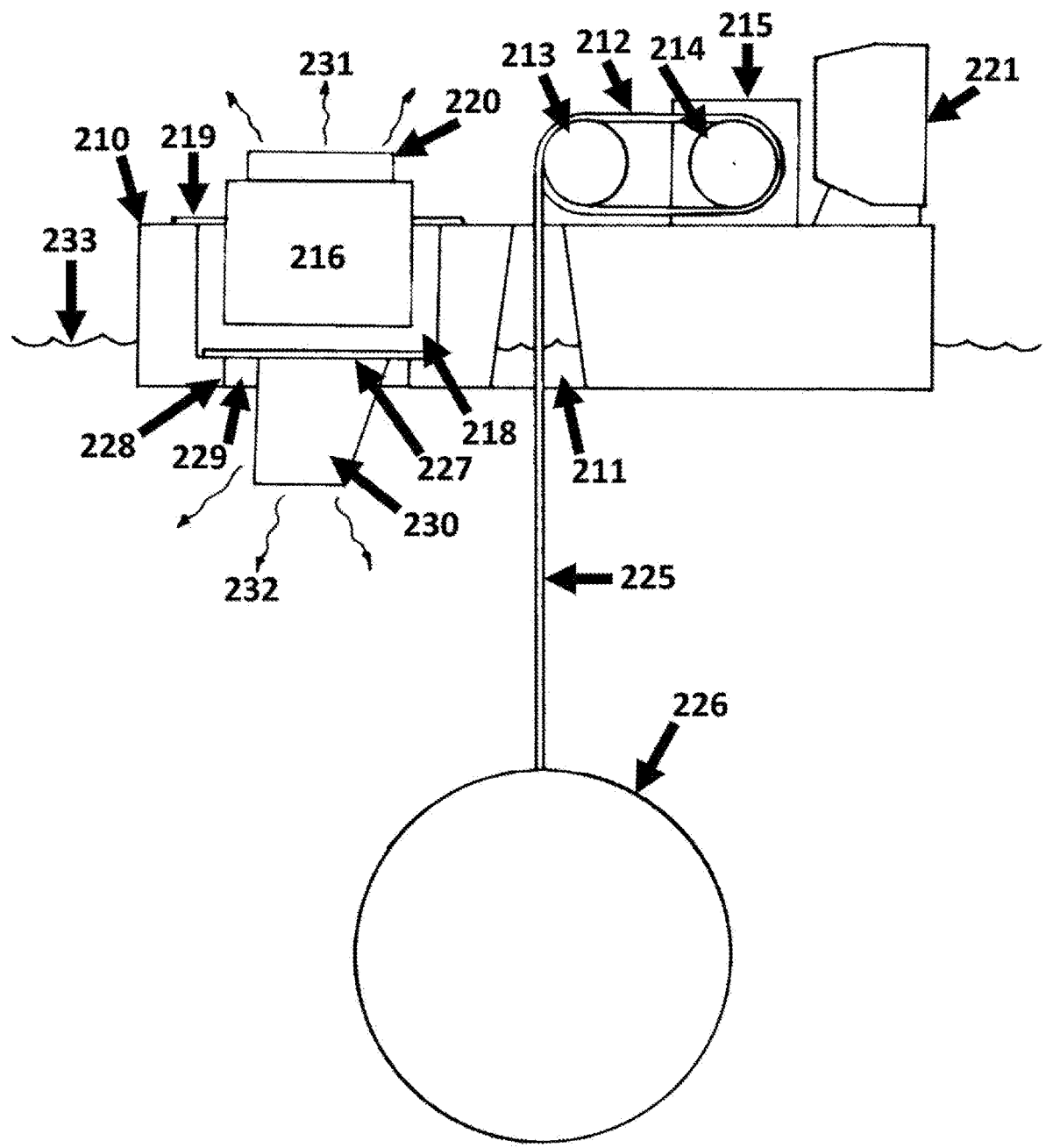
FIG. 12 is a side view of the embodiment of FIG. 11.

FIG. 12 shows a side view of the embodiment of FIG. 11, and taken along a section plane "11" specified in FIG. 11. A buoy 210 floats adjacent to an upper surface 233 of a body of water. One end of a multi-stranded, laterally-distributed, cable 212/225, chain, rope, and/or flexible connector, passes downward through an aperture 211 in the buoy 210 where it is connected to a submerged inertial mass 226. Each strand of the multi-stranded cable 212/225 is wound around a pair of drums 213-214, pulleys, and/or rotating capstans, which increases the frictional binding between the cable and the drum. The other end of each strand of the multi-stranded cable 212 is affixed to drum 214. As waves, especially the heave, moves the buoy up and down, the cable 212 rotates the drums 213-214 which causes a shaft of generator 215, and/or power take-off (PTO), to rotate as well, thereby generating electrical power.

Within one end of buoy 210 is embedded a sealed and/or waterproof and/or water-tight "computational chamber and/or enclosure" 216. Computational chamber 216 is attached to an upper surface of buoy 210 by a flange 219. Those walls of the computational chamber 216 which are located below the flange 219, and the corresponding and/or adjacent walls of the buoy, are separated by a gap, space, and/or void 218. Within the space 218 and/or gap, the computational chamber 216 is surrounded by, and/or bathed in, a thermally-conductive fluid. A thermally-conductive plate 227 and/or wall is affixed to an upper surface of a "ledge" 228 at the base of the aperture 218 and/or space containing the thermally-conductive fluid 218. This structural configuration provides a secure surface on which to attach plate 227 while providing the downward surface of that plate with significant contact with the water below the buoy.

Heat-dissipating fins, e.g. 220, are attached and/or affixed to an upper surface of the computational chamber 216 and facilitate and/or expedite the transfer 231 of the heat trapped within the chambers to the air above and/or around the buoy. Heat-dissipating fins, e.g. 230, are also attached and/or affixed to a thermally-conductive plate 227, and/or wall, that separates the space 218 from the water 233 surrounding the buoy 210. The fins 230 allow heat conductively transmitted and/or transferred from the fluid 218 to the plate 227 to be more quickly and efficiently transmitted 232 and/or transferred to the water beneath the buoy.

Affixed to and/or within the computational chamber 216 is a plurality of computing devices, computing circuits, computers, and/or networked computers. At least some of those computing devices are energized, at least in part, with electrical power generated by the PTO 215. At least a portion of the heat generated by the computing devices within the computational chamber 216 is convectively transmitted to the thermally conductive upper wall of the chamber, and to the upper, e.g. 220, fins thereon, from which it is convectively transmitted and/or transferred to the air above the buoy.

At least a portion of the heat generated by the computing devices within the computational chamber 216 is convectively transmitted to the thermally conductive side and bottom walls of the chamber 216, and thereafter and/or therethrough to the heat-conductive fluid surrounding the chamber 216. At least a portion of the heat in the fluid 218 is transferred and/or transmitted to the plate 227, and thereafter and/or therethrough to lower fins, e.g. 230, thereon, from which it is convectively transmitted and/or transferred to the water below the buoy.

A pair of ducted fans, e.g. 221, are mounted to an upper surface of the buoy 210 and provide forward thrust with which the embodiment may propel itself across the surface 233 of the water on which it floats. When active, the ducted fans consume a portion of the electrical power generated by the generator 215. Through the controlled variation of, and/or the creation of a differential, thrust generated by the fans, and in conjunction with the directionally-stabilizing influence of the rudder-like fins 230, the buoy, may propel itself in any direction, and/or to any specific location (e.g. to specific geospatial coordinates) on the surface of the body of water.

FIG. 13 shows a side view of an embodiment of the present invention. The embodiment 431 incorporates an "attenuator" type of wave energy extraction technology, wherein buoyant cylinders, e.g. 430 and 431, float adjacent to the surface 432 of a body of water. As waves approach one end of the device (e.g. from the left side of the figure), and pass under the device, moving approximately parallel to the longitudinal axis of the device, the buoyant cylinders, e.g. 430 and 431, flex, e.g. 433 and 434, and buckle about intermediary hinged connectors, e.g. 435, as they approximately conform to the approximately sinusoidal profile of the waves.

Between each pair of buoyant cylinders is a power take-off (PTO) module, e.g. 435, and/or mechanism. In some embodiments, this PTO utilizes and/or incorporates hydraulic rams that convert the flexing adjacent buoyant cylinder motion into pressurized hydraulic fluid, which then flows through at least one hydraulic generator, thereby generating electrical power.

At least a portion of the electrical power generated in response to wave action on the device is stored in energy-storage modules, units, and/or assemblies, positioned within one or more of the buoyant cylinders, e.g. 430, and which may include, but are not limited to: batteries, capacitors, and/or chemical fuel (e.g. hydrogen) generators and storage mechanisms.

Also positioned within one or more of the buoyant cylinders, e.g. 430, are arrays, racks, and/or assemblies, of computing devices, computing circuits, computers, and/or computational equipment and/or resources. These computing circuits are energized, at least in part, by at least a portion of the electrical power generated by the PTOs, e.g. 435.

FIG. 14 shows a semi-transparent side view of the same embodiment of the current disclosure that is illustrated in FIG. 13. The embodiment 430 incorporates an "attenuator" type of wave energy extraction technology, wherein buoyant cylinders, e.g. 430, float adjacent to the surface 432 of a body of water. As waves approach one end of the device (e.g. from the left side of the figure), and pass under the device, moving approximately parallel to the longitudinal axis of the device, the buoyant cylinders, e.g. 430, flex and buckle about intermediary hinged connectors, e.g. 435, as they approximately conform to the approximately sinusoidal profile of the waves.

Between each pair of buoyant cylinders is a power take-off (PTO) module, e.g. 435, and/or mechanism. In some embodiments, this PTO utilizes and/or incorporates hydraulic rams that convert the flexing adjacent buoyant cylinder motion into pressurized hydraulic fluid, which then flows through at least one hydraulic generator, thereby generating electrical power.

At least a portion of the electrical power generated in response to wave action on the device is stored in energy-storage modules, e.g. 437, units, and/or assemblies, positioned within one or more of the buoyant cylinders, e.g. 430, and which may include, but are not limited to: batteries, capacitors, and/or chemical fuel (e.g. hydrogen) generators and storage mechanisms.

Also positioned within one or more of the buoyant cylinders, e.g. 430, are arrays, e.g. 436, racks, and/or assemblies, of computing devices, computing circuits, computers, and/or computational equipment and/or resources. These computing circuits are energized, at least in part, by at least a portion of the electrical power generated by the PTOs, e.g. 435. In some embodiments, the space, e.g. 438, within which the computers are affixed and operate is filled with air. In other embodiments, it is filled with a heat-conductive fluid, and/or a phase-change material. The heat transferred from the computers, as they consume electrical power, to the air or liquid surrounding them, is thereafter transferred to the thermally-conductive walls, and/or a portion thereof, which transfers it to the water on which the device floats. This process of heat transfer efficiently, convectively, and passively, cools the computers.

FIG. 15 shows a sectional view of the embodiment of FIG. 13, taken across a plane normal to the longitudinal axis of the device and one of its buoyant cylinders. As the buoyant cylinders, e.g. 430 and 431, flex in response to passing waves, the power take-off unit 435 between them converts some of the force arising from that flexing to the compression of hydraulic fluid, which is then used to turn the shaft of a generate and generate electrical power.

Positioned within one or more of the buoyant cylinders, e.g. 430, are collections, chambers, modules, and/or assemblies, including, and/or housing, various energy storage devices, mechanisms, and/or systems, including, but not limited to: batteries, capacitors, springs, components, features, circuits, devices, processes, and/or chemical fuel (e.g. hydrogen) generators and storage mechanisms.

Positioned within one or more of the buoyant cylinders, e.g. 430, are arrays, e.g. 436, racks, and/or assemblies, of computing devices, computing circuits, computers, and/or computational equipment and/or resources. These computing circuits are energized, at least in part, by at least a portion of the electrical power generated by the PTOs, e.g. 435, and/or by at least a portion of the electrical power stored in the energy storage devices, e.g. 437 and 439.

In some embodiments, the space, e.g. 438, within which the computers are affixed and operate is filled with air. In other embodiments, it is filled with a heat-conductive fluid, and/or a phase-change material. The heat transferred from the computers, as they consume electrical power, to the air or liquid surrounding them, is thereafter transferred to the thermally-conductive walls, and/or a portion thereof, which transfers it to the water on which the device floats. This process of heat transfer efficiently, convectively, and passively, cools the computers.

Figure 16:
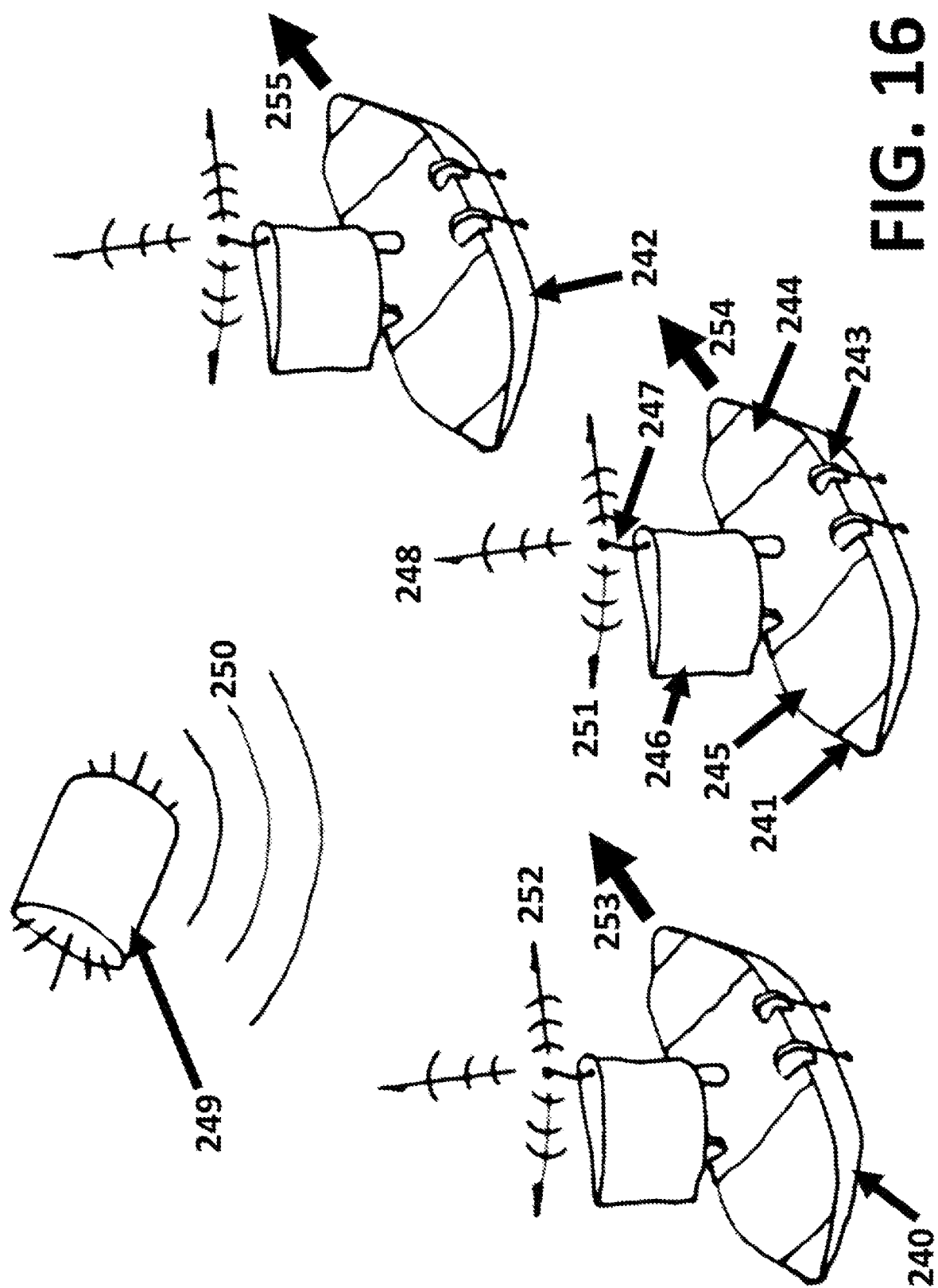
FIG. 16 is a schematic diagram of three buoys of the present invention interacting with a satellite.

FIG. 16 shows a perspective view of three embodiments 240-242 of the current disclosure as their sail in formation across the surface of a body of water. These devices are similar to the one illustrated and discussed in relation to FIGS. 4-7.

Rigid sails, e.g. 246, allow the devices to generate thrust 253-255 when buffeted by winds of sufficient speed and stability. In sealed chambers and/or enclosures, e.g. 244-245, affixed to their upper surfaces are enclosed computing devices that are energized, at least in part, by electrical power generated by the PTOs, e.g. 243, on each device. These computing devices perform calculations, at least some of which provided by, and/or coordinated with, a remote source and/or server. Each device has an antenna, e.g. 247, with and/or through which it exchanges, e.g. 248 and 250, data with a satellite 249, and/or with each other, e.g. 251-252.

In some embodiments, a single device, e.g. 241, transmits 248 data to, and/or receives 250 data from, the satellite 249. This single "interface device" 241 then communicates data received from the satellite 249 to, e.g. 251, each of the other devices, e.g. 240. This interface device 241 also receives, e.g. 252, the data from each other device, e.g. 240, and may transmit some or all of that data, perhaps after synthesis with data supplied by other devices, to the satellite from where it is forwarded to a remote source and/or server.

Figure 17:
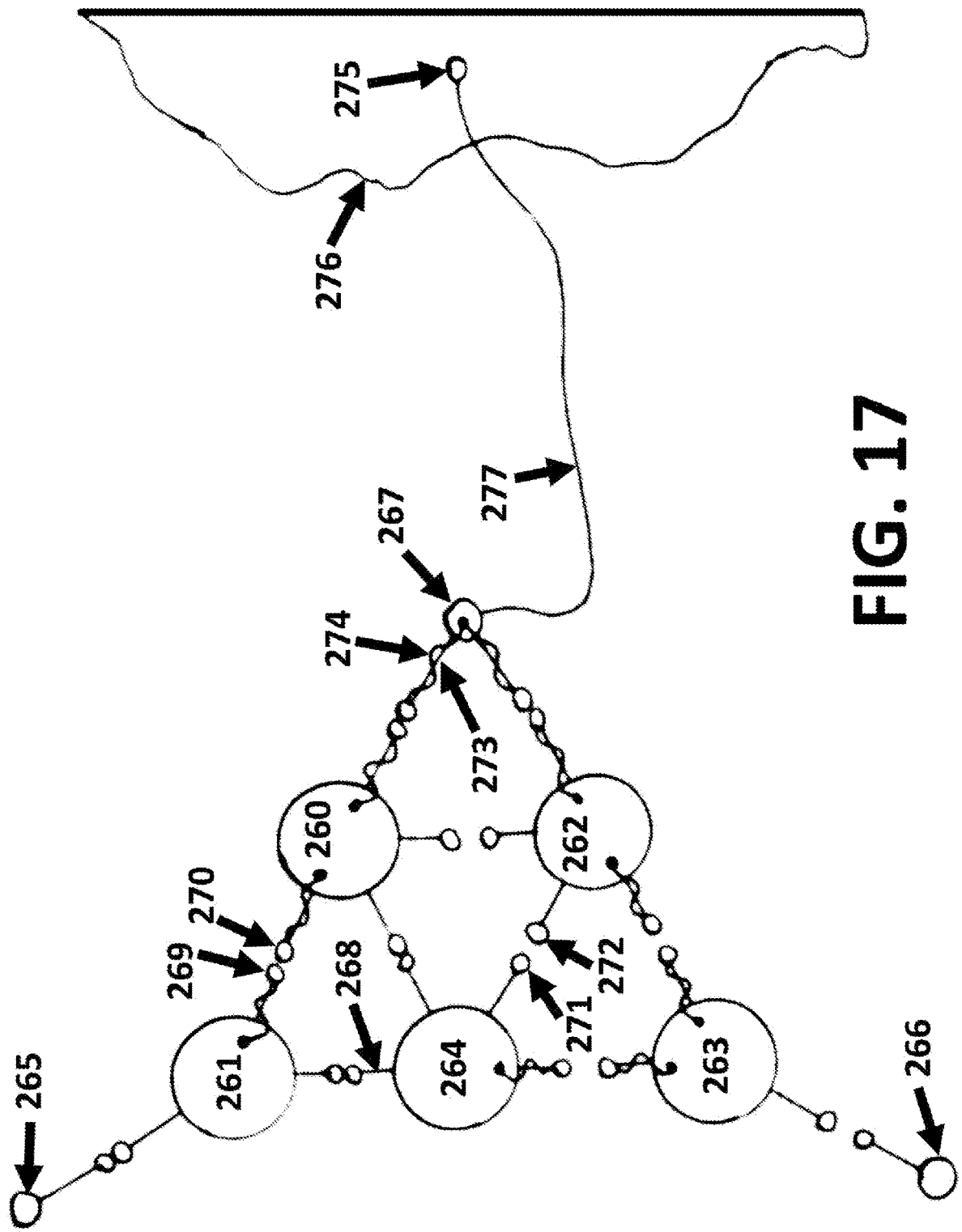
FIG. 17 is a schematic diagram of an arrangement of buoys of the present invention.

FIG. 17 shows a perspective view of five embodiments 260-264 of the current disclosure that are tethered and/or moored, e.g. 268, to one another, thereby comprising a "farm," and four of those devices are tethered and/or moored to three anchored mooring buoys, e.g. 266.

Device 260 is both moored, and electrically connected, to device 261. A mooring cable is connected to device 260 and to float 270. A mooring cable is likewise connected to device 261 and float 269. The two floats are together supported a weight suspended beneath them be a cable to each. This assembly provides a single mooring connector and/or tether connecting devices 260 and 261. It also provides elasticity to the connection, because if or when devices 260 and 261 move apart the two floats 269-270 are pulled apart, thereby lifting the weight suspended beneath them. This lifting of the weight provides a restoring force that will eventually pull the devices back together again. Each pair of devices in the illustrated farm are connected together by such elastic mooring connectors.

Four of the devices 260-263 are elastically connected to floats 265-267 which are in turn attached and/or connected to anchors resting on, and/or other anchoring means (e.g. screws) embedded in, the seafloor. At least some of the devices 260-264 contain and/or incorporate computing devices, computing circuits, computers, and/or computational resources, that enable them to execute programs, e.g. arbitrary programs provided by a remote source and/or server, sometimes executed relative to specific bodies and/or collections of data.

Electrical cables, e.g. 274, are connected to, and/or supported by, some of the elastic mooring tethers, e.g. 273, comprise, create, and/or constitute, an electrical grid within and/or across the farm. In various embodiments, these electrical cables include, but are not limited to: fiber-optic cables, LAN cables, Ethernet cables, and electrical power cables. Likewise, a subsea electrical cable 277 connects the farm's electrical and/or data grid to terrestrial electrical power grids and/or terrestrial data networks, e.g. the Internet.

Because of their interconnection by such electrical and/or data-transmission cables, the devices 260-264 may operate within a shared "virtual" computing network, and therefore and/or thereby may share data, parallelize programs, shard parameter ranges, etc. Also, by means of subsea electrical and/or data cable 277, the farm, and/or the devices therein, may obtain programs, and/or other computational tasks, from a remote source and/or server, by means of a terrestrial data network, such as the Internet. Likewise, the results and/or data resulting from the completed execution of a program may be returned to the remote source and/or server by means of the subsea cable 277 and an attached data network, such as the Internet.

The illustrated configuration is consistent with any of the individual device embodiments illustrated and discussed in relation to FIGS. 1-15, even those embodiments that are self-propelled. The use of device-specific propulsion can reduce mooring and/or anchoring requirements thereby reducing the cost of such a farm and/or its deployment.

Figure 18:
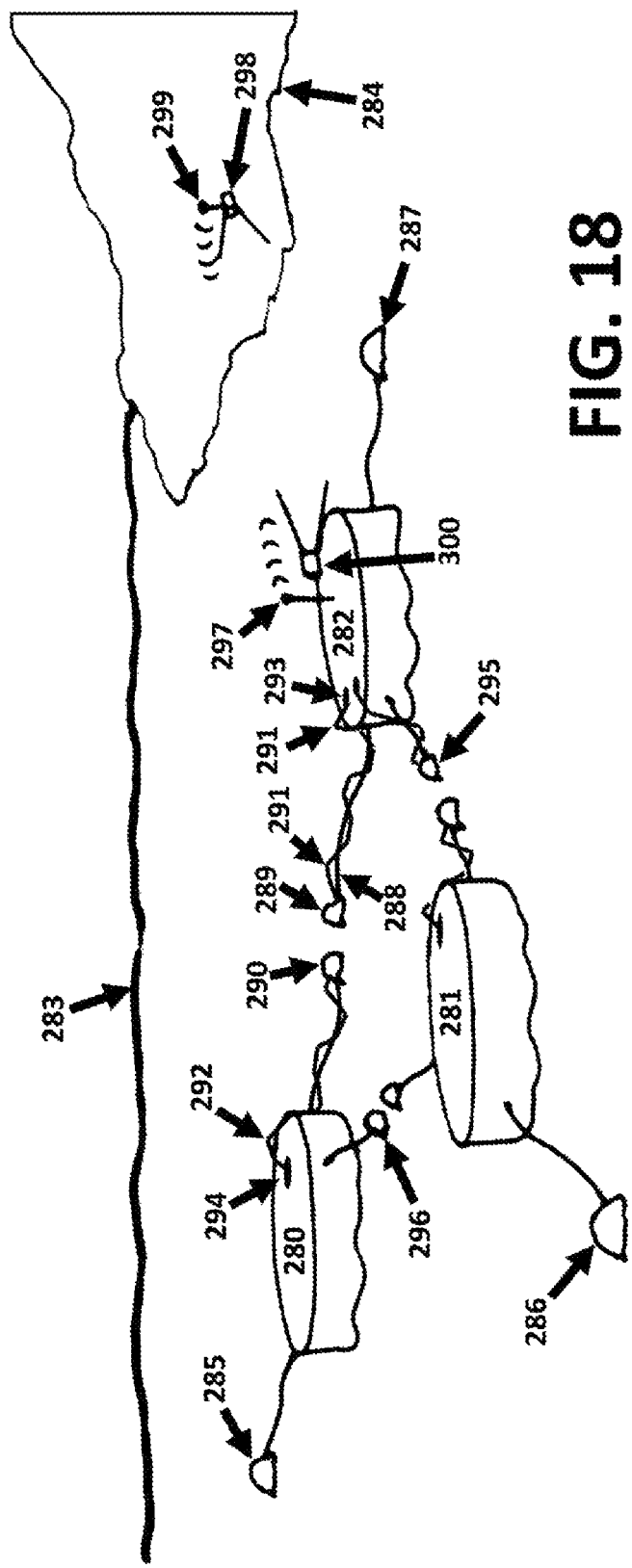
FIG. 18 is an elevated, perspective view of an arrangement of buoys of the present invention.

FIG. 18 shows a perspective view of three embodiments 280-282 of the current disclosure that are tethered and/or moored, e.g. 295, to one another, thereby comprising a "farm," and each of those devices are tethered and/or moored to an anchored mooring buoy, e.g. 286. Each device is both physically moored, and directly or indirectly electrically interconnected, to every other device. The devices are interconnected by means of the same type of "elastic" mooring connectors and/or cables as are discussed in relation to FIG. 17. And, devices 280 and 282, as well as devices 281 and 282, are interconnected electrically and/or are able to share data, by means of electrical cables, e.g. 291, that are connected to, and/or supported by, their respective mooring cables.

These electrical cables comprise, create, and/or constitute, an electrical grid within and/or across the farm. In various embodiments, these electrical cables include, but are not limited to: fiber-optic cables, LAN cables, Ethernet cables, and electrical power cables. Devices that share, and/or are interconnected with respect to, electrical power are able to share and/or distribute electrical power generated by their respective generators in response to wave action. Devices that share, and/or are interconnected with respect to, electrical power are also able to share electrical energy stored within batteries, capacitors, springs, components, features, circuits, devices, processes, and/or chemical fuel (e.g. hydrogen) generators and storage mechanisms.

At least some of the devices 280-282 contain and/or incorporate computing devices, computing circuits, computers, and/or computational resources, that enable them to execute programs, e.g. arbitrary programs provided by a remote source and/or server, sometimes executed relative to specific bodies and/or collections of data.

Because of their interconnection by such electrical and/or data-transmission cables, the devices 280-282 may operate within a shared "virtual" computing network, and therefore and/or thereby may share data, parallelize programs, shard parameter ranges, etc.

The farm illustrated in FIG. 18 is not connected to land by a subsea electrical cable. However, the farm, and/or the devices therein, share data with a terrestrial data network, such as the Internet, by means of a light-modulated data exchange system. Device 282 has a light 297 that emits modulated light, preferably of a specific wavelength, in which the modulations encode data, and in which that data is preferably encrypted. A receiving camera 298 on land detects the modulated light transmissions and decodes them and transmits them over a data network, such as the Internet, with a remote computer and/or server.

Likewise, a light 299 on shore emits modulated light, preferably of a specific wavelength, in which the modulations encode data received from a remote computer and/or server, and in which that data is preferably encrypted. A receiving camera 300 on device 282 detects the modulated light transmissions from land and decodes them and, when and where appropriate, transmits them over the farm's data grid to one or both other devices 280-281.

In some embodiments, device 282 has an antenna 297, and uses it to exchange data via radio transmissions with a station on land possessing a complementary antenna 299.

The illustrated configuration is consistent with any of the individual device embodiments illustrated and discussed in relation to FIGS. 1-15, even those embodiments that are self-propelled. The use of device-specific propulsion can reduce mooring and/or anchoring requirements thereby reducing the cost of such a farm and/or its deployment. In fact, some embodiments are similar to the one illustrated in FIG. 18 except that they do not include anchors, nor their associated anchored mooring buoys, e.g. 285-287. Instead, farms of these embodiments, utilize their on propulsive systems to retain their positions relative to one another and relative to a particular point on an adjacent land mass.

Some embodiments are similar to the one illustrated in FIG. 18 except that they do not include anchors, nor their associated anchored mooring buoys, e.g. 285-287, and they use an antenna 297 to exchange data with a terrestrial data network, such as the Internet, by means of a satellite. Farms of these embodiments, utilize their own propulsive systems to maintain their positions relative to one another.

Figure 19:
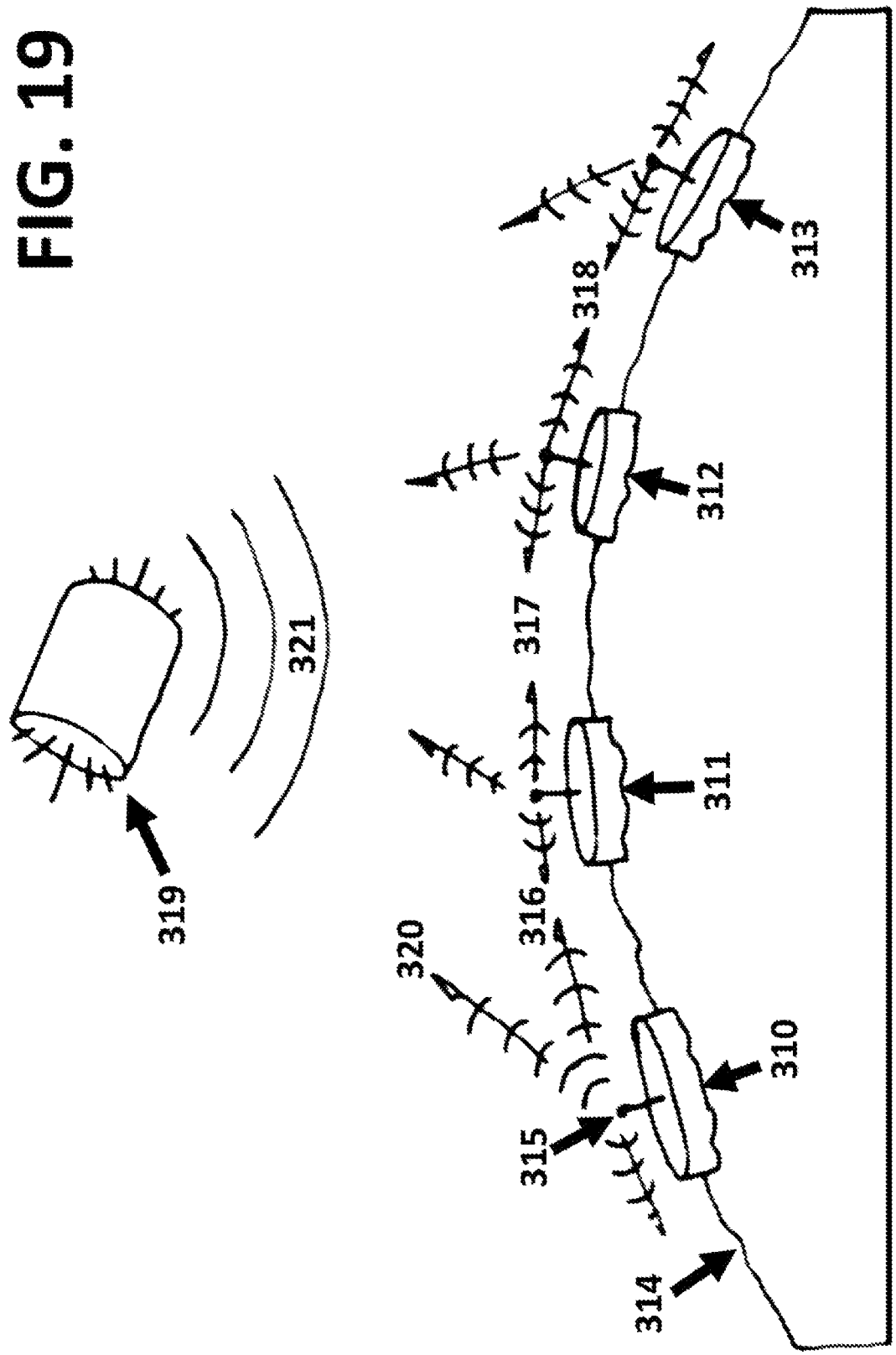
FIG. 19 is a schematic view of a plurality of buoys interacting with a satellite.

FIG. 19 shows a perspective view of four embodiments of the current disclosure floating adjacent to the surface 314 of a body of water (e.g. a sea) wherein the devices are distributed across the surface of the body of water at such distances that only adjacent (though widely separated) devices are within range of one another's data exchange and/or communication systems. However, in addition to directly communicating with each of its neighboring devices, each device is able to communicate with a satellite 319.

Device 310 is able to transmit 316 and receive electromagnetic transmissions, with neighboring device 311. However, device 310 is not able to directly communicate and/or share data with devices 312 and 313. Device 310 is able to indirectly transmit data to, and receive data from, devices 312 and 313 by using at least device 311 to daisy-chain, and/or pass along, those transmissions.

With respect to some embodiments, and/or some deployments, devices 310-313 are only able to communicate via direct communications and/or indirect, daisy-chained communications. With respect to some embodiments, and/or some deployments, devices 310-313 are only able to communicate with satellite 319. For example, device 310 has an antenna 315 with which it can transmit 320 data to satellite 319, and from which it can receive data transmitted 321 from the satellite. Communication between devices is moderated by the intermediate satellite 319 link, and/or by a remote computer and/or server with which satellite 319 is able to communicate. And, with respect to some embodiments, and/or some deployments, devices 310-313 are able to communicate with other devices by either direct and/or daisy-chained, and/or satellite-mediated, communication pathways.

Figure 20:
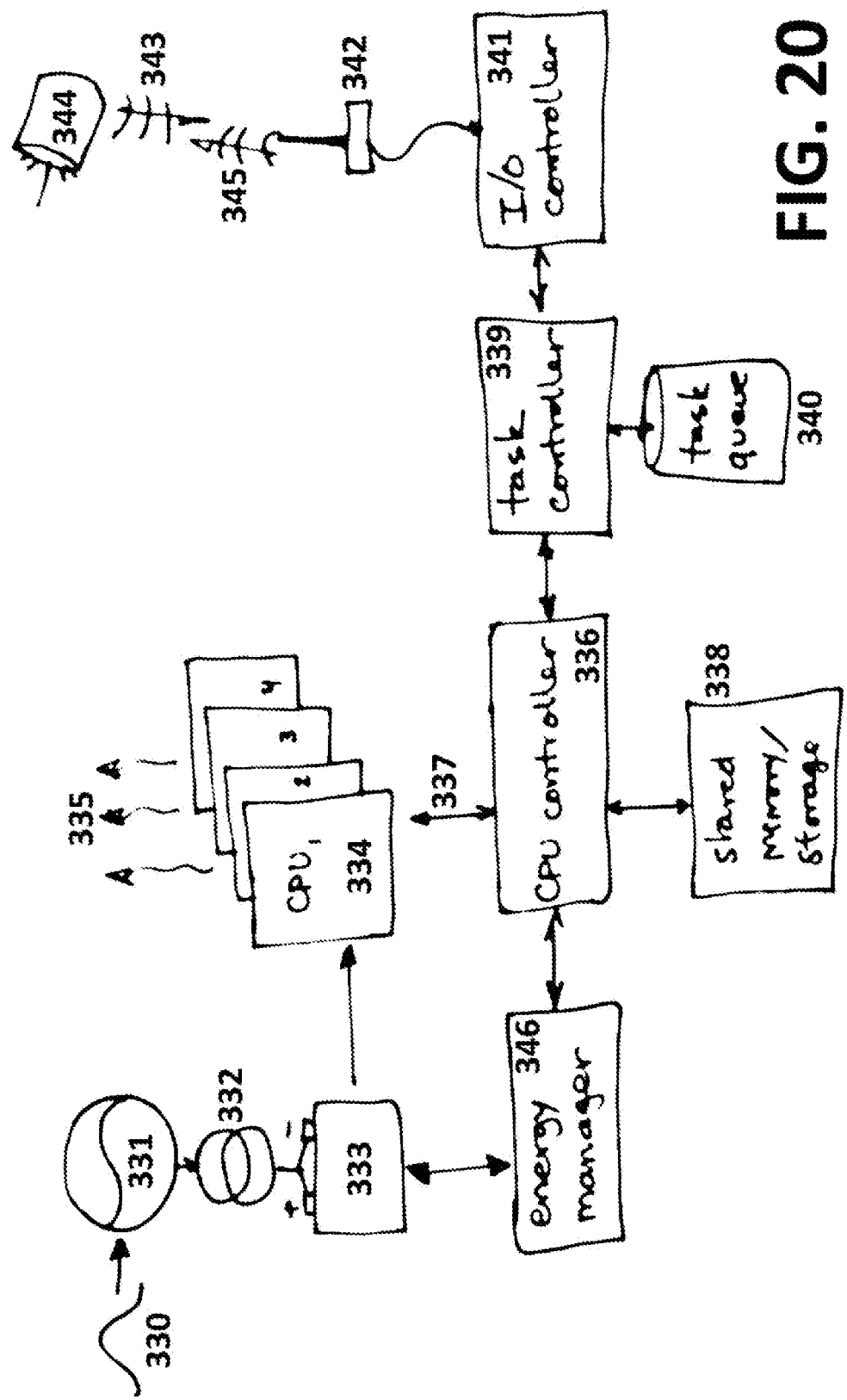
FIG. 20 is a process diagram of the buoys of the present invention.

FIG. 20 illustrates the processes, systems, and/or functional modules, that are characteristic of some embodiments of the present invention.

A wave 330 moves an embodiment of the current disclosure, leading to a generator's 331 generation of an alternating electrical current (AC). That AC is then rectified 332 to convert at least a portion of that electrical power into a variable direct electrical current (DC) which is then used to impart energy to an energy-storage module 333, system, and/or mechanism, that may include, but is not limited to: batteries, capacitors, springs, components, features, circuits, devices, processes, and/or chemical fuel (e.g. hydrogen) generators and storage mechanisms.

At least a portion of the energy stored in energy storage module 333 is used to energize, power, and/or satisfy the electrical requirements of a plurality of computing devices 334, computing circuits, and/or computational resources. As a consequence of their operation, and consumption of electrical power, the computing devices 334 generate heat 335 that is passively, and/or convectively, and/or actively (e.g. through the use of fans), transmitted to the environment around and/or adjacent to the embodiment.

A radio 342, and/or data transmission system, within the embodiment, receives programs, tasks (e.g. such as might be executed by new or existing programs loaded into the device's memory), data, instructions, messages, signals, and/or other data, originating with from a remote computer and/or server, that have been transmitted 343 by a satellite 344. The data generated by a program, status information (e.g. related to pending programs, tasks, computers, energy storage, wave conditions, weather, vessel sightings, etc.), geolocation data, and/or other data, is transmitted 345 by the embodiment's radio 342, and/or data transmission system, to the satellite, which then transmits it to a remote network, computer, and/or server.

The data received by, and/or transmitted to, the satellite 344 is cached, formatted, encrypted or decrypted, and/or managed and/or orchestrated, by an "I/O controller" 341. The I/O controller 341 communicates and/or exchanges data with a "task controller" 339.

The task controller 339 is responsible for, among other things: storing new programs and/or tasks in a "task queue" 340; determining which pending task and/or program is of highest priority, and/or which, for any other reason, including estimated resource requirements, will be next executed; retrieving a task and/or program to be executed when a computer (and/or the requisite number of computers) becomes available (among the computers in 334); submitting a task and/or program, along with any related data, to the "CPU controller" 336 in response to the CPU controller notifying the task controller 339 that one or more computers 334 and/or other computing resources are available and/or "free;" receiving a notification that the execution of task and/or program has been completed, as well as receiving the data that resulted from the execution of the task and/or program; and receiving a notification that the execution of task and/or program was cancelled (e.g. in response to a reduction in the amount of available energy, and the consequent powering down of one or more computers 334); reassessing the priority and/or updating the execution status of a task cancelled by the CPU controller 336; and deleting a task and/or program from the task queue 340 when the embodiment is informed (e.g. by a transmission from satellite 344) that the task is no longer in need of execution (e.g. when another device has already completed the task, or the task has been cancelled by its originator).

The CPU controller 336 is responsible for, among other things: launching the execution of tasks and/or programs on the computers 334, and for collecting the data resulting from their execution and transmitting it to the task controller 339, which, in turn, transmits the data to the I/O controller 341 which transmits 345 it to the satellite 344; notifying the task controller 339 that one or more computers 334 are free and/or available to begin the execution of one or more new tasks and/or programs, and/or updating the task controller 339 as to the number and kind of computational resources available for the execution of new tasks and/or programs; cancelling one or more executing tasks and/or programs, and/or powering down their respective computers and/or computational resources, so as to reduce the amount of electrical power being consumed; and, powering up, and/or initializing, dormant computers and/or computational resources when the amount of available electrical power increases.

"Shared memory storage" 338 is comprised of a networked set of digital data memory devices which store, and from which may be retrieved, programs, program data, and/or other digital data. CPU controller 336 uses the shared memory storage in order to configure, initialize, and execute, programs and/or tasks, and to store data generated by programs and/or tasks during their execution.

The "energy manager" 346 monitors that rate at which electrical power is being generated, and the amount of electrical energy that is available from the energy storage module 333. When the amount of electrical energy and/or power changes, the energy manager 346 so notifies the CPU controller 336 which may respond to the change by, among other things, increasing or reducing the number operational computers and/or computing resources. Note that "ASICs" can replace "CPUs" throughout the present figure description.

In some embodiments, the energy manager turns on and off certain CPUs within the timespan of a single wave period, e.g. within the span of 15 seconds.

The task controller 339 may select a task from among the set of available pending tasks on the basis of many factors, and/or the likelihood that any particular pending task will be selected for execution can be influenced by many factors, including, but not limited to: any relative priority specified at the time of the task's receipt by the embodiment (such priority may have been the result of many factors, including, but not limited to: the priority assigned by a remote computer and/or server on the basis of the degree to which the price offered for the task's execution by a client included a premium); the amount and/or type of computational resources that will be required for the execution of the task, and the degree to which those computational resources are available, and/or the relative priority of other tasks in combination with the degree to which those other tasks require similar resources; and the likelihood that another device will complete the execution the task before its execution can be completed on the present device, for example, a task that has been pending for a relatively long time, i.e. a task that has suffered a long delay before its execution has even begun, may be less likely to be completed before a signal is received indicating the task has been completed elsewhere and should be cancelled before its execution is complete.

Figure 21:
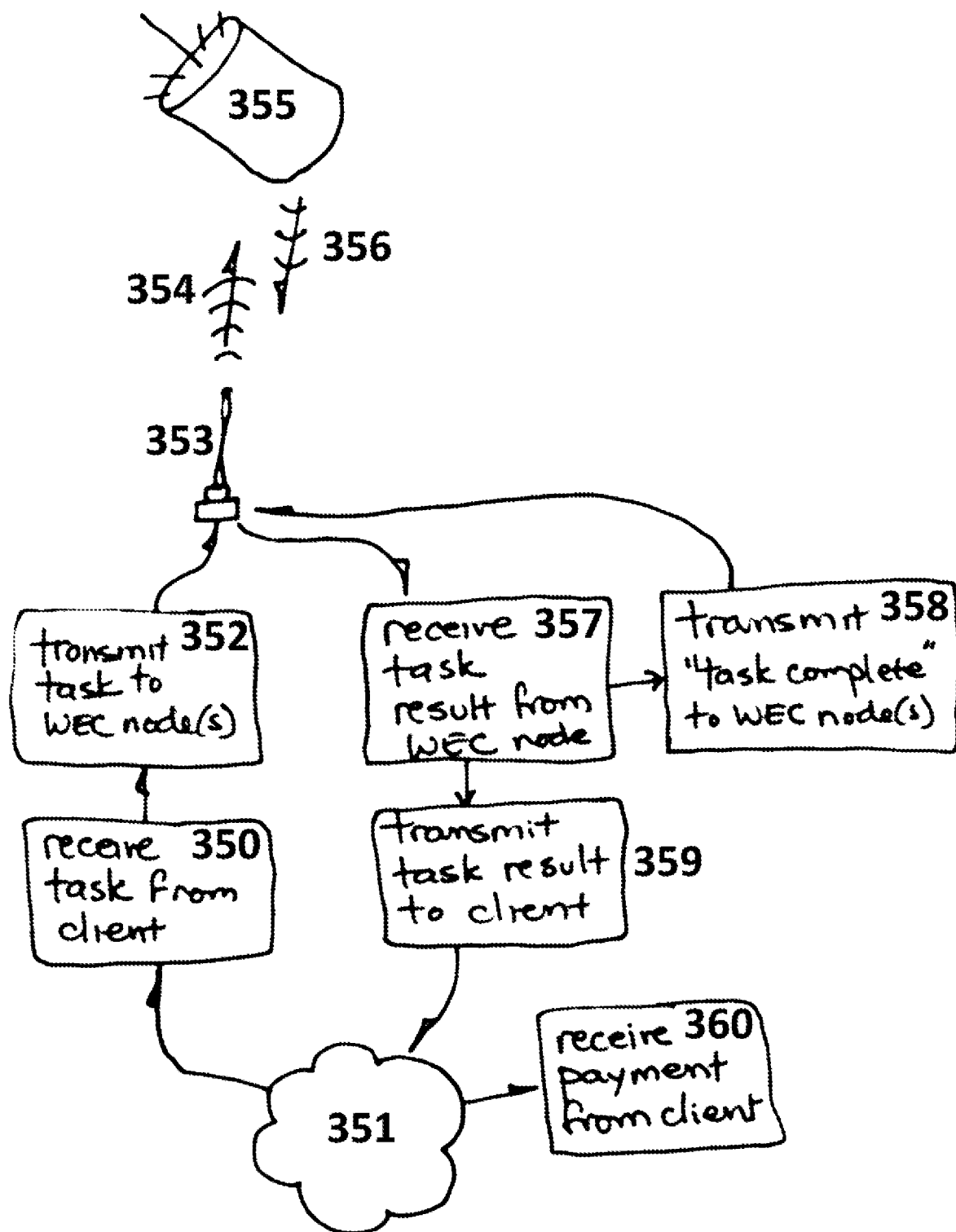
FIG. 21 is a process diagram of the task administration system of the present invention.

FIG. 21 illustrates the processes and/or events that are characteristic of a "task administration system" and the issuance of programs and/or tasks to embodiments of the current disclosure, and the receipt and post-execution processing of the results of the completed programs and/or tasks.

A task administration system receives 350 from a client (e.g. a person wishing to have a program and/or task executed) a program and/or task and any related data from a transmission communicated across and/or through a data-sharing network 351, such as the Internet. The task administration system 352 transmits 354 the program and/or task and any related data, preferably after encrypting it, via a transceiver 353, and/or data communication system, to a satellite 355 which then, directly and/or indirectly transmits it to one or more embodiments of the present invention.

After the "result data" related to, and/or created as a consequence of, the completion of the program and/or task's execution, is returned by an embodiment of the current disclosure directly and/or indirectly to satellite 355, the satellite 355 transmits 356 the result data to the transceiver 353, and/or data communication system. The result data 357 is received (and possibly decrypted) by the task administration system. The task administration system then 359 transmits the result data to the client, via the data communication system 351. And, hopefully, 360 payment is received from the client.

When the result data is received, and preferably validated, by the task administration system, the system transmits 354, via the transceiver 353, a signal to all of the embodiments of the current disclosure that received the program and/or task, which will prompt them to delete the program and/or task from their task queues.

Figure 22:
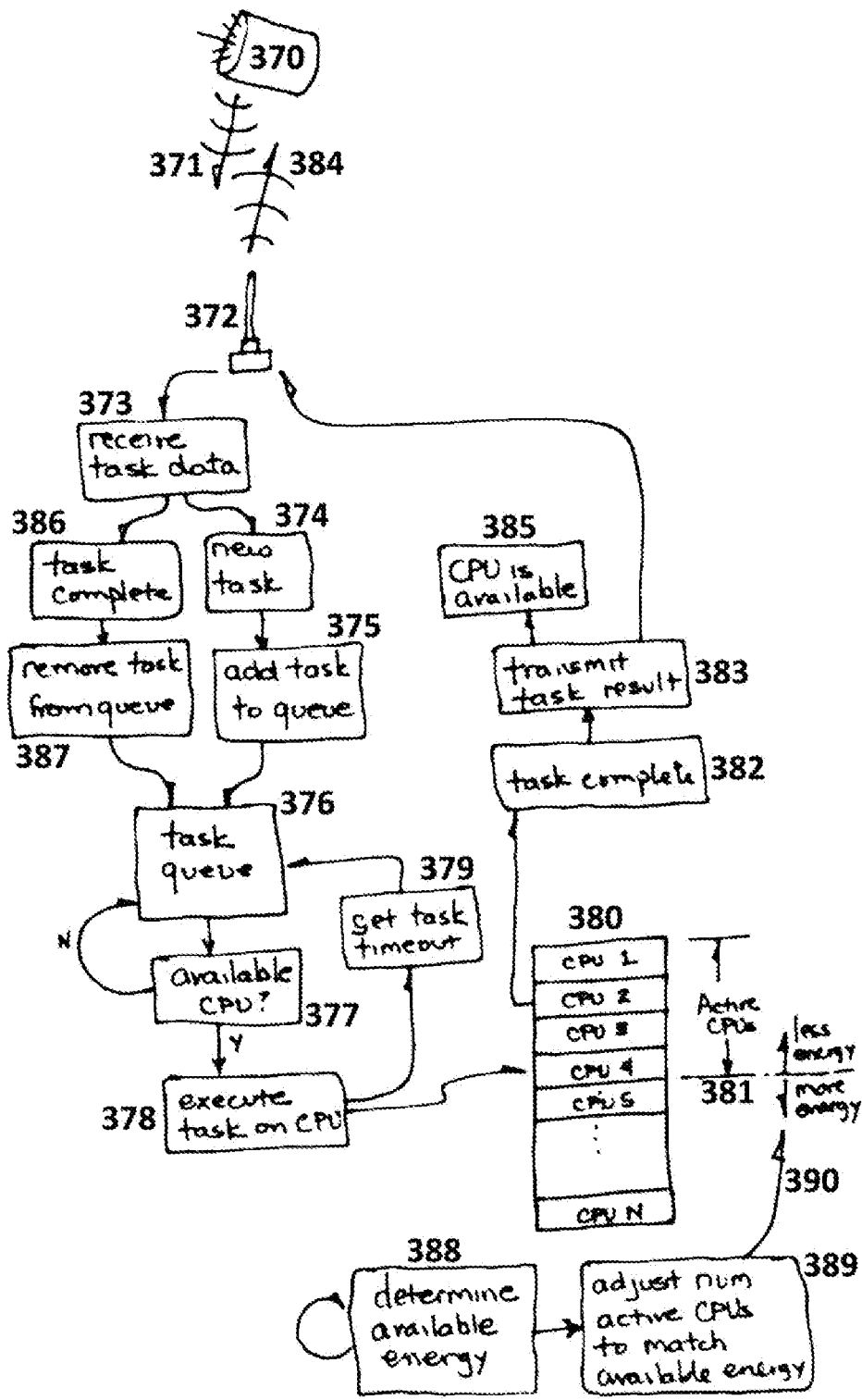
FIG. 22 is a process diagram of an alternate embodiment of the present invention.

FIG. 22 illustrates the processes and/or events that are characteristic of some embodiments of the present invention. A satellite 370 transmits 371 a data packet to a transceiver 372, and/or data communication system, on an embodiment of the present invention. The embodiment 373 receives, validates, and possibly decrypts, the "task data" encoded within the data packet. If the task data 374 specifies a new program and/or task, and any related data, then 374 the embodiment 375 adds the new task and its related data (if any) to its task queue 376.

When 377 there is an available CPU, computer, and/or sufficient available computing resources, then 378 a pending task is identified and/or selected, and its execution is started on the available CPU 380. A "timeout" value 379 is associated with the selected pending task in the task queue 376. This timeout value represents a future time after which it will be reasonable for the embodiment to assume that the task's execution has failed, and its, presumably frozen and/or failed execution, should be stopped and its respective CPU(s), and/or computer(s), should be re-initialized and used to execute a new (and/or the same failed) task.

When 382 the execution of a task is complete, then the data generated by the task during its execution 373 is transmitted 384, via the transceiver 372 to a satellite 370, where the task-generated data will be processed by a remote computer and/or server. Contemporaneously with the transmission of the task-generated data to the satellite, 385 the status of the CPU(s) and/or computer(s) that executed and/or completed the task are changed to "available" and ready for the execution of a new task [related to the 377 evaluation of the evaluation of the statuses of the CPUs and/or computers 380.

The remote computer and/or server that receives the task-generated data is responsible for transmitting a signal to this embodiment, and any other embodiments to which the same task was transmitted, that the task is now complete. When the satellite 370 transmits 371 to the embodiment's transceiver 372, and/or data communication system, the embodiment 373 receives, validates, and possibly decrypts, the "task data" encoded within the data packet. If the task data specifies 386 that a task is complete, then 387 the task is removed from the embodiment's task queue 376.

The amount of electrical energy available on the embodiment is 388 continually and/or periodically determined. When the amount of available electrical energy changes (e.g. by a threshold amount) then 389 the number of CPUs and/or computer(s) whose operation can be powered is determined. If the amount of available electrical energy has increased then 390 an appropriate number of dormant and/or unpowered CPUs and/or computer(s) are started, initialized, and made ready for the execution of tasks. If the amount of available electrical energy has decreased then 390 an appropriate number of active and/or operational CPUs and/or computer(s) are stopped, and made dormant, in order to reduce the amount of energy being consumed by computational activities.

When a task is selected, from among the set of available pending tasks, to be executed on an available CPU and/or computer, the determination as to which task to select may be made on the basis of many factors, and/or the likelihood that any particular pending task will be selected for execution can be influenced by many factors, including, but not limited to: any relative priority specified at the time of the task's receipt by the embodiment (such priority may have been the result of many factors, including, but not limited to: the priority assigned by a remote computer and/or server on the basis of the degree to which the price offered for the task's execution by a client included a premium); the amount and/or type of computational resources that will be required for the execution of the task, and the degree to which those computational resources are available, and/or the relative priority of other tasks in combination with the degree to which those other tasks require similar resources; and the likelihood that another device will complete the execution the task before its execution can be completed on the present device, for example, a task that has been pending for a relatively long time, i.e. a task that has suffered a long delay before its execution has even begun, may be less likely to be completed before a signal is received indicating the task has been completed elsewhere and should be cancelled before its execution is complete.

Figure 23:
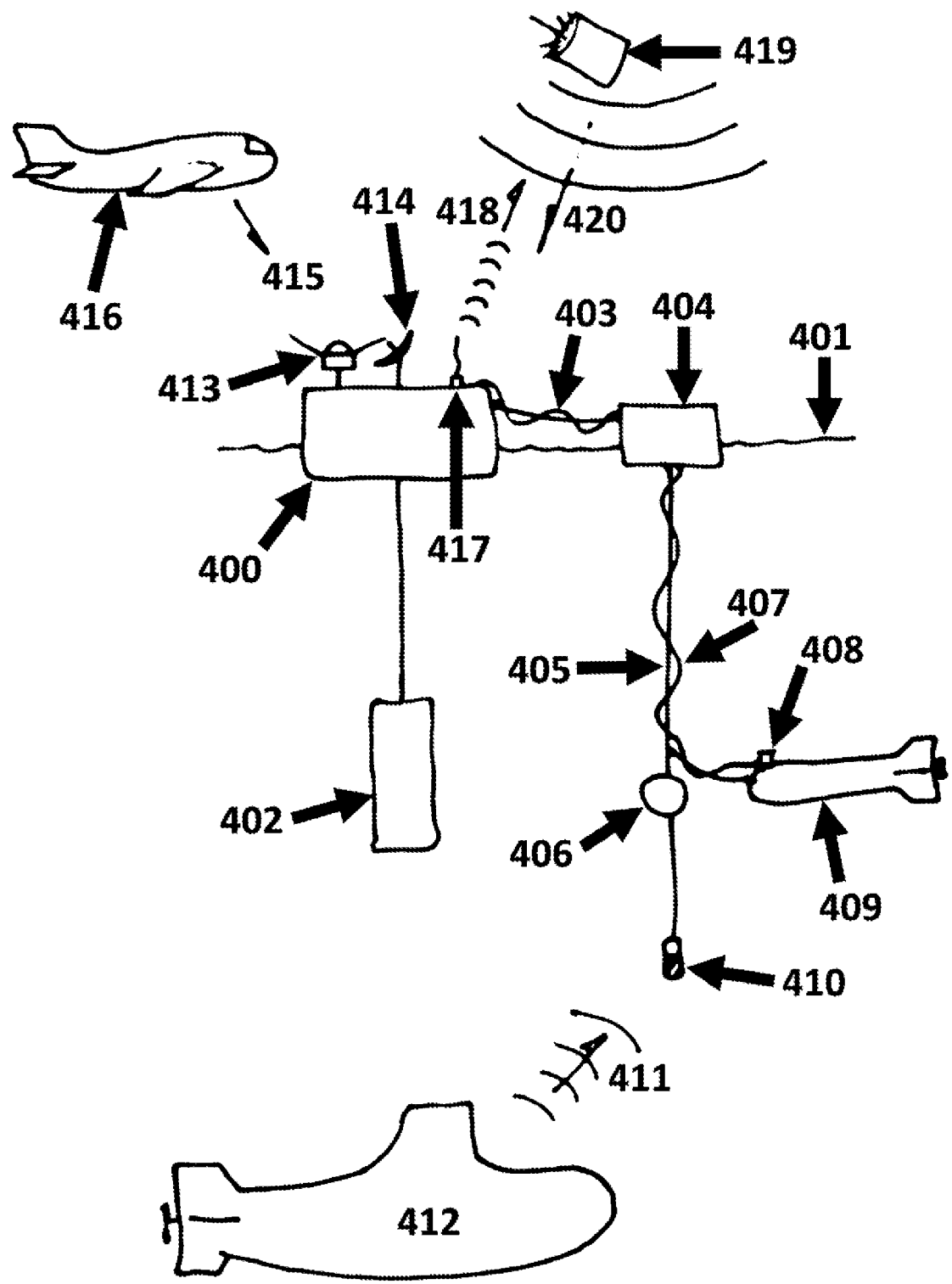
FIG. 23 is a diagram of an alternate embodiment of the present invention.

FIG. 23 shows an illustration of an embodiment of the present invention. An embodiment 400 of the current disclosure generates electrical power when wave motion at the surface 401 of the body of water on which the buoy floats, moves the embodiment and its connected submerged power-generation mechanism 402.

The embodiment can (but need not) store at least a portion of the electrical power that it generates within optional internal energy storage devices, e.g. batteries, capacitors, springs, components, features, circuits, devices, processes, and/or chemical fuel (e.g. hydrogen) generators and storage mechanisms.

The embodiment can use at least a portion of that stored electrical energy, and/or of its dynamically-generated electrical power, to energize a camera 413 that monitors the sky in order to detect, and characterize, overflying aircraft, e.g. 416. When it detects an aircraft, it reports 418 to a satellite 419, via transceiver 417, the detection and any characterizing data (e.g. altitude, direction and speed) to a remote computer and/or server.

The embodiment can use at least a portion of that stored electrical energy, and/or of its dynamically-generated electrical power, to energize a radar system 414 that monitors the sky in order to detect, and characterize, radar signals reflected 415 from overflying aircraft, e.g. 416. When it detects an aircraft, it reports 418 to a satellite 419, via transceiver 417, the detection and any characterizing data (e.g. altitude, direction and speed) to a remote computer and/or server.

The embodiment 400 is connected by a mooring cable, in combination with an electrical and data cable 403, to a secondary buoy 404 from which depends a mooring cable 405 at the deep end of which is attached a weight 406 and a hydrophone 410. The hydrophone can detect ambient noises from within the body of water 401, which might include sounds 411 from submarines 412.

When the embodiment's hydrophone detects a submarine, or other submerged vessel, it reports 418 to a satellite 419, via transceiver 417, the detection and any characterizing data (e.g. audio signature, depth, direction and speed) to a remote computer and/or server. Or, the embodiment relays unprocessed acoustic signals directly to the satellite for processing.

The embodiment 400 is able to receive encrypted data transmitted 420 from a satellite, and originating from a remote computer and/or server, which it can cache and/or store in digital memory components (e.g. static RAM), devices, and/or systems.

From the secondary buoy 404 depends both a mooring cable 405 and an electrical power and data communication (e.g. network) cable 407, i.e. an "umbilical cable." Submerged vessels, e.g. 409, are able to connect to the submerged mooring cable 405, as well as connect (at 408) to the submerged electrical power and data transmission (e.g. network) cable 407. When a submerged vessel 409, e.g. an autonomous underwater vessel, connects to the umbilical cable it is able to recharge its energy storage devices. It is also able to download encrypted data stored in the onboard memory of the embodiment 400. In some embodiments, the submerged vessel docks to a chute, indentation, hub, or other similar mooring attachment of the embodiment.

Following its connection to the umbilical cable, a submerged and/or autonomous vessel 409 is able to exchange data with a remote computer and/or server, e.g. to receive commands, geospatial locations and/or maps, situational awareness data, etc.

Some embodiments of the device 400 use at least a portion of their stored electrical energy, and/or of its dynamically-generated electrical power, to energize a listening device 414 that listens for electromagnetic transmissions, such as those that might be emitted 415 by overflying aircraft 416. When the listening device detects an aircraft, it reports 418 to a satellite 419, via transceiver 417, the detection and any characterizing data (e.g. altitude, direction and speed) to a remote computer and/or server. Some embodiments of the device 400 will not have, nor need, a weight 406 at the end of the mooring cable 405. For instance, if mooring cable 405 is a chain, its own weight will be sufficient to stabilize its orientation, i.e. vertically beneath secondary buoy 404.

As aforementioned, in some embodiments, a power regulation circuit directs power to computing circuits to (perform computational tasks) during normal operation and redirects power to charge a drone when, occasionally, a drone is present. In some embodiments, a power regulation circuit directs power to computing circuits to (perform computational tasks) during normal operation and redirects power to sensors (such as radar, sonar, etc.) when directed to do so by a remote control signal. In some embodiments, a power regulation circuit directs power to computing circuits to (perform computational tasks) during normal operation and redirects power to sensors (such as radar, sonar, etc.) when the acoustic signature of a nearby vessel (such as a submarine) is detected.

Figure 24:
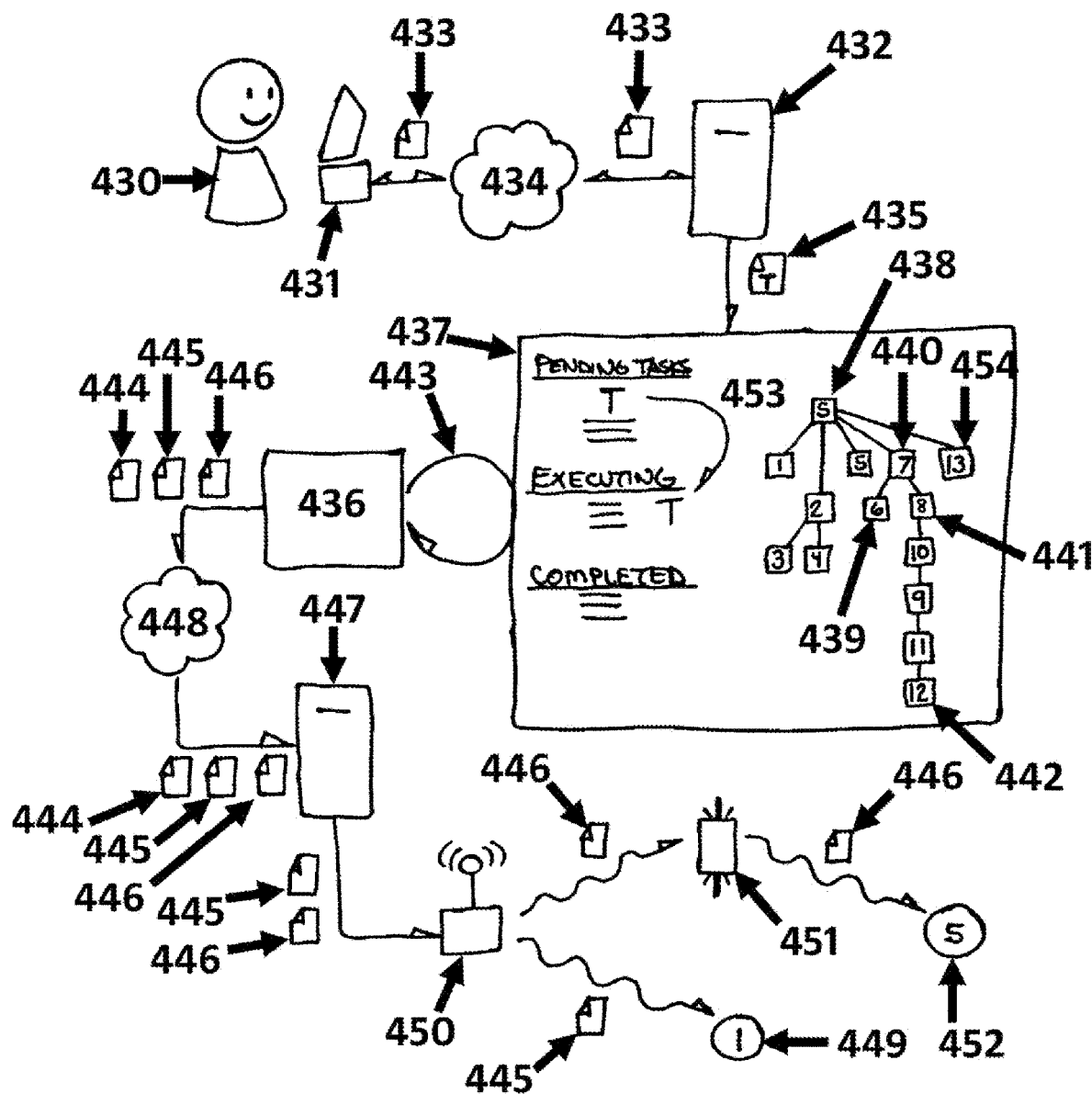
FIG. 24 is flow chart of a process of an embodiment of the present invention.

FIG. 24 illustrates a simplified representative flow chart that describes in approximate terms one process by which one or more embodiments of the present disclosure might be used to execute a customer-specified, arbitrary computational task. A company, corporation, and/or organization, uses an embodiment of the present disclosure to provide "computation as a service" for which its customers pay a fee.

A customer 430 of the company uses a proprietary computational device 431 to interact with a company server 432 by exchanging data, files, and/or messages 433 through a data network 434 (e.g., the Internet). Server 432 sends a program or formatted block of data (e.g., HTML) 433 to the customer's computer 431 which renders a user interface within a browser running on the customer's computer. The customer interacts with that user interface so as to formulate a structured data set 433 that is transmitted to the server 432, and which may contain including, but not limited to: the program (or an identifier or URL through which the program to be executed on behalf of the customer may be found and obtained by the server), the data (if any) which will initialize the program, the number of times the program is to be executed, the maximum amount of time which the customer is willing to wait for the results (e.g., the "deadline"), the "resolution" of the analysis and/or the results (e.g., how many vertices to use in a finite-element analysis of a structure), the format of the result data (e.g., JPEG for a result comprising images), etc.

The server 432 packages the "task specification (T)" 435 which it transmits to a "task manager" 436/437. The task manager 436 maintains a database (and/or other data structure) that may include, but is not limited to: which tasks are "completed," which tasks are currently "executing," and which tasks are currently "pending tasks" (i.e., tasks waiting to be executed). The task manager 436 also maintains a "device configuration graph" 438 which specifies which embodiments are within communications range of a particular communications node (e.g., of a land-based station "S").

The link between each pair of embodiments (i.e., devices) and/or intermediate communications nodes (e.g., ground stations, satellites, aerial drones, surface water drones, underwater drones, etc.) may also specify attributes of the channel by and/or through which those two nodes are connected, which may include, but are not limited to: the characteristic latency of the channel, the bandwidth (e.g., bits per second), the cost (e.g., satellites tend to be more expensive channels than radio), etc.

In the illustrated task manager's 437 device configuration graph 438 of FIG. 24, the exchange of data between the shore-based station "S" 438 and device "6" 439 is accomplished through the intermediary communications node provided by device "7" 440. The exchange of data between shore-based station "S" 438 and device "8" 441 is achieve by and/or through intermediary device "7" 440. And, the exchange of data between shore-based station "S" 438 and device "12" 442 is achieved by and/or through five intermediary device, e.g., device "8" 441.

The task manager's 436 database 437 and/or graph also maintains an updated record of which computational capabilities, components, elements, circuits, and/or modules are possessed by, and/or incorporated within, each of the embodiments, as well as which of each embodiment's computational components, elements, circuits, and/or modules, are currently executing tasks (and therefore unavailable to process new or "pending" tasks), and their estimated times of task completion.

Periodically, e.g., every 10 milliseconds, the task manager 436 checks 443 for new tasks, e.g., 435, and adds them to the queue of "pending tasks," as well as determining which "executing" tasks have completed, updating the availability of embodiment-specific computational modules at the same time.

Upon receiving a new task, e.g., task "T" 435, and periodically thereafter, task manager 436 checks to see if the required computational capabilities are available among those embodiments within communications range. It may also weigh the "urgency" of the task (in which it may elect to wait for more capable computational capabilities, and/or those with reduced communications latencies), and/or whether or not a "premium price" was paid for the task's completion. When a suitable embodiment, or combination of embodiments, are found (e.g., that possess suitable and available computational capabilities), then the task is partitioned into inter-related component tasks that may be executed with at least some degree of independence and the results of which may be combined (e.g., "map-reduced") when the component results are ready.

With respect to task "T," task manager 436 formulates and sends to the ground station three task specifications: 1) one 444 to be executed by computational equipment at the shore-based facility; 2) one 445 to be executed by device "1;" and one 446 to be executed by device "5." The task manager 436 transmits these three task specifications 444-446 to a computing device 447 through a network 448, and/or communications channel, that may include LAN cables, fiber optic cables, phone lines, radio channels, satellites, etc.

The receiving computer 447 at the ground station forwards task 445 to device "1" 449 via radio transmitter 450 (i.e., device "1" is within range of the shore-based station's radio transmitter, so it is used to transmit task 445 to that device).

The receiving computer 447 at the ground station forwards task 446 to satellite 451, which forwards that task to device "5" 452 (i.e., device "5" is not within range of the shore-based station's radio transmitter, so a satellite is used to relay that task to device "5").

After receiving tasks 445 and 446, devices "1" and "5," respectively, load them onto the computational resource(s) specified in the respective task descriptions and execute those tasks.

Tasks may be transmitted to, and/or relayed by, intermediate drones, devices, and/or other communication channels and/or nodes as circumstances permit.

After transmitting tasks 444-446, task manager 436 updates 453 the task lists within its database 437 to show that task "T" is now "executing."

Figure 25:
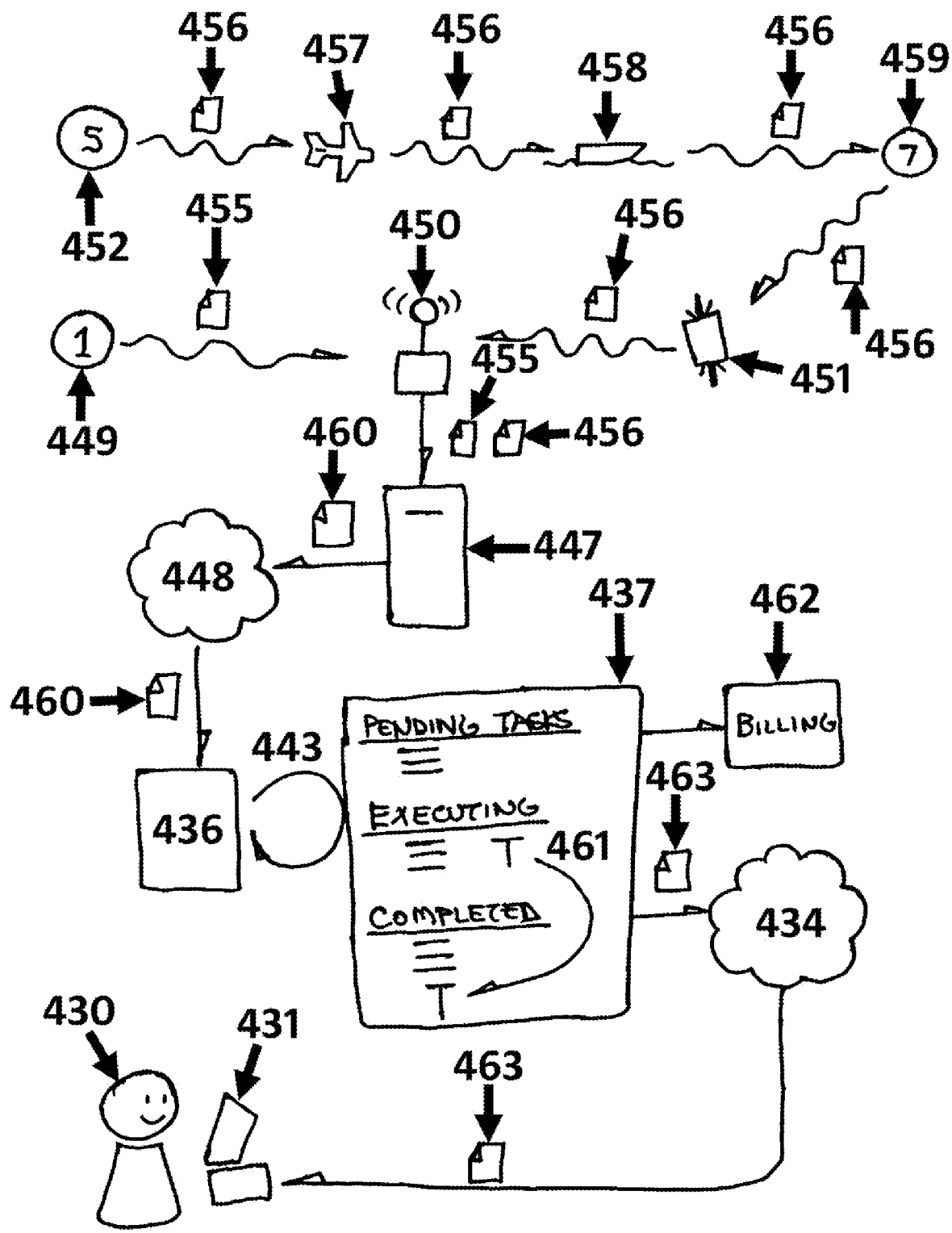
FIG. 25 is a continuation of the flow chart of FIG. 24.

FIG. 25 illustrates a continuation of the same simplified representative flow chart that is illustrated and discussed in relation to FIG. 24.

Embodiments (i.e., devices) "1" 449 and "5" 452 complete the execution of their respective portions of the task "T" described in relation to FIG. 24.

Device "1" transmits the result 455 of its sub-task to the radio receiver 450 of the shore-based station. Device "5" transmits the result 456 of its sub-task to an aerial drone 457 that is close enough to be within range. That drone 457 stores the result 456 until it passes within range of a surface boat drone 458 after which it transmits the result 456 to that water-borne drone 458. The water-borne drone 458 stores the result 456 until it passes within range of another device (e.g., device "7") 459 at which time it transmits the result 456 to that device which immediately transmits it to a satellite 451 which forwards it to the radio receiver 450 of the ground station.

Radio receiver 450 transmits the sub-task results 455 and 456 to a computing device 447 of the ground station which then uses its own task specification (i.e., task 444 of FIG. 24) to guide its merging and/or processing of the sub-task results 455 and 456 so as to produce a final, comprehensive task result 460, which it transmits to task manager 436, via a network 448 (e.g., the Internet).

When task manager executes 443 an update of its task lists and associated graphs, it moves 461 task "T" from the "executing" list to the "completed" list. At the same time it updates its device nodes to show that the computational resources used to complete the task are once again available to contribute to the execution of one or more new tasks.

Task manager 436 transmits the customer-specific version 463 of the comprehensive task result 460 to the customer 430 via the internet 434 and the customer's computing device 431. Similarly, a bill or invoice is formulated by a billing module 462 and the bill is issued to the party responsible for the payment for the task, e.g., the customer 430, and/or the requisite amount is charged to a pre-specified credit card or debit account, or other source and/or provider of funds.

Figure 26:
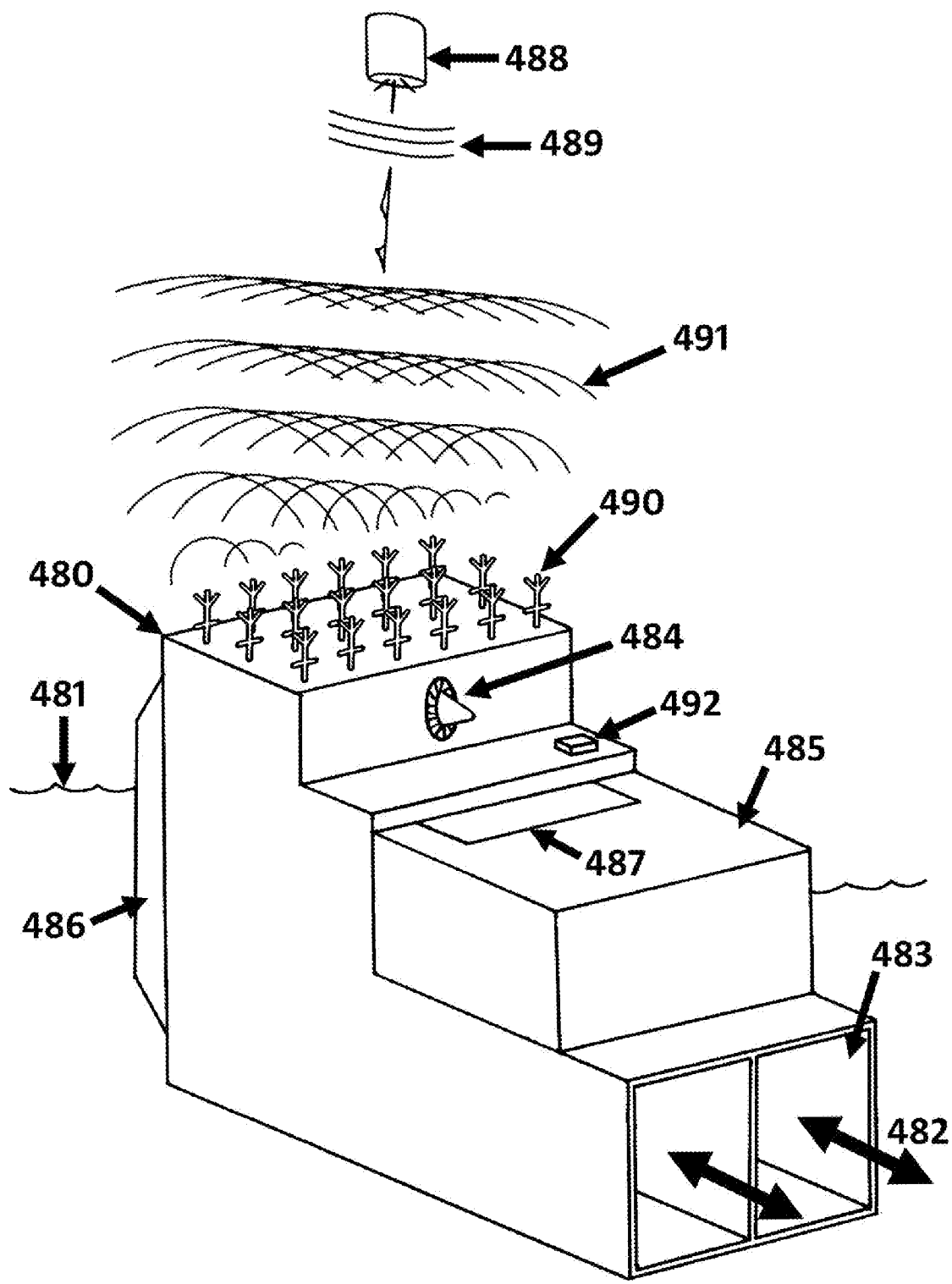
FIG. 26 is an elevated perspective view of an alternate embodiment of the present invention.

FIG. 26 shows an illustration of an alternate embodiment of the present invention. An embodiment 480 of the current disclosure floats adjacent to an upper surface 481 of a body of water. This embodiment incorporates an oscillating water column (OWC) in which water driven by wave motion enters and exits 482 the embodiment through a pair of apertures, e.g., 483. Water that flows into the apertures 483 causes the level of water within a chamber inside the embodiment to rise thereby expelling air from that chamber. Air is expelled through a turbine 484. Water that flows out of the apertures 483 causes the level of water within the chamber inside the embodiment to fall, thereby drawing air into the chamber through the turbine 484. Air-driven turning of the turbine 484 energizes an electrical generator thereby providing the embodiment with electrical power.

The embodiment incorporates two buoyant blocks 485 and 486 which provide the embodiment with sufficient buoyancy to cause it to float adjacent to the surface 481 of a body of water. The embodiment incorporates a set of computing devices within a computing module 487. The computing devices are powered with electrical energy generated by the generator driven by the turbine 484. The computing devices execute computational tasks received from a satellite 488. The electromagnetic transmissions 489 by which the satellite communicates computing tasks to the embodiment are received by a phased array of dipole antennas, e.g., 490, attached to an upper deck of the embodiment 480. The results of completed computational tasks are transmitted 491 by the phased array 490 to the satellite 488. A module 492 containing accelerometers and gyroscopes provides positional information to a phase-control module (not shown). The embodiment's phase-control module adjusts the phase relationships of the signals transmitted to, and/or received from, the various dipole antennas within the phased array so as to optimize the phased array's gain, directionality, and/or beamwidth, with respect to a target and/or a source of transmission. The accelerometers facilitate adjustments to the relative phases of signals sent to, and/or received from, the antennas within the phased array in order to correct, and/or maintain, the orientation of a major lobe of the phased array's beam.

Figure 27:
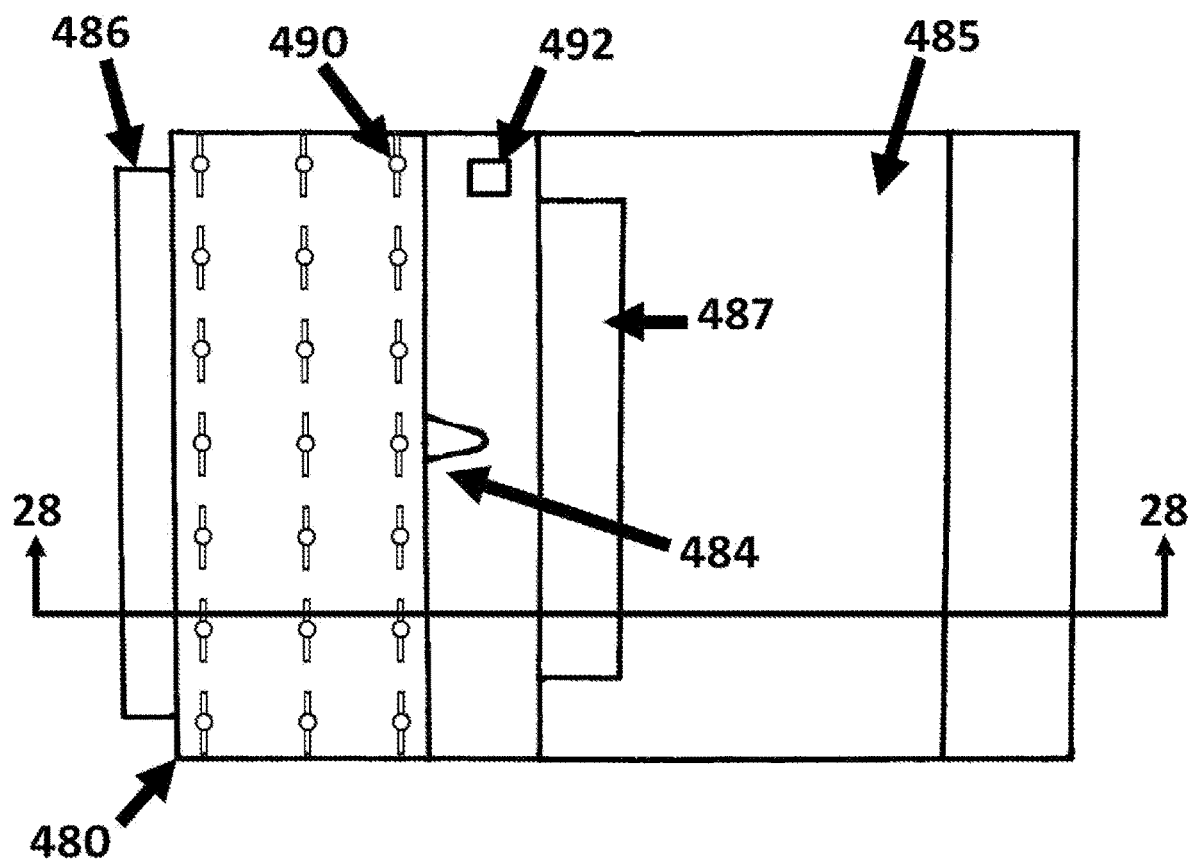
FIG. 27 is a plan view of the embodiment of FIG. 26.

An embodiment similar to the one illustrated in FIG. 26 has antennas attached to side surfaces of a portion of the embodiment that is typically above the embodiment's waterline. These antennas constitute a phased array used to efficiently exchange electromagnetic signals with receiving and/or transmitting antennas located on land, on drones, on piloted aircraft, etc. FIG. 27 shows an illustration of a top-down view of the same embodiment of FIG. 26.

Figure 28:
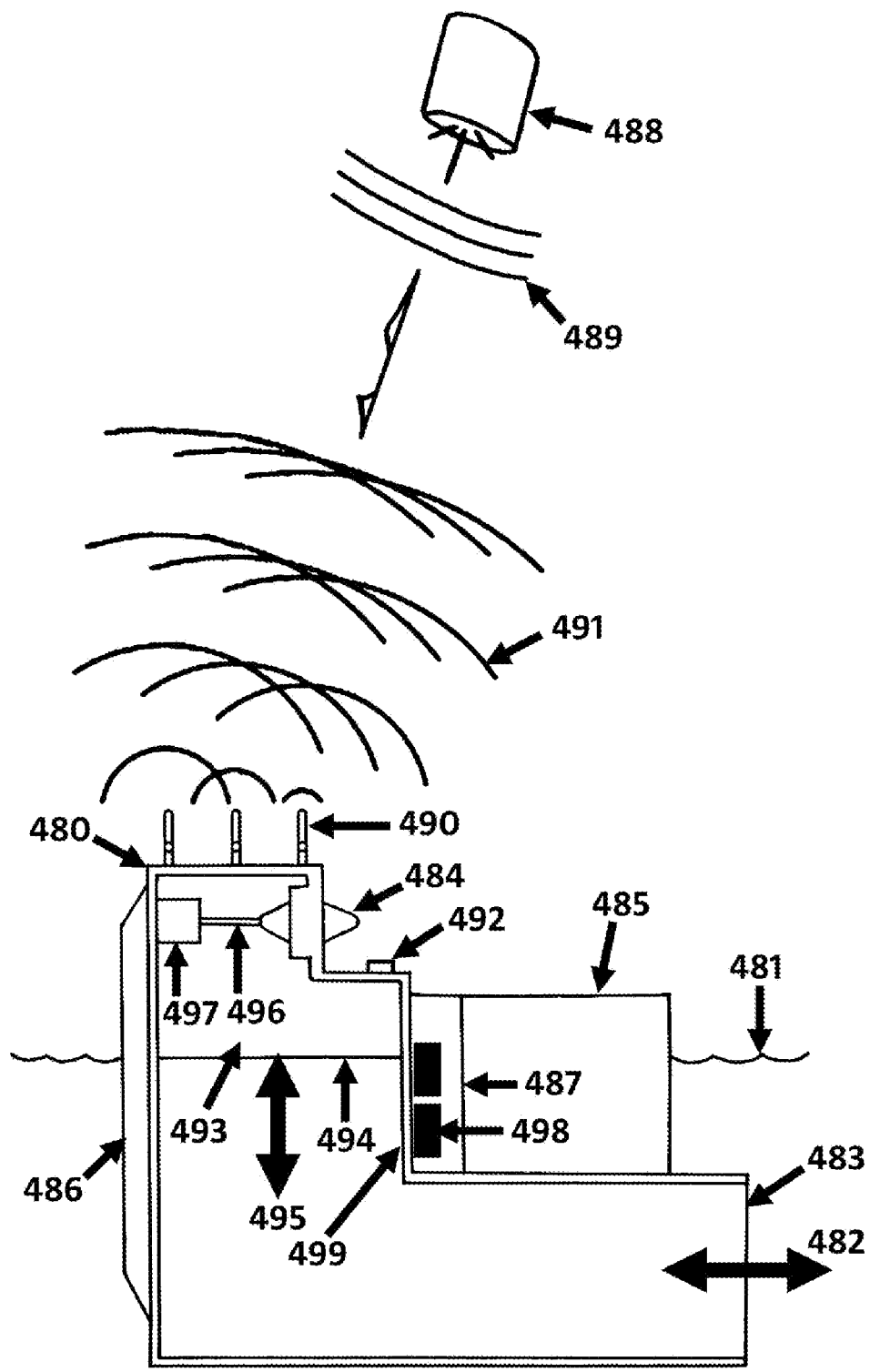
FIG. 28 is a side view, partially cut away, of the embodiment of FIG. 26.

FIG. 28 shows an illustration of a side sectional view of the same embodiment of the current disclosure illustrated in FIGS. 26 and 27. The section is taken along line 28-28 specified in FIG. 27. As water flows 482 in and out of a submerged channel 483 within the embodiment 480, wherein said channel is connected to its internal air and water chamber 493, the surface 494 of the water within the chamber 493 moves 495 up and down. The wave-driven oscillations in the surface 494 of the water within the chamber 493 causes the air within the chamber 493 to be respectively expelled and inhaled through an air turbine 484. The turning of the air turbine in response to the wave-driven passage of air through its blades turns a shaft 496 that turns the rotor of a generator 497 thereby generating electrical power.

At least a portion of the electrical energy generated by the wave-driven generator 497 is used to power a network of computers, e.g., 498, compartmentalized within a container 487, one wall 499 of which is in contact with the water and/or air within the embodiment's air chamber 493. At least a portion of the heat generated by the computers, e.g., 498, within the computing module 487, is dissipated passively and convectively through wall 499 into the air water on the other side.

Figure 29:
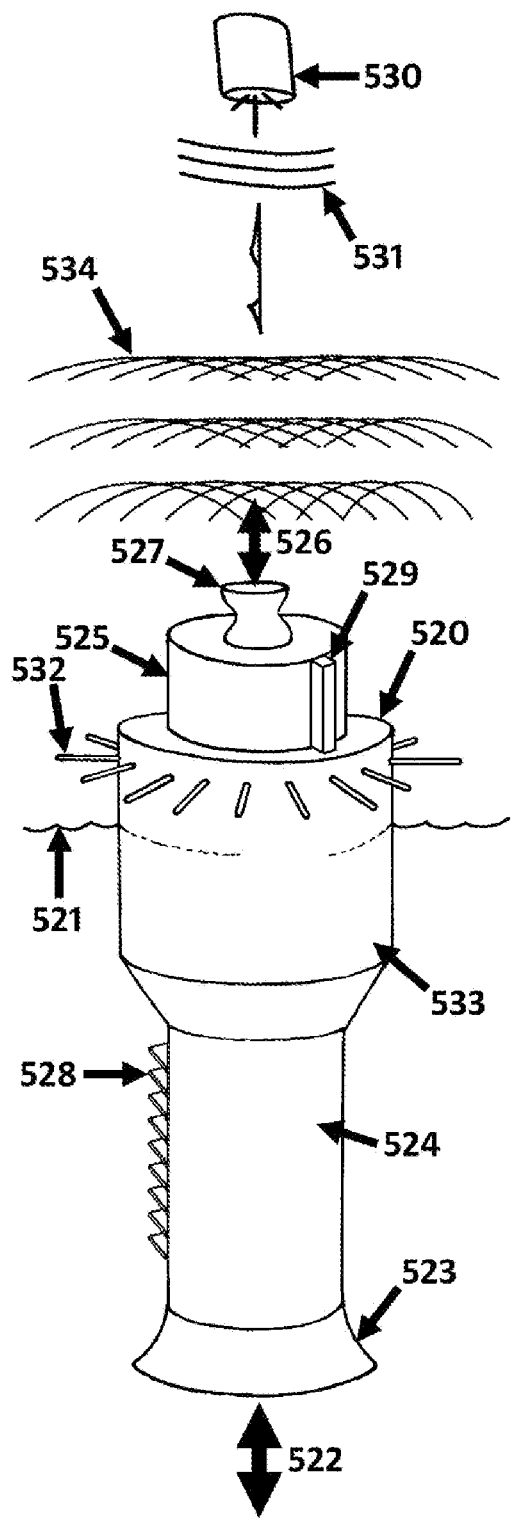
FIG. 29 is an elevated, perspective view of an alternate embodiment of the present invention.

FIG. 29 shows an illustration of a side perspective view of an embodiment of the present invention. An embodiment 520 of the current disclosure floats adjacent to an upper surface 521 of a body of water. This embodiment incorporates an oscillating water column (OWC) in which water driven by wave motion enters and exits 522 the embodiment through an opening in the bottom 523 of a tube 524. Water that flows into the bottom 523 of the tube 524 causes the level of water within an air-filled pocket located at the top 525 of the tube, to rise thereby expelling 526 air from the air pocket out through a constricted duct 527 and an air turbine (not shown) therein. The spinning of the air turbine spins the rotor of a generator and generates electrical power. Likewise, water that flows out of the bottom 523 of the tube 524 causes the level of water within an air-filled pocket located at the top 525 of the tube to fall thereby drawing in 526 air from the atmosphere and into the air pocket. Air is drawn into the air pocket through the constricted duct 527 and the air turbine therein, again resulting in the generation of electrical power.

The embodiment possesses a set of flaps, e.g., 528, which resist the heave motion of the waves that pass and/or impinge upon the embodiment 520. Because the embodiment utilizes a buoy, and/or buoyant portion, 524 that is of relatively small diameter, and relatively great depth, the buoyant forces affecting the vertical position of the embodiment do not change significantly with the changes in water height associated with wave heave. This means that the vertical position of the embodiment is relatively stable, and that wave heave tends to significantly alter the waterline and draft of the embodiment, without significantly altering its height above the seafloor. Therefore, the flaps, e.g., 528, tend to be driven up and down by wave heave, and by adjusting the degree to which those flaps resist that heave motion of the water, and, in conjunction with a rudder (not visible), the embodiment is able to propel itself in a controlled fashion.

The embodiment incorporates a set of computing devices within a computing module 529. The computing devices are powered with electrical energy generated by the generator driven by the turbine positioned within the constricted duct 527. Heat generated by the computers within the module 529 is convectively dissipated into the air surrounding the embodiment 520.

The computing devices execute computational tasks received from a satellite 530. The electromagnetic transmissions 531 by which the satellite communicates computing tasks to the embodiment are received by a phased array of dipole antennas, e.g., 532, attached in a radial fashion, extending laterally outward, from the periphery of the embodiment's buoyant portion 533.

The results of completed computational tasks are transmitted 534 by the phased array 532 to the satellite 530. A module (not shown) containing accelerometers and gyroscopes provides positional information to a phase-control module (not shown). The embodiment's phase-control module adjusts the phase relationships of the signals transmitted to, and/or received from, the various dipole antennas within the phased array so as to optimize the phased array's gain, directionality, and/or beamwidth, with respect to a target and/or a source of transmission. The accelerometers facilitate adjustments to the relative phases of signals sent to, and/or received from, the antennas within the phased array in order to correct, and/or maintain, the orientation of a major lobe of the phased array's beam with respect to the satellite's relative position and/or orientation.

Figure 30:
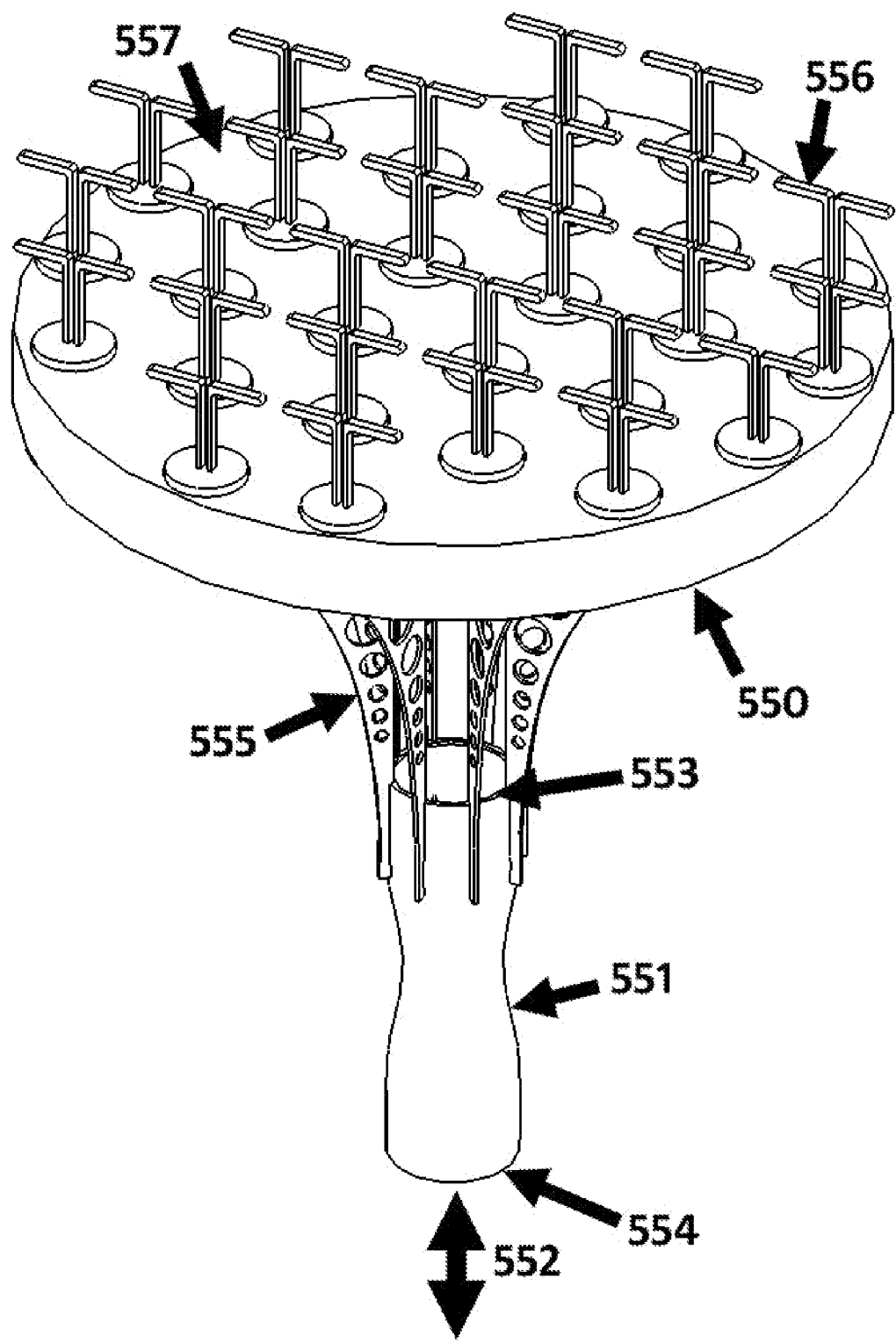
FIG. 30 is an enlarged, perspective view of an alternate embodiment of the present invention.

FIG. 30 shows an illustration of a side perspective view of an embodiment of the present invention. An embodiment 550 of the current disclosure floats adjacent to an upper surface of a body of water. This embodiment incorporates a submerged constricted tube 551 through which water flows 552 in and out through upper 553 and lower 554 mouths, and therefore through which water flows up and down within the tube, in response to vertical heave-induced oscillations of the device. The submerged tube 551 is rigidly connected to a buoy by struts, e.g., 555, so that the entire rigid embodiment moves up and down in response to passing waves. A hydrokinetic turbine positioned within the constricted portion of the tube is turned in response to the flow of water therethrough, and a connected generator generates electrical power therefrom, which powers computers.

The embodiment incorporates a network of computers (not shown) that are powered with electrical energy generated by the turbine and generate positioned within the submerged tube 551. The embodiment receives computational tasks from a satellite (not shown), and transmits computational results to a satellite (not shown). The electromagnetic transmissions between the embodiment and a satellite are facilitated by a phased array antenna 556 attached to an upper deck 557 of the embodiment's buoy 550.

The rigidly attached submerged tube has a relatively significant cross-section and drag with respect to lateral movements. Therefore, because of its drag-mediated resistance to lateral movements, and its inherent weight and associated torque on the embodiment, the submerged tube of this embodiment helps to stabilize the deck of the buoy and to maintain its orientation normal to the vertical, e.g., where one might expect to find a satellite.

Figure 31:
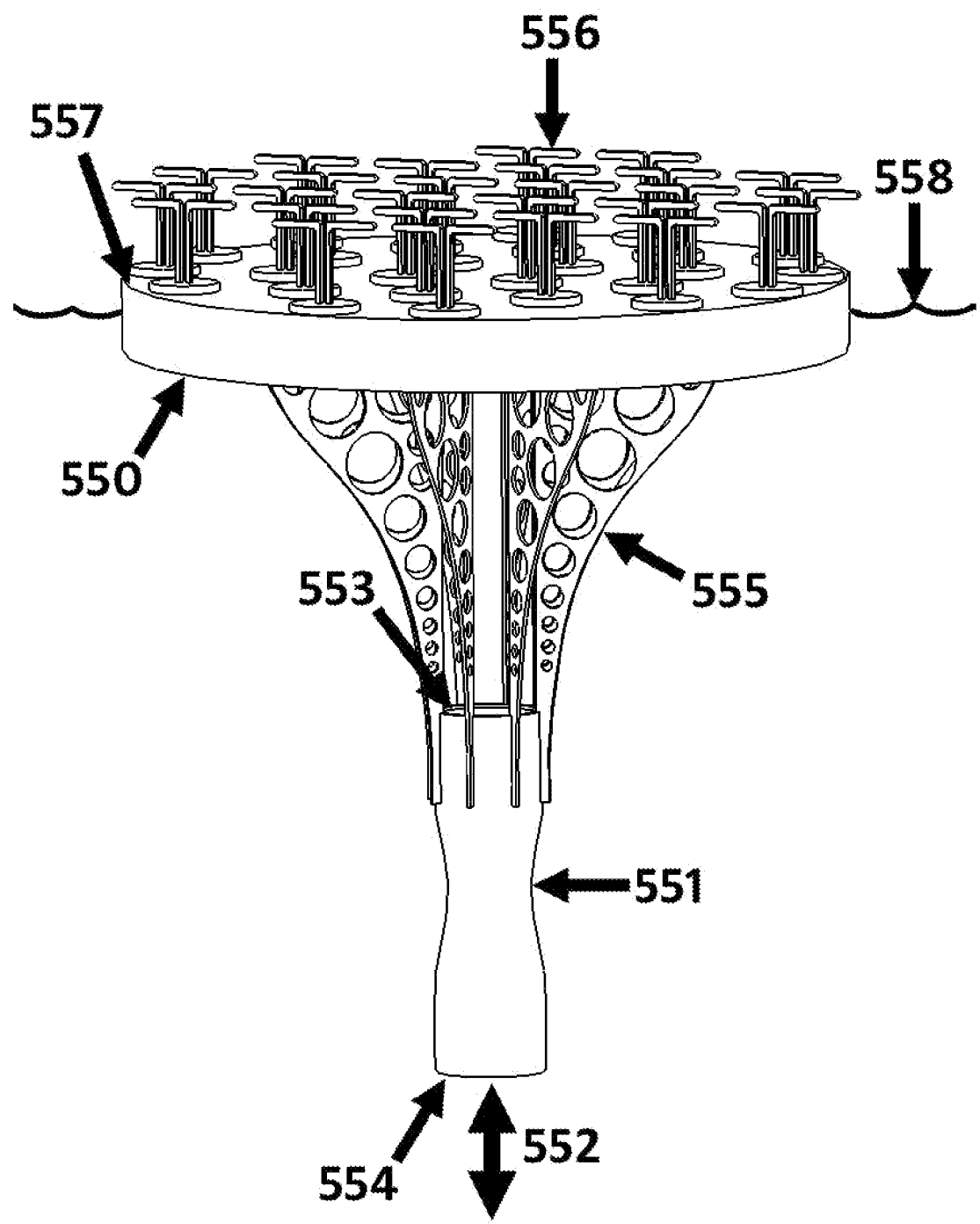
FIG. 31 is a side view of the embodiment of FIG. 30.

Other embodiments likewise include a tubular structure extending downward into the water, which stabilizes the buoy in pitch and roll. In some embodiments, relative water movement within said tube (caused by device movement due to wave heave) compresses a pocket of air at the top portion of said tube, driving said air through an air turbine and thereby driving a generator. In all such embodiments—regardless of whether a water turbine within the tube or an air turbine above the tube is the source of mechanical power—the tube acts as a stabilizer in pitch and roll, enabling the phased array of antennas to track a satellite with greater effectiveness. FIG. 31 shows a side perspective view of the embodiment of FIG. 30. The embodiment 550 of the current disclosure floats adjacent to an upper surface 558 of a body of water.

Figure 32:
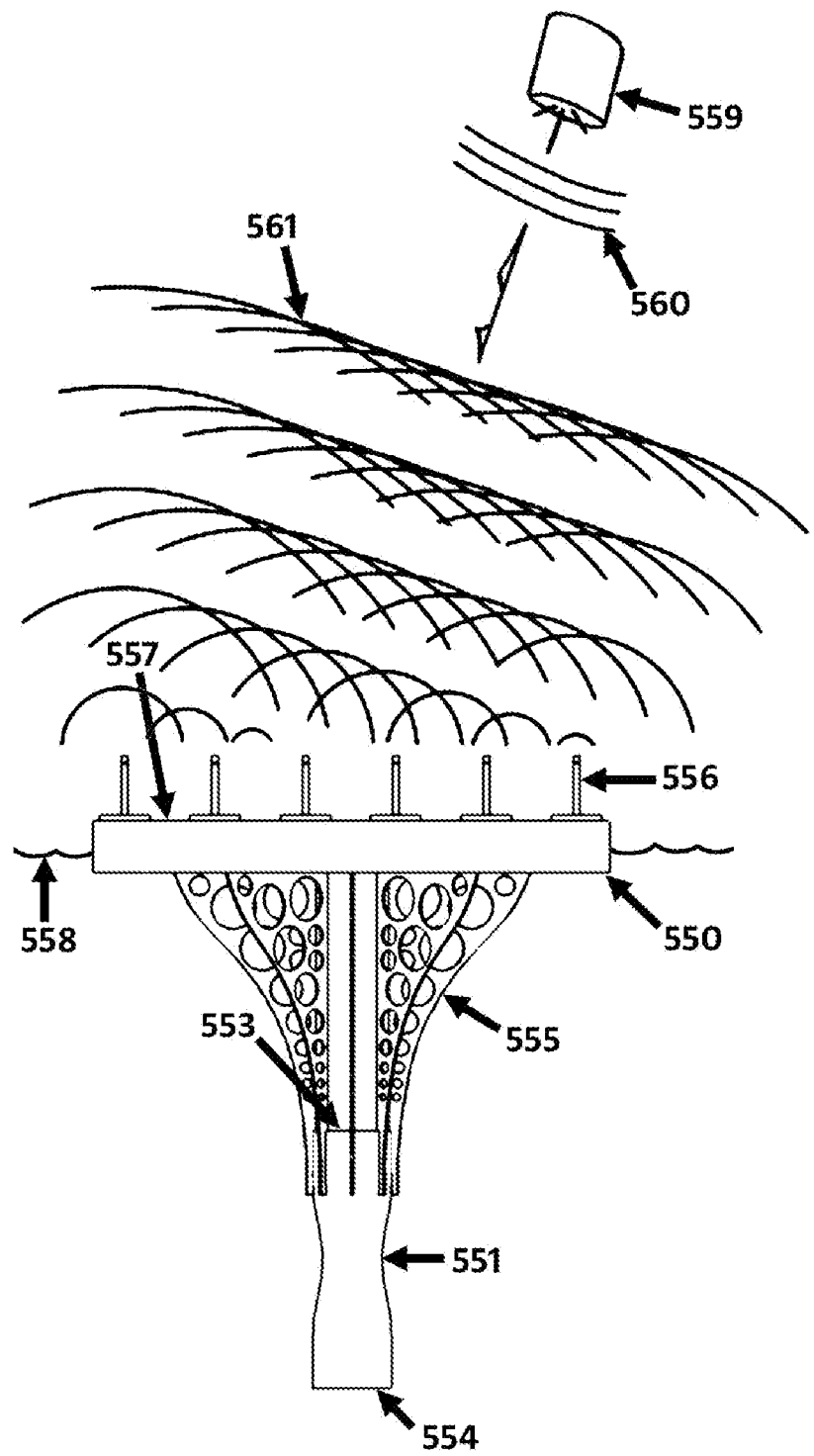
FIG. 32 is another side view of the embodiment of FIG. 30.

FIG. 32 shows an illustration of a side view of the same embodiment of the current disclosure illustrated in FIGS. 30 and 31. The embodiment 550 receives computational tasks from, and transmits computational results to, a satellite 559. The electromagnetic signals 560 transmitted from the satellite 559 to the embodiment, and the electromagnetic signals 561 transmitted from the embodiment 550 to the satellite 559, are respectively received by, and transmitted from, a phased array of antennas, e.g., 556. Through the control of the relative phase of the signals received by, and/or transmitted from, each antenna within the array, the lobe of the phase array's maximum sensitivity and/or gain can be controlled, and the signal-to-noise ratio achievable with respect to a given signal power can be maximized.

Embodiments similar to the one illustrated in FIGS. 30-32 utilize mechanisms, devices, systems, and technologies, that allow the embodiment to speed its adjustment and/or correction to changes in the orientation of the embodiment and/or to the position of the satellite. Such mechanisms, devices, systems, and technologies, include, but are not limited to: accelerometers, gyroscopes, and cameras that monitor the relative position of the horizon, planetary bodies, and/or other advantageous points of reference.

While a number of embodiments have been depicted and described herein, the present invention is not strictly limited to those embodiments. A person of ordinary skill in the art will readily recognize and appreciate that a myriad of modifications, substitutions, and combinations would be available, and the scope of the present invention is intended to include all such modifications, substitutions, and combinations of the foregoing. Accordingly, the scope of the invention unless expressly limited herein is properly governed by the words of the appended claims, using their customary and ordinary meanings consistent with the descriptions and depictions herein.

We claim:

1. A single-body fluidic computational task processing apparatus, comprising:
   a buoyant vessel having an upper deck surface,
   a fluid conduit having a lower tubular portion fixedly positioned beneath the upper deck surface and a constricting section with a cross-sectional area that decreases in a direction away from a lower aperture and toward the upper deck surface;
   a fluid turbine,
   a power-take-off,
   a plurality of computers fixedly positioned relative to the fluid conduit,
   and a first propulsive system;
   said fluid conduit having a lower aperture at a distal end of the lower tubular portion of the fluid conduit through which water may flow into and out of the fluid conduit;
   said lower tubular portion adapted to have a submerged and approximately vertical orientation when the buoyant vessel floats adjacent to an upper surface of a body of water;
   said fluid turbine configured to rotate in response to fluid flowing in the fluid conduit;
   said power-take-off being operatively connected to the fluid turbine such that the power-take-off is configured to produce electrical power in response to rotation of the fluid turbine;
   said plurality of computers configured to be energized by electrical power from the power-take-off;
   said plurality of computers configured to execute computational tasks specified by encoded signals received by the apparatus;
   said plurality of computers configured to produce computational results by the execution of computational tasks specified by encoded signals received by the apparatus; and
   said propulsive system configured to move the apparatus across the surface of the body of water;
   wherein the apparatus is configured to receive, via encoded signals, computational tasks from a remote transmission antenna; and
   wherein the apparatus is configured to transmit, via encoded signals, computational results to a remote receiving antenna.

2. The single-body fluidic computational task processing apparatus of claim 1, wherein the first propulsive system includes a propeller.

3. The single-body fluidic computational task processing apparatus of claim 1, wherein the first propulsive system includes a water jet.

4. The single-body fluidic computational task processing apparatus of claim 1, further including a second propulsive system.

5. The single-body fluidic computational task processing apparatus of claim 4, wherein the first and second propulsive systems include water jets.

6. The single-body fluidic computational task processing apparatus of claim 1, wherein a portion of the fluid conduit is adapted to entrain pressurized gas to drive fluid through the fluid turbine.

7. The single-body fluidic computational task processing apparatus of claim 1, further comprising a heat sink configured to communicate heat from the plurality of computers to at least one of a wall of the fluid conduit and water flowing in the fluid conduit.

8. A fluidic computational task processing system, comprising:
a mobile fluidic task-processing float having an upper deck surface, a fluid conduit, a fluid turbine, a power-take-off assembly, a plurality of computers, a local data reception antenna, a local data transmission antenna, and a first propulsive system,
said mobile fluidic task-processing float configured to drift buoyantly on a surface of water;
said fluid conduit including first and second openings adapted to allow fluid to flow between an exterior of the mobile fluidic task-processing float and an interior of the fluid conduit;
said fluid conduit further including a lower hollow tubular portion disposed below the upper deck surface;
said fluid turbine positioned in the fluid conduit and configured to rotate in response to fluid flow in the fluid conduit;
said power-take-off assembly adapted to generate electricity in response to rotation of the fluid turbine to energize the plurality of computers;
said local data reception antenna adapted to receive encoded input data and relay received input data to the plurality of computers;
said plurality of computers adapted to process received input data and relay output data derived from received input data to the local data transmission antenna; and
said local data transmission antenna adapted to transmit encoded output data;
wherein the mobile fluidic task-processing float is adapted to generate fluid flow in the fluid conduit and energize the plurality of computers when oscillating in a body of water traversed by waves.

9. The fluidic computational task processing system of claim 8, wherein the fluid conduit includes an extended tubular duct depending from the hull enclosure and wherein the first opening is at a bottommost portion of the extended tubular duct.

10. The computational task processing system of claim 8, wherein the local transmission antenna and the local reception antenna are the same antenna.

11. The computational task processing system of claim 8, wherein one of the local transmission antenna and the local reception antenna is a phased-array antenna.

12. The fluidic computational task processing system of claim 8, further comprising a remote data transmission antenna, a remote data transmission computer, a remote data reception antenna, and a remote data reception computer.

13. The fluidic computational task processing system of claim 12, wherein the remote data transmission computer configured to transmit an input data packet to the plurality of computers via the remote data transmission antenna and the local data reception antenna; wherein the plurality of computers is configured to compute an output data packet using data of the input data packet; and wherein the plurality of computers is configured to transmit the output data packet to the remote data reception computer via the local data transmission antenna and the remote data reception antenna.

14. The computational task processing system of claim 12, wherein the remote data transmission antenna and the remote data reception antenna are the same antenna.

15. The computational task processing system of claim 12, wherein the remote data reception computer and the remote data transmission computer are the same computer.

16. The computational task processing system of claim 8, wherein the fluid turbine is a Kaplan turbine.

17. The computational task processing system of claim 8, wherein the power-take-off assembly includes an electrical generator operatively coupled to the fluid turbine.

18. The computational task processing system of claim 8, wherein the power-take-off assembly includes an energy storage device.

19. The computational task processing system of claim 18, wherein the energy storage device is a battery.

20. The computational task processing system of claim 8, wherein the computational task processing system derives one of a neural network, a machine learning model, an artificially intelligent system, a cryptocurrency hash value, and a mathematical model consistent with a set of data values, from received input data.

21. The computational task processing system of claim 8, wherein the power-take-off assembly is fixedly attached to the hull enclosure.

22. The computational task processing system of claim 8, wherein the fluid turbine is rotatably attached to the hull enclosure.

23. The computational task-processing system of claim 8, wherein the first propulsive system is a propeller.

24. The computational task-processing system of claim 8, wherein the first propulsive system is a water jet.

25. The computational task-processing system of claim 8, wherein the first propulsive system is a rigid sail.

26. The computational task-processing system of claim 8, further comprising a second propulsive system and a steering control system configured to control relative thrusts of the first propulsive system and the second propulsive system.

27. The computational task-processing system of claim 8, wherein the turbine is positioned downstream of the upwardly converging section with respect to an upward direction of fluid flow in the upwardly converging section.

28. The computational task-processing system of claim 27, wherein the turbine is positioned above the upwardly converging section.

29. The computational task-processing system of claim 27, wherein the turbine is positioned at a vertical level included between a first horizontal plane defined by the top of the upwardly converging section and a second horizontal plane defined by the bottom of the upwardly converging section.

30. The computational task-processing system of claim 27, wherein the fluid conduit includes a bend.

31. The computational task processing system of claim 8, wherein the fluid turbine is positioned in a portion of the fluid conduit to which fluid is impelled from the upwardly converging section.

32. The computational task-processing system of claim 8, further comprising a heat sink communicating heat from the plurality of computers to one of a wall of the fluid conduit and water flowing in the fluid conduit.

33. The computational task-processing system of claim 8, wherein a portion of the fluid conduit is adapted to entrain pressurized gas to drive fluid to the fluid turbine.

34. A single-body fluidic computational task processing apparatus, comprising:
   a fluid conduit having upper and lower sections;
   a hydrodynamic lifting hull fixedly attached to the fluid conduit, and surrounding an upper portion of the fluid conduit and from which depends a lower portion of the fluid conduit;
   a power-take-off fixedly positioned relative to the hydrodynamic lifting hull;
   a fluid turbine rotatably attached to the hydrodynamic lifting hull, and operably connected to the power take off;
   a plurality of computers fixedly attached to the hydrodynamic lifting hull;
   and a first propulsive system fixedly positioned relative to the hydrodynamic lifting hull;
   said hydrodynamic lifting hull adapted to float adjacent to an upper surface of a body of water over which waves pass;
   said lower portion of the fluid conduit having a tubular portion adapted to be submerged and having an approximately vertical orientation when the apparatus floats adjacent to the upper surface of the body of water;
   said lower portion of the fluid conduit further having an aperture through which water may flow into and out of the fluid conduit;
   said fluid conduit further having a constricting section whose cross-sectional area decreases with respect to fluid flowing in the fluid conduit in a direction away from the aperture and toward the upper portion of the fluid conduit;
   said fluid turbine configured to rotate in response to fluid flowing in the fluid conduit;
   said power-take-off configured to produce electrical power in response to rotation of the fluid turbine;
   said plurality of computers configured to be energized by electrical power produced by the power-take-off;
   said plurality of computers configured to execute computational tasks specified by encoded signals received by the apparatus;
   said plurality of computers configured to produce computational results by the execution of computational tasks specified by encoded signals received by the apparatus; and
   said propulsive system configured to move the hydrodynamic lifting hull across the surface of the body of water.

* * * * *